United States Patent
Umezawa et al.

[11] 3,922,262
[45] Nov. 25, 1975

[54] N-SUBSTITUTED DERIVATIVES OF BLEOMYCINS

[75] Inventors: Hamao Umezawa, Tokyo; Yuya Nakayama, Yono; Mamoru Kunishima; Midori Matsubara, both of Tokyo, all of Japan

[73] Assignee: Nippon Kayaku Kabushiki Kaisha, Tokyo, Japan

[22] Filed: Jan. 7, 1974

[21] Appl. No.: 431,130

Related U.S. Application Data

[63] Continuation-in-part of Ser. No. 291,178, Sept. 22, 1972, abandoned, which is a continuation-in-part of Ser. No. 248,631, April 28, 1972, abandoned.

[30] Foreign Application Priority Data

Apr. 28, 1971  Japan.................................. 46-27553
Sept. 29, 1971 Japan.................................. 46-75430

[52] U.S. Cl......... 260/112.5; 260/210 AB; 424/177; 424/181
[51] Int. Cl.$^2$................. C07C 103/52; A61K 37/00; A61K 31/71
[58] Field of Search.................... 260/112.5, 210 AB

[56] References Cited
UNITED STATES PATENTS

| | | | |
|---|---|---|---|
| 3,244,590 | 4/1966 | Schaffner et al. | 260/210 AB |
| 3,308,117 | 3/1967 | Kelly et al. | 260/210 R |
| 3,646,049 | 2/1972 | Hoff et al. | 260/210 R |

OTHER PUBLICATIONS

J. D. Roberts and M. C. Caserio, "Basic Principles of Organic Chemistry," Benjamin, Inc. New York, 1965, pp. 563–564, 686.

Ishizuka et al., J. of Antibiotics, Ser. A, 20, 15–24, (1967).

*Primary Examiner*—Lewis Gotts
*Assistant Examiner*—Reginald J. Suyat
*Attorney, Agent, or Firm*—Schuyler, Birch, Swindler, McKie & Beckett

[57] ABSTRACT

N-Substituted derivatives of bleomycins, which are useful antibiotic substances having an extremely high anti-microbial activity and an antitumer activity with low toxicity, are easily produced by reacting 3-aminopropylaminobleomycin, 3-(N-3-aminopropyl)aminopropylaminobleomycin, 3-(N-4-aminobutyl)aminopropylaminobleomycin, 3-(N-6-aminohexyl)aminopropylaminobleomycin or 3-(N-methyl-N-3-aminopropyl)aminopropylaminobleomycin with a compound of the formula, $$R - Y$$

wherein R is hydrogen (except where Y represents -X or -SO$_2$X), a saturated or unsaturated, straight chain or branched chain alkyl, cycloalkyl, phenyl, naphthyl, aralkyl or heterocyclic group, these groups being optionally substituted; and Y is —COOH or a reactive derivative thereof, —X (wherein X is a halogen), —SO$_2$X (X is as defined above), -NCO,

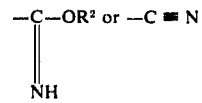

(wherein R$^2$ is an alkyl).

24 Claims, 7 Drawing Figures

IR ABSORPTION SPECTRUM OF N-(CYCLOHEXYL-CARBAMOYL)-BLEOMYCIN A5

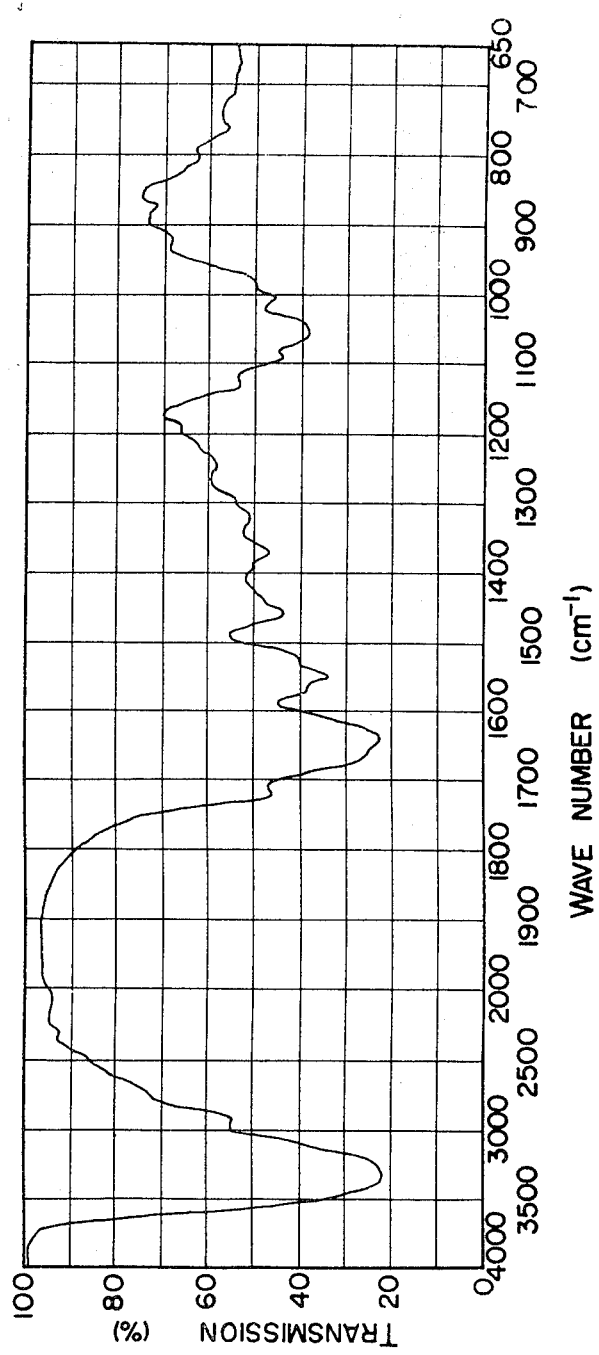

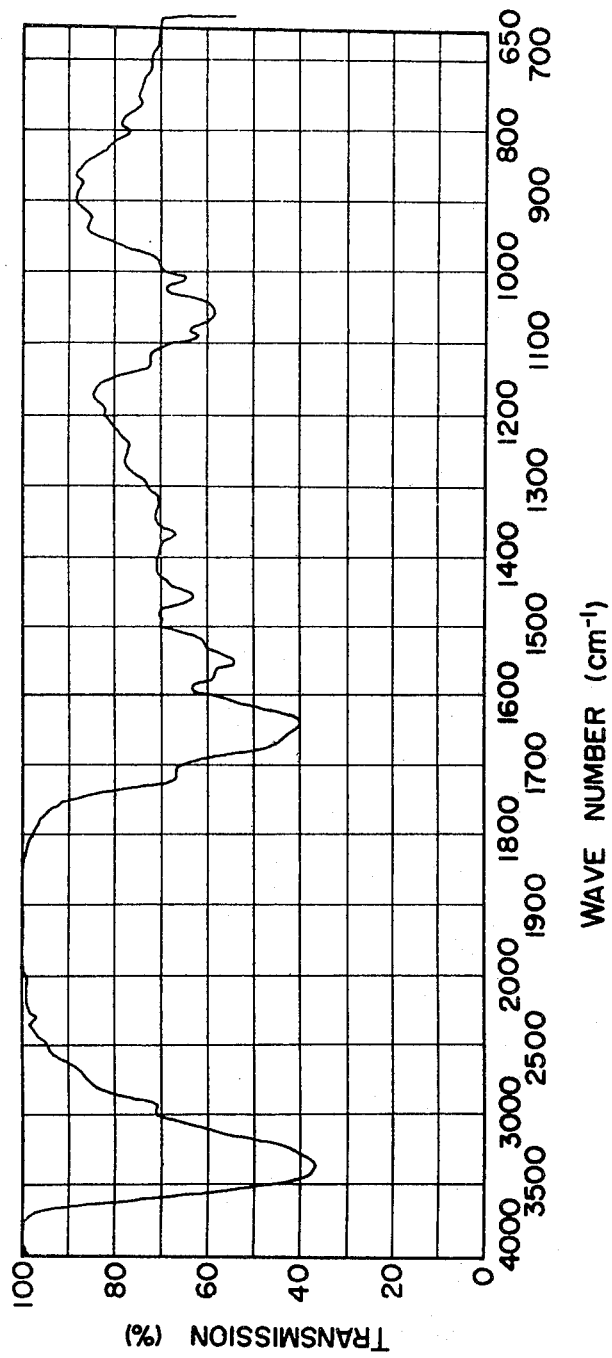

N-SUBSTITUTED DERIVATIVES OF BLEOMYCINS

CROSS REFERENCE TO THE RELATED APPLICATION

This application is a Continuation-in-Part of U.S. Ser. No. 291178 filed on Sept. 22, 1972, which is a Continuation-in-Part of U.S. Ser. No. 248631, filed on Apr. 28, 1972, both now abandoned.

The present invention relates to novel N-substituted derivatives of bleomycins and a method for preparing the same. More particularly, it relates to N-substituted derivatives of bleomycins having the following structure in their acid-containing form,

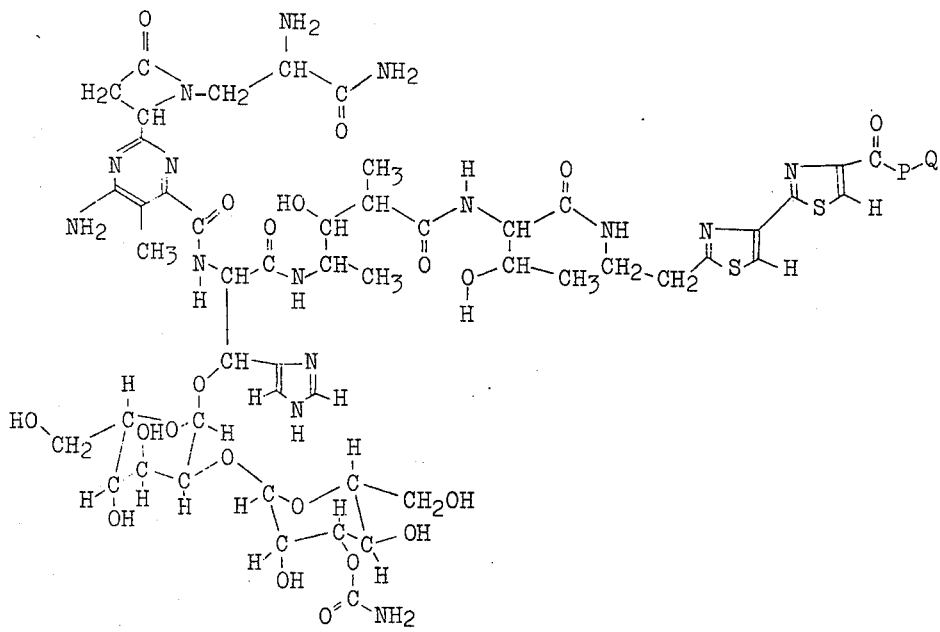

wherein $P =$ —NH—$(CH_2)_3$—NH—,
 —NH—$(CH_2)_3$—NH—$(CH_2)_4$—NH—,
 —NH—$(CH_2)_3$—N—$(CH_2)_3$—NH—,
      $\;\;\;\;\;\;\;\;\;\;\;\;\;\;\;\;\;\;\;\;$ |
      $\;\;\;\;\;\;\;\;\;\;\;\;\;\;\;\;\;\;\;\;$ $CH_3$
 —NH—$(CH_2)_3$—NH—$(CH_2)_3$—NH— or
 —NH—$(CH_2)_3$—NH—$(CH_2)_6$—NH—

$Q =$ —COR, where R is hydrogen, an $C_1$–$C_{11}$ alkyl group, a $C_1$–$C_2$ halogen-substituted alkyl group, a crotonoyl group, a phenyl group, a p-nitrophenyl group, a benzyl group, a p-nitrobenzyl group, a phenoxymethyl group, a cinnamyl group, a naphthyl group, a nicotinyl group, an isonicotinyl group, a furyl group or a thenyl group;

—CO—$(CH_2)n_1$—COOH, where $n_1$ is an integer of 2 to 7;

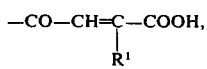

where $R^1$ is hydrogen or a methyl group;

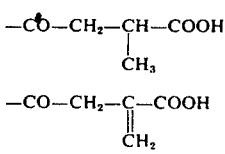

—$R^2$, where $R^2$ is an $C_1$–$C_4$ alkyl group, an allyl group, a benzyl group or a p-nitrobenzyl group;

—$SO_2R^3$, where $R^3$ is an $C_1$–$C_2$ alkyl group,

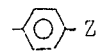

(wherein Z is hydrogen, a methyl group, a chlorine atom or a nitro group) or a naphthyl group;

—$CONHR^4$, where $R^4$ is an $C_1$–$C_4$ alkyl group, a cyclohexyl group, a phenyl group, a p-tolyl group, or a naphthyl group;

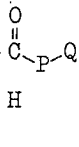

where $R^5$ is hydrogen, an $C_1$–$C_8$ alkyl group —$(CH_2)_3NZ^1Z^2$ (wherein $Z^1$ and $Z^2$ are hydrogen or a methyl group),

(wherein $Z^3$ is hydrogen, a methyl group, a nitro group or a methoxy group),

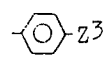

(wherein $Z^4$ is hydrogen, a chlorine atom or a nitro group), a styryl group or a naphthylmethyl group;

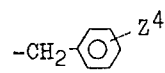

wherein $R^6$ is hydrogen or a nitro group;

—$(CH_2)_2C≡N$; A is an inorganic anion such as a chlorine atom or ½ sulfate radical and $x$ is an integer of 1 to 3, and a method for preparing N-substituted derivatives of bleomycins which comprises reacting 3-aminopropylaminobleomycin, 3-(N-3-aminopropyl)aminopropylaminobleomycin, 3-(N-4-aminobutyl)aminopropylaminobleomycin, 3-(N-6-aminohexyl)aminopropylaminobleomycin or 3-(N-methyl-N-3-aminopropyl)aminopropylaminobleomycin with one member selected from the group consisting of compounds represented by the formula,

R — Y wherein R is as defined above and Y is —COOH, an acid halide group, an acid ester group, —CO—O—COR, or —$CON_3$; the formula,

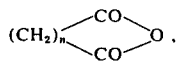

wherein $n$ is an integer of 3 to 7; the formula,

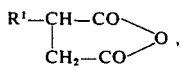

wherein $R^1$ is as defined above; the formula,

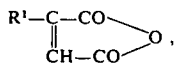

wherein $R^1$ is as defined above; the formula,

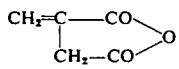

the formula,

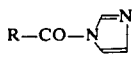

wherein R is as defined above; the formula, $R^2 — X$, wherein $R^2$ is as defined above and X is a halogen atom; the formula, $R^3O_2S — X$,
wherein $R^3$ and X are as defined above; the formula, $R^4$—NCO, $R^4$ is as defined above; the formula,

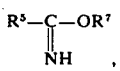

wherein $R^5$ is as defined above and $R^7$ is $C_1$-$C_2$ alkyl group; the formula,

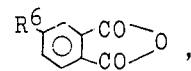

wherein $R^6$ is as defined above and the formula, $CH_2=CH—CN$.

N-Substituted derivatives of bleomycins of the present invention usually contain one metal atom, e.g. copper, nickel, iron manganese and the like, in a chelate form, and have one basic group in their main nuclear part and two or less basic groups in their side chain (that is, a side chain —P—Q has basic groups of two or less). Therefore, N-substituted derivatives of bleomycins are recovered as a salt of inorganic acid, for example, those bonded with 1−3 equivalents of inorganic acid, such as hydrochloric acid or sulfuric acid. pH of an aqueous solution of the aforesaid N-substituted derivatives of bleomycins in an acid-free form, i.e. free base, is 9 or more, so that said aqueous solution absorbs carbon dioxide gas existing in air and then is converted into carbonate thereof. Thus, isolation of said bleomycins in a pure basic form is relatively difficult.

Anti-microbial activity and carcinostatic activity of N-substituted derivatives of bleomycins of the present invention is displayed by the part represented by the above-mentioned formula. Therefore, N-substituted derivatives of bleomycins are represented by the above-mentioned formula in the present invention. In the present invention, the terms "bleomycins" and "N-substituted derivatives of bleomycins" include all forms of bleomycins, i.e. "metal-containing", "metal-free", "acid-containing" or "acid-free" forms.

3-Aminopropylaminobleomycin (I) used in the present invention as a starting material is a bleomycin the terminal chain of which is 1,3-diaminopropane. 3-(N-4-Aminobutyl)aminopropylaminobleomycin (II) is a bleomycin the terminal chain of which is 3-(N-4-aminobutyl)aminopropylamine (spermidine) and is known as "bleomycin $A_5$". 3-N-Methyl-N-3-aminopropyl)-propylaminobleomycin (III) is a bleomycin having an N,N-bis(3-aminopropyl)methylamino group as terminal chain. 3-(N-3-Aminopropyl)aminopropylaminobleomycin (IV) is a bleomycin having a N,N-bis(3-aminopropyl)amine as a terminal chain. 3-(N-6-Aminohexyl)aminopropylaminobleomycin (V) is a bleomycin having a 3-(N-6-aminohexyl)-aminopropylamine. These bleomycins as a metal-free and acid-free form have the following structure:

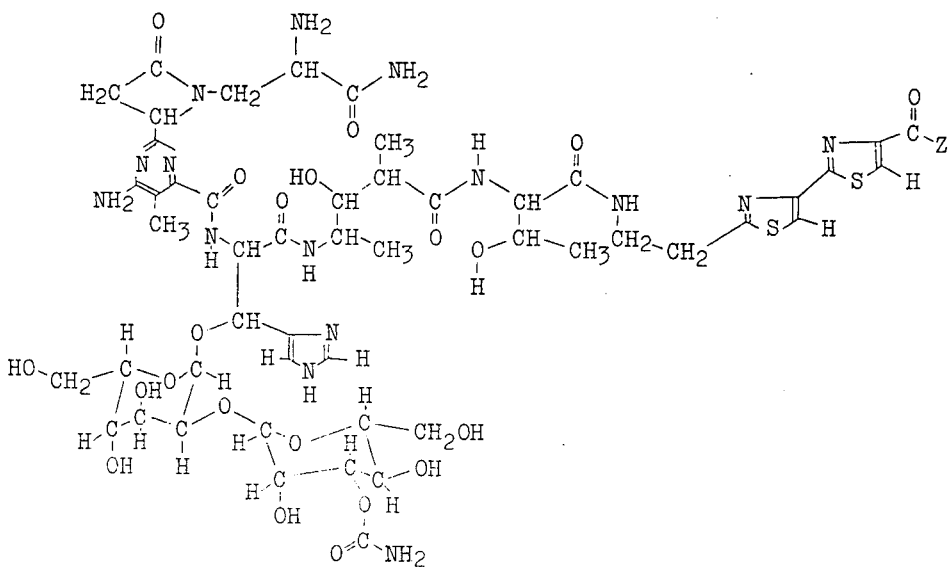

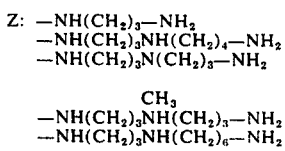

| | | | |
|---|---|---|---|
| Z: | $-NH(CH_2)_3-NH_2$ | (I) | |
| | $-NH(CH_2)_3NH(CH_2)_4-NH_2$ | (II) | |
| | $-NH(CH_2)_3N(CH_2)_3-NH_2$ | (III) | |
| | $\quad\quad\quad\quad\quad CH_3$ | | |
| | $-NH(CH_2)_3NH(CH_2)_3-NH_2$ | (IV) | |
| | $-NH(CH_2)_3NH(CH_2)_6-NH_2$ | (V) | |

These bleomycins are representative biosynthetic bleomycins which can be easily produced in a high yield by adding an amine corresponding to the respective terminal chain amine moiety to a medium in which bleomycinproducing strains are cultured to prepare bleomycin.

The bleomycins themselves have an anti-microbial activity and an antitumor activity and are also useful as a starting material for the synthesis of various valuable bleomycin derivatives having an improved antitumor activity, a lower toxicity and a selective antitumor activities against tumors of various internal organs.

As a result of diversified studies on bleomycins, the present inventors have now found that terminal primary amino group of the bleomycins is very reactive and thereby the bleomycins can be converted into useful novel carcinostatic derivatives thereof with various reagents.

Based on the said finding, the present invention has been accomplished.

The representative modes of reaction for the preparation of N-substituted derivatives of bleomycins according to the present invention are as follows:

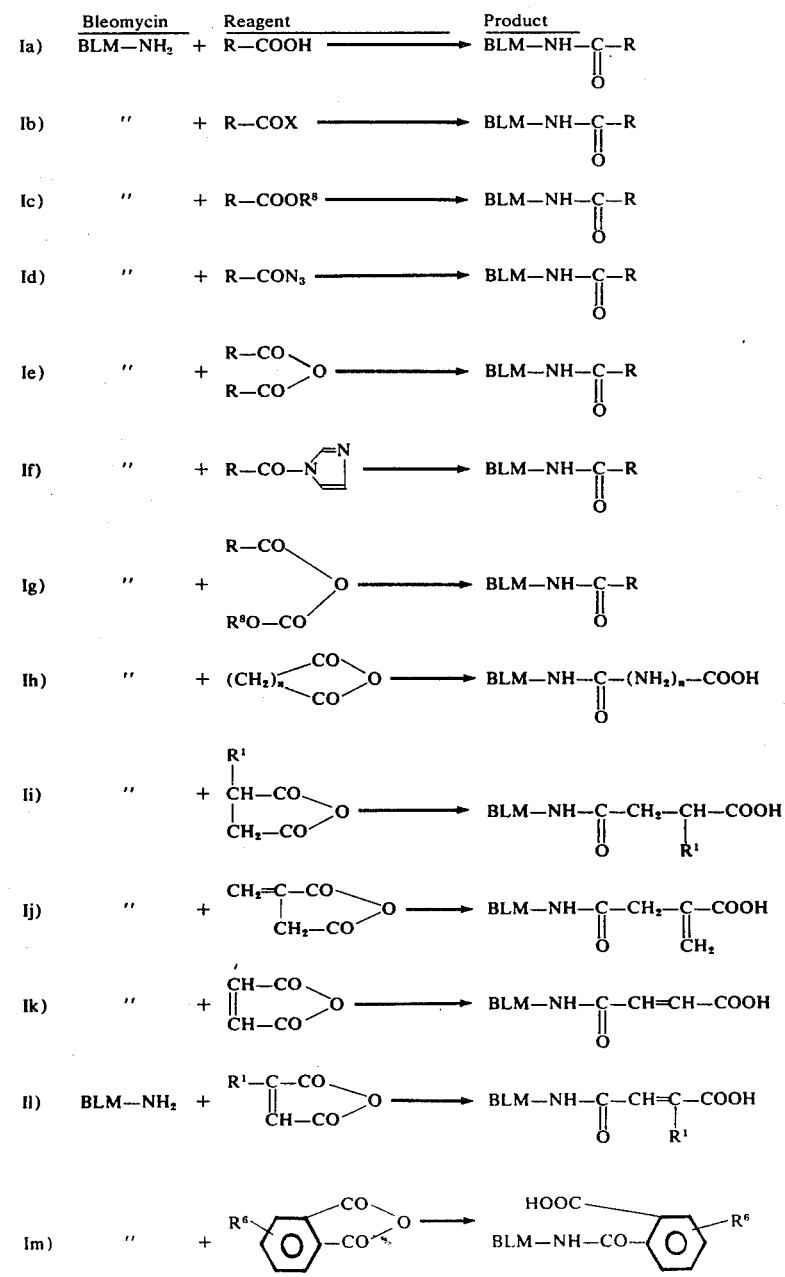

-continued

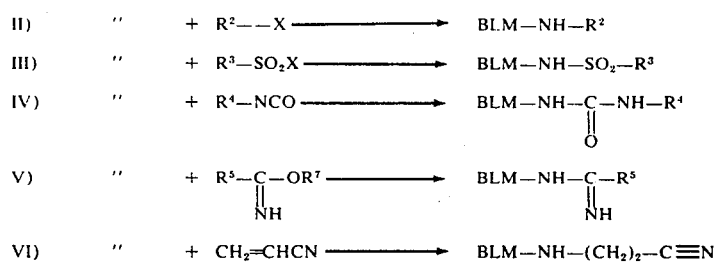

In the above-mentioned formulas, "BLM" represents the residue of the bleomycins exclusive of the side chain terminal amino group; $R^1$, $R^2$, $R^3$, $R^4$, $R^5$, $R^6$, $R^7$ and n are as defined above; $R^8$ is a lower alkyl or substituted or unsubstituted phenyl.

Of these modes of reaction, Ia) is a method for the direct N-acylation of the bleomycins with a carboxylic acid in the presence of dehydrating agent such as a carbodiimide. The modes Ib, Ic, Id, Ie, If and Ig are methods for the N-acylation of the bleomycins with an acid halide, a carboxylic acid ester, a carboxylic acid azide, a carboxylic acid anhydride, an acylimidazole and a mixed acid anhydride obtained by a reaction of an alkoxyhalogenoformate with a carboxylic acid, respectively. The modes Ih, Ii, Ij, Ik, Il and Im are methods for the N-acylation of the bleomycins with an intramolecular anhydride of a dibasic acid.

The representative compounds which may be used as a reagent in the present invention are as follows:

| | |
|---|---|
| Formic acid | HCOOH |
| Acetic acid | $CH_3COOH$ |
| Propionic acid | $C_2H_5COOH$ |
| Butyric acid | $C_3H_7COOH$ |
| Valeric acid | $CH_3(CH_2)_3COOH$ |
| Caprylic acid | $CH_3(CH_2)_6COOH$ |
| Lauric acid | $CH_3(CH_2)_{10}COOH$ |
| Crotonic acid | $CH_3CH=CHCOOH$ |
| Benzoic acid | ⟨O⟩-COOH |
| Phenylacetic acid | ⟨O⟩-$CH_2COOH$ |
| 2-Naphthoic acid | ⟨OO⟩-COOH |
| p-Nitrobenzoic acid | $NO_2$-⟨O⟩-COOH |
| Acetyl chloride | $CH_3COCl$ |
| Propionyl chloride | $C_2H_5COCl$ |
| Chloroacetyl chloride | $ClCH_2COCl$ |
| Chloropropionyl chloride | $ClCH_2CH_2COCl$ |
| Bromoacetyl bromide | $BrCH_2COBr$ |
| Benzoyl chloride | ⟨O⟩-COCl |
| p-Nitrobenzoyl chloride | $NO_2$-⟨O⟩-COCl |
| Phenylacetyl chloride | ⟨O⟩-$CH_2COCl$ |
| Phenoxyacetyl chloride | ⟨O⟩-$OCH_2COCl$ |
| Cinnamic anhydride | (⟨O⟩-$CH=CHCO)_2O$ |
| Ethyl cinnamate | ⟨O⟩-$CH=CH.COOC_2H_5$ |
| Ethyl caprylate | $CH_3(CH_2)_6COOC_2H_5$ |
| Benzoyl azide | ⟨O⟩-$CON_3$ |
| Propionic acid azide | $C_2H_5CON_3$ |
| Butyric acid azide | $C_3H_7CON_3$ |
| Acetic anhydride | $(CH_3CO)_2O$ |
| Propionic anhydride | $(C_2H_5CO)_2O$ |
| Butyric anhydride | $\{CH_3(CH_2)_2CO\}_2O$ |
| Octanoic anhydride | $\{CH_3(CH_2)_6CO\}_2O$ |
| Lauric anhydride | $\{CH_3(CH_2)_{10}CO\}_2O$ |
| Crotonic anhydride | $(CH_3CH=CHCO)_2O$ |
| Phenylacetic anhydride | (⟨O⟩-$CH_2$-$CO)_2O$ |
| Phenoxyacetic anhydride | (⟨O⟩-$OCH_2$-$CO)_2O$ |
| Benzoic anhydride | (⟨O⟩-$CO)_2O$ |
| p-Nitrobenzoic anhydride | $(NO_2$-⟨O⟩-$CO)_2O$ |
| p-Nitrobenzoyl chloride | $NO_2$-⟨O⟩-COCl |
| Nicotinic anhydride | (⟨O⟩-$CO)_2O$ |
| Isonicotinic anhydride | $(N$⟨O⟩-$CO)_2O$ |
| Furoic anhydride | (⟨O_O⟩-$CO)_2O$ |
| Thenoic anhydride | (⟨O_S⟩-$CO)_2O$ |
| Acetylimidazole | $CH_3CO$-N⟨N⟩ |
| Succinic anhydride | $CH_2$-CO\ $CH_2$-CO/O |
| Maleic anhydride | CH-CO\ CH-CO/O |
| Methylsuccinic anhydride | $CH_3$-CH-CO\ $CH_2$-CO/O |
| Itaconic anhydride | $CH_2$=CH-CO\ $CH_2$-CO/O |
| Citraconic anhydride | $CH_3$-C-CO\ CH-CO/O |
| Glutaric anhydride | $(CH_2)_3$<CO\CO>O |
| Adipic anhydride | $(CH_2)_4$<CO\CO>O |
| Pimelic anhydride | $(CH_2)_5$<CO\CO>O |
| Suberic anhydride | $(CH_2)_6$<CO\CO>O |
| Acelaic anhydride | $(CH_2)_7$<CO\CO>O |
| Phthalic anhydride | ⟨O⟩<CO\CO>O |
| 3-Nitrophthalic anhydride | $NO_2$-⟨O⟩<CO\CO>O |
| Methyl chloride | $CH_3Cl$ |

| Reagent | Formula |
|---|---|
| Methyl iodide | CH₃I |
| Ethyl bromide | C₂H₅Br |
| Butyl bromide | C₄H₉Br |
| Allyl bromide | CH₂=CH—CH₂Br |
| p-Nitrobenzyl chloride | NO₂—C₆H₄—CH₂Cl |
| Benzyl bromide | C₆H₅—CH₂Br |
| p-Nitrobenzyl bromide | NO₂—C₆H₄—CH₂Br |
| Methylsulfonyl chloride | CH₃SO₂Cl |
| Ethylsulfonyl chloride | C₂H₅SO₂Cl |
| Benzenesulfonyl chloride | C₆H₅—SO₂Cl |
| p-Toluenesulfonyl chloride | CH₃—C₆H₄—SO₂Cl |
| p-Chlorobenzenesulfonyl chloride | Cl—C₆H₄—SO₂Cl |
| p-Nitrobenzenesulfonyl chloride | NO₂—C₆H₄—SO₂Cl |
| β-Naphthalenesulfonyl chloride | (naphthyl)—SO₂Cl |
| Butyl isocyanate | C₄H₉N=C=O |
| Ethyl isocyanate | C₂H₅N=C=O |
| Phenyl isocyanate | C₆H₅—N=C=O |
| Cyclohexyl isocyanate | C₆H₁₁—N=C=O |
| p-Methylphenyl isocyanate | CH₃—C₆H₄—N=C=O |
| α-Naphthyl isocyanate | (naphthyl)—N=C=O |
| β-Naphthyl isocyanate | (naphthyl)—N=C=O |
| Ethyl formimidate hydrochloride | H—C(=NH)—OC₂H₅·HCl |
| Methyl acetimidate hydrochloride | CH₃—C(=NH)—OCH₃·HCl |
| Methyl propioimidate hydrochloride | C₂H₅—C(=NH)—OCH₃·HCl |
| Methyl isobutyroimidate hydrochloride | (CH₃)₂CH—C(=NH)—OCH₃·HCl |
| Methyl valeroimidate hydrochloride | CH₃(CH₂)₃—C(=NH)—OCH₃·HCl |
| Methyl pelargoniimidate hydrochloride | CH₃(CH₂)₇—C(=NH)—OCH₃·HCl |
| Methyl 3-methylaminopropioimidate | CH₃NH(CH₂)₂—C(=NH)—OCH₃·2HCl |
| Methyl 3-aminobutyroimidate hydrochloride | H₂N(CH₂)₃—C(=NH)—OCH₃·2HCl |
| Methyl 3-dimethylaminopropioimidate hydrochloride | (CH₃)₂N(CH₂)₂—C(=NH)—OCH₃·2HCl |
| Methyl benzimidate hydrochloride | C₆H₅—C(=NH)—OCH₃·HCl |
| Methyl p-methoxybenzimidate hydrochloride | CH₃O—C₆H₄—C(=NH)—OCH₃·HCl |
| Methyl p-toluimidate hydrochloride | CH₃—C₆H₄—C(=NH)—OCH₃·HCl |
| Methyl m-nitrobenzimidate hydrochloride | NO₂—C₆H₄—C(=NH)—OCH₃·HCl |
| Methyl p-nitrobenzimidate hydrochloride | NO₂—C₆H₄—C(=NH)—OCH₃·HCl |
| Methyl phenylacetimidate hydrochloride | C₆H₅—CH₂—C(=NH)—OCH₃·HCl |
| Methyl m-toluimidate hydrochloride | CH₃—C₆H₄—C(=NH)—OCH₃·HCl |
| Methyl p-toluimidate hydrochloride | CH₃—C₆H₄—C(=NH)—OCH₃·HCl |
| Methyl p-bromophenylacetimidate hydrochloride | Br—C₆H₄—CH₂—C(=NH)—OCH₃·HCl |
| Methyl o-chlorophenylacetimidate hydrochloride | Cl—C₆H₄—CH₂—C(=NH)—OCH₃·HCl |
| Methyl p-chlorophenylacetimidate hydrochloride | Cl—C₆H₄—CH₂—C(=NH)—OCH₃·HCl |
| Methyl m-chlorophenylacetimidate hydrochloride | Cl—C₆H₄—CH₂—C(=NH)—OCH₃·HCl |
| Methyl p-nitrophenylacetimidate hydrochloride | NO₂—C₆H₄—CH₂—C(=NH)—OCH₃·HCl |
| Methyl cinnamoimidate hydrochloride | C₆H₅—CH=CH—C(=NH)—OCH₃·HCl |
| Methyl α-naphthylacetimidate hydrochloride | (naphthyl)—CH₂—C(=NH)—OCH₃·HCl |
| Acrylonitrile | CH₂=CHCN |

The process of the present invention is carried out in a solvent selected from the group consisting of water, alcohols such as methanol and ethanol, ketones such as acetone, and a mixture thereof. The solvent is suitably selected in consideration of the reagent used.

When alkyl halides such as ethyl iodide, acyl halides, alkylsulfonyl halides are used as a reagent, the reaction velocity is fast and the use of such compounds in excess causes not only the desired monosubstitution of the side chain terminal amino group of bleomycins but also the substitution of the intranuclear amino group and the di-substitution of the side-chain terminal amino group. Therefore, it is usually preferable to use these compounds in an amount of 1 to 1.5 mols per mol of bleomycins. However, less reactive reagents which do not cause side reactions may be used in an amount as much as about 10 mols per mol of bleomycins.

The reaction involved in the present invention is considered to be a nucleophilic substitution reaction of the terminal amino group of bleomycins and is preferably effected in an alkaline medium. For this purpose pyridine, sodium bicarbonate, triethylamine, etc. may be used. When imidate reagents are used, it is preferable to carry out the reaction at pH of 8.5 to 9.5 by the addition of the most strongly basic triethylamine. However, the reaction for a long period of time at pH of 10 or more should be avoided in view of the stability of bleomycins.

The reaction temperature may be generally 10° to 25°C. If a reagent used is less reactive, however, the reaction is preferably carried out at about 40°C. For example, sulfonylation with various sulfonyl compounds at room temperature is completed in about 1 to 4 hours.

For the separation of the desired product, the reaction liquid is neutralized to pH of 7 to 5 and, if necessary, is concentrated under reduced pressure. The thus treated reaction liquid is then passed through a column packed with CM-Sephadex C-25 (tradename for a dry insoluble powder composed of microscopic beads which are synthetic organic compounds containing carboxy methyl group derived from the polysaccharide dextran, manufactured and sold by Pharmacia Fine Chemicals, Inc.). The reaction product once adsorbed on the adsorbent is eluted with an aqueous salt solution such as ammonium chloride solution. The eluate fraction containing the desired product is passed through a column packed with active carbon or Amberlite CG-50 (tradename for an ion exchange resin manufactured and sold by Rohm and Haas Co.). The product once adsorbed on the absorbent is eluted with acetone-0.02 N hydrochloric acid (1 : 1 by volume) or methanol-0.02 N hydrochloric acid (1 : 1 by volume), concentrated and dried to obtain the desalted N-substituted derivative of a bleomycin.

Particularly, high molecular substituted derivatives such as 3-(N-lauroyl)aminopropylaminobleomycin are sparingly soluble in water. Therefore, in such a case, the reaction liquid shall be purified by chromatography using a gel filtration for organic solvents such as Sephadex LH-20 (tradename for dextran derivative using for gelfiltrant in organic solvent, manufactured by Pharmacia Fine Chemicals Inc.), the desalting procedure being unnecessary.

The formula, obtained amino-substituted derivatives are in the form of blue powder as the starting bleomycins. They have generally ultraviolet and infrared absorption spectra similar to those of the starting materials although the ultraviolet absorption spectra of the derivatives containing special chromophores such as

and

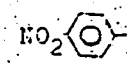

are different from those of the starting materials.

The products obtained by the process of the present invention were confirmed to be the derivatives, wherein their terminal amino group had been substituted, by the Rf value in thin layer chromatography, the fact that they were different in migration distance in electrophoresis from the starting materials, the fact that they were generally negative in ninhydrin reaction and the fact that a decrease in the content of amino nitrogen had been found by the van Slyke method.

According to the process of the present invention, the mono-substituted derivatives are obtained as a main product and a small amount of the di-substituted derivatives are also produced depending on the reaction conditions.

The properties of the N-substituted derivative hydrochlorides of bleomycins obtained according to the process of the present invention are summarized in the following Table 1.

Table 1

| No. | Reagent | Name of derivative | Structure of terminal chain |
|---|---|---|---|
| 1 | $CH_3CO$ \ O / $CH_3CO$ | 3-(N-Acetyl)aminopropyl-aminobleomycin | (a) $-NH(CH_2)_3NHCOCH_3$ |
| 2 | $C_2H_5CO$ \ O / $C_2H_5CO$ | 3-(N-Propionyl)-amino-propylaminobleomycin | (a) $-NH(CH_2)_3NHCOC_2H_5$ |
| 3 | $C_3H_7CO$ \ O / $C_3H_7CO$ | 3-(N-Butyryl)-amino-propylaminobleomycin | (a) $-NH(CH_2)_3NHCOC_3H_7$ |
| 4 | $C_7H_{15}CO$ \ O / $C_7H_{15}CO$ | 3-(N-Octanoyl)-amino-propylaminobleomycin | (a) $-NH(CH_2)_3NHCO(CH_2)_6CH_3$ |

| Ultraviolet absorption maximum (mμ) | TLc Rf (Starting bleomycin) | HVE mobility | Ninhydrin reaction | mcg Potency per mg |
|---|---|---|---|---|
| 243 | 0.80 | 0.80 | — | 460 |
| 292 | (0.64) | | | 120 |
| 243 | 0.87 | 0.72 | — | 900 |
| 292 | (0.66) | | | 180 |
| 240 | 0.86 | 0.71 | — | 1530 |
| 292 | (0.62) | | | 50 |
| 243 | 0.88 | 0.68 | — | 9600 |
| 292 | (0.68) | | | 1400 |

Infrared absorption wave number (cm⁻¹)

| | | | | | | |
|---|---|---|---|---|---|---|
| 3350 | 2920 | 1720 | 1640 | 1550 | 1457 | 1369 |
| 1090 | 1055 | 805 | 761 | | | |
| 3348 | 2917 | 1721 | 1642 | 1555 | 1452 | 1375 |
| 1085 | 1050 | 876 | 807 | 763 | | |
| 3345 | 2921 | 1722 | 1650 | 1552 | 1450 | 1370 |
| 1081 | 1051 | 806 | 760 | | | |
| 3350 | 2923 | 1721 | 1653 | 1549 | 1452 | 1370 |
| 1089 | 1053 | 805 | 760 | | | |

Table 1-continued

| No. | Reagent | Name of derivative | Structure of terminal chain |
|---|---|---|---|
| 5 | (C$_{11}$H$_{23}$CO)$_2$O | 3-(N-Lauroyl)-aminopropyl-aminobleomycin | (a) —NH(CH$_2$)$_3$NHCO(CH$_2$)$_{10}$CH$_3$ |
| 6 | (CH$_3$CH=CHCO)$_2$O | 3-(N-Crotonyl)-aminopropylaminobleomycin | (a) —NH(CH$_2$)$_3$NHCOCH=CHCH$_3$ |
| 7 | succinic anhydride | 3-(N-Succinyl)-aminopropylaminobleomycin | (a) —NH(CH$_2$)$_3$NHCO(CH$_2$)$_2$—COOH |
| 8 | maleic anhydride | 3-(N-Maleyl)-aminopropylaminobleomycin | (a) —NH(CH$_2$)$_3$NHCOCH=CH—COOH |
| 9 | (C$_6$H$_5$OCH$_2$CO)$_2$O | 3-(N-Phenoxyacetyl)-aminopropylaminobleomycin | (a) —NH(CH$_2$)$_3$NHCOCH$_2$O—C$_6$H$_5$ |

| | | | |
|---|---|---|---|
| 243 | 0.78 | | 7560 |
| | | 0.44 | — |
| 292 | (0.55) | | 61 |
| 243 | 0.87 | | 1850 |
| | | 0.75 | — |
| 292 | (0.62) | | 108 |
| 243 | 0.85 | | 101 |
| | | 0.73 | — |
| 292 | (0.62) | | 96 |
| 240 | 0.87 | | 88 |
| | | 0.73 | — |
| 292 | (0.62) | | 58 |
| 268 | 0.78 | | 3500 |
| 275 | | 0.76 | — |
| 292 | (0.57) | | 220 |

| | | | | | | |
|---|---|---|---|---|---|---|
| 3349 | 2922 | 1718 | 1651 | 1550 | 1453 | 1371 |
| 1091 | 1050 | 810 | 770 | | | |
| 3348 | 2918 | 1725 | 1645 | 1552 | 1450 | 1367 |
| 1095 | 1050 | 800 | 765 | | | |
| 3360 | 2922 | 1725 | 1645 | 1500 | 1460 | 1372 |
| 1095 | 1055 | 800 | 745 | | | |
| 3355 | 2920 | 1720 | 1650 | 1555 | 1451 | 1370 |
| 1090 | 1046 | 810 | 749 | | | |
| 3250 | 2880 | 1710 | 1635 | 1540 | 1450 | 1365 |
| 1090 | 1045 | 800 | 760 | | | |

| No. | Reagent | Name of derivative | Structure of terminal chain |
|---|---|---|---|
| 10 | (C$_6$H$_5$CO)$_2$O | 3-(N-Benzoyl)aminopropyl-aminobleomycin | (a) —NH(CH$_2$)$_3$NHCO—C$_6$H$_5$ |
| 11 | (nicotinoyl)$_2$O | 3-(N-Nicotinoyl)aminopropylaminobleomycin | (a) —NH(CH$_2$)$_3$NHCO—(pyridyl) |
| 12 | (ClCH$_2$CO)$_2$O | 3-(N-chloroacetyl)aminopropylaminobleomycin | (a) —NH(CH$_2$)$_3$NHCOCH$_2$Cl |
| 13 | (thenoyl)$_2$O | 3-(N-Thenoyl)aminopropylaminobleomycin | (a) —NH(CH$_2$)$_3$NHCO—(thienyl) |
| 14 | (furoyl)$_2$O | 3-(N-Furoyl)aminopropylaminobleomycin | (a) —NH(CH$_2$)$_3$NHCO—(furyl) |

| | | | |
|---|---|---|---|
| 238 | 0.76 | | 1800 |
| | | 0.77 | — |
| 295 | (0.57) | | 110 |
| 240 | | | |
| | 0.54 | | 2200 |
| 270 | | 1.10 | — |
| | (0.57) | | 760 |
| 292 | | | |
| 243 | 0.90 | | 760 |
| | | 0.70 | — |
| 292 | (0.62) | | 98 |
| 245 | 0.87 | | 2280 |
| | | 0.69 | — |
| 275 | (0.62) | | 107 |
| 292 | 0.82 | | 1780 |
| | | 0.68 | — |
| 247 | (0.61) | | 100 |

Table 1-continued

| No. | Reagent | Name of derivative | Structure of terminal chain |
|---|---|---|---|

| 3300 | 2860 | 1705 | 1630 | 1540 | 1450 | 1360 |
| 1085 | 1045 | 800 | 765 | | | |
| 3300 | 2900 | 1720 | 1640 | 1545 | 1455 | 1365 |
| 1099 | 1050 | 805 | 765 | | | |
| 3350 | 2920 | 1718 | 1636 | 1552 | 1455 | 1370 |
| 1088 | 1050 | 802 | 757 | | | |
| 3300 | 2925 | 1720 | 1640 | 1554 | 1455 | 1365 |
| 1080 | 1050 | 805 | 715 | | | |
| 3320 | 2900 | 1718 | 1650 | 1547 | 1450 | 1370 |
| 1100 | 1060 | 812 | 760 | | | |

| No. | Reagent | Name of derivative | Structure of terminal chain |
|---|---|---|---|
| 15 | (NO₂-⟨O⟩-CO)₂O | 3-(N-p-Nitrobenzoyl)amino-propylaminobleomycin | (a) —NH(CH₂)₃NHCO-⟨O⟩-NO₂ |
| 16 | ⟨O⟩(CO-)₂O (phthalic anhydride) | 3(N-o-Carboxybenzoyl)amino-propylaminobleomycin | (a) —NH(CH₂)₃NHCO-⟨O⟩ HOOC |
| 17 | C₂H₅Br | 3-(N-Ethyl)amino-propylaminobleomycin | (b) —NH(CH₂)₃NHC₂H₅ |
| 18 | ⟨O⟩-CH₂Br | 3-(N-Benzyl)amino-propylaminobleomycin | (b) —NH(CH₂)₃NHCH₂-⟨O⟩ |
| 19 | NO₂-⟨O⟩-CH₂Br | 3-(N-p-Nitrobenzyl)amino-propylaminobleomycin | (b) —NH(CH₂)₃NHCH₂-⟨O⟩-NO₂ |
| 20 | CH₃SO₂Cl | 3-(N-Methylsulfonyl)-aminopropylaminobleomycin | (a) —NH(CH₂)₃NHSO₂CH₃ |

| 246 | 0.84 | | 3880 |
| 285 | (0.62) | 0.67 — | 220 |
| 241 | 0.83 | | 332 |
| 291 | (0.64) | 0.79 — | 123 |
| 292 | 0.70 | | 1700 |
| 243 | (0.63) | 0.96 — | 2520 |
| 242.5 | 0.76 | | 5833 |
| 292.5 | (0.63) | 0.90 — | 230 |
| 246 | 0.69 | | 11800 |
| 280 | (0.63) | 0.95 — | 2760 |
| | 0.86 | | 501 |
| 292 | (0.62) | 0.73 — | 122 |

| 3320 | 2917 | 1727 | 1664 | 1550 | 1521 | 1460 |
| 1343 | 1090 | 1048 | 1000 | 858 | 760 | 717 |
| 3360 | 2924 | 1726 | 1640 | 1546 | 1460 | 1371 |
| 1085 | 1052 | 815 | 770 | | | |
| 3300 | 2918 | 1720 | 1638 | 1549 | 1450 | 1370 |
| 1087 | 1057 | 802 | 766 | | | |
| 3350 | 2930 | 1719 | 1650 | 1555 | 1455 | 1371 |
| 1090 | 1060 | 800 | 750 | | | |
| 3350 | 2925 | 1720 | 1650 | 1550 | 1518 | 1345 |
| 1460 | 1095 | 1050 | 1010 | 810 | 740 | |
| 3350 | 2940 | 1720 | 1640 | 1550 | 1460 | 1370 |
| 1305 | 1135 | 1090 | 1055 | 860 | 760 | |

| No. | Reagent | Name of derivative | Structure of terminal chain |
|---|---|---|---|
| 21 | ⟨O⟩-SO₂Cl | 3-(N-Benzenesulfonyl)-aminopropylaminobleomycin | (a) —NH(CH₂)₃NHSO₂-⟨O⟩ |
| 22 | CH₃-⟨O⟩-SO₂Cl | 3-(N-p-toluenesulfonyl)-aminopropylaminobleomycin | (a) —NH(CH₂)₃NHSO₂-⟨O⟩-CH₃ |
| 23 | Cl-⟨O⟩-SO₂Cl | 3-(N-p-Chlorobenzene-sulfonyl)aminopropyl-aminobleomycin | (a) —NH(CH₂)₃NHSO₂-⟨O⟩-Cl |
| 24 | ⟨OO⟩-SO₂Cl | 3-(N-β-naphthalene-sulfonyl)aminopropyl-aminobleomycin | (a) —NH(CH₂)₃NHSO₂-⟨OO⟩ |
| 25 | ⟨O⟩-N=C=O | 3-(N-Phenylcarbamoyl)-aminopropylaminobleomycin | (a) —NH(CH₂)₃NHCONH-⟨O⟩ |

| 240 | 0.92 | | 3500 |
| 265 | | 0.72 — | |
| 272 | (0.70) | | 230 |
| 295 | | | |
| 230 | 0.77 | | 8000 |
| | | 0.67 — | |
| 290 | (0.60) | | 140 |
| 232 | 0.86 | | 7010 |

3,922,262

Table 1-continued

| No. | Reagent | Name of derivative | Structure of terminal chain |
|-----|---------|-------------------|------------------------------|

| | | 0.63 | — | | |
|---|---|---|---|---|---|
| 292 | (0.71) | | | 121 | |
| 228 | 0.84 | | | 4350 | |
| | | 0.64 | — | | |
| 286 | (0.68) | | | 202 | |
| 244 | 0.79 | | | 3236 | |
| | | 0.81 | — | | |
| 283 | (0.63) | | | 225 | |

| | | | | | | |
|------|------|------|------|------|------|------|
| 3350 | 2920 | 1720 | 1665 | 1550 | 1450 | 1365 |
| 1315 | 1155 | 1090 | 1060 | 1010 | 805  | 760  |
| 3340 | 2920 | 1720 | 1640 | 1550 | 1450 | 1370 |
| 1320 | 1150 | 1091 | 1055 | 1009 | 812  | 765  |
| 3360 | 2950 | 1722 | 1641 | 1555 | 1459 | 1360 |
| 1320 | 1159 | 1093 | 1009 | 825  | 760  |      |
| 3390 | 2950 | 1725 | 1650 | 1552 | 1460 | 1370 |
| 1315 | 1152 | 1129 | 1060 | 1002 | 810  |      |
| 3350 | 2920 | 1718 | 1635 | 1548 | 1455 | 1370 |
| 1085 | 1050 | 801  | 760  |      |      |      |

| No. | Reagent | Name of derivative | Structure of terminal chain |
|-----|---------|-------------------|------------------------------|
| 26 | C₆H₁₁—N=C=O | 3-(N-Cyclohexylcarbamoyl)-aminopropylaminobleomycin | (a) —NH(CH₂)₃NHCONH—C₆H₁₁ |
| 27 | HCOC₂H₅ ‖ NH·HCl | 3-(N-Formimidoyl)-aminopropylaminobleomycin | (b) —NH(CH₂)₃NHCH ‖ NH |
| 28 | CH₃COCH₃ ‖ NH·HCl | 3-(N-Acetimidoyl)-aminopropylaminobleomycin | (b) —NH(CH₂)₃NHCCH₃ ‖ NH |
| 29 | C₂H₅COCH₃ ‖ NH·HCl | 3-(N-Propioimidoyl)-aminopropylaminobleomycin | (b) —NH(CH₂)₃NHCC₂H₅ ‖ NH |
| 30 | C₄H₉COCH₃ ‖ NH·HCl | 3-(N-Valeroimidoyl)-aminopropylaminobleomycin | (b) —NH(CH₂)₃NHCC₄H₉ ‖ NH |

| | | | | | |
|---|---|---|---|---|---|
| 243 | 0.78 | | | 8750 | |
| | | 0.81 | — | | |
| 292 | (0.63) | | | 321 | |
| 242 | 0.58 | | | 272 | |
| | | 0.76 | — | | |
| 292 | (0.46) | | | 74 | |
| 243 | 0.65 | | | 1867 | |
| | | 0.96 | — | | |
| 292 | (0.63) | | | 1080 | |
| 243 | 0.50 | | | 2252 | |
| | | 0.94 | — | | |
| 292 | (0.46) | | | 986 | |
| 243 | 0.78 | | | 6531 | |
| | | 0.92 | — | | |
| 292 | (0.67) | | | 1157 | |

| | | | | | |
|------|------|------|------|------|------|
| 3370 | 2910 | 1715 | 1640 | 1545 | 1450 | 1368 |
| 1088 | 1052 | 805  | 762  |      |      |      |
| 3340 | 2900 | 1715 | 1642 | 1552 | 1450 | 1368 |
| 1092 | 1056 | 800  | 763  |      |      |      |
| 3345 | 2922 | 1725 | 1645 | 1548 | 1460 | 1367 |
| 1087 | 1049 | 807  | 762  |      |      |      |
| 3352 | 2917 | 1715 | 1638 | 1542 | 1456 | 1371 |
| 1092 | 1060 | 802  | 759  |      |      |      |
| 3330 | 2900 | 1705 | 1640 | 1550 | 1456 | 1372 |
| 1095 | 1060 | 800  | 757  |      |      |      |

| No. | Reagent | Name of derivative | Structure of terminal chain |
|-----|---------|-------------------|------------------------------|
| 31 | C₈H₁₇COCH₃ ‖ NH·HCl | 3-(N-Pelargonimidoyl)-aminopropylaminobleomycin | (b) —NH(CH₂)₃NHC(CH₂)₇CH₃ ‖ NH |
| 32 | C₆H₅—COCH₃ ‖ NH·HCl | 3-(N-Benzimidoyl)-aminopropylaminobleomycin | (b) —NH(CH₂)₃NHC—C₆H₅ ‖ NH |
| 33 | CH₃O—C₆H₄—COCH₃ ‖ NH·HCl | 3-(N-p-methoxybenzimidoyl)-aminopropylaminobleomycin | (b) —NH(CH₂)₃NHC—C₆H₄—OCH₃ ‖ NH |
| 34 | CH₃—C₆H₄—COCH₃ ‖ NH·HCl | 3-(N-p-Toluimidoyl)-aminopropylaminobleomycin | (b) —NH(CH₂)₃NHC—C₆H₄—CH₃ ‖ NH |
| 35 | m-CH₃—C₆H₄—COCH₃ ‖ NH·HCl | 3-(N-m-Toluimidoyl)-aminopropylaminobleomycin | (b) —NH(CH₂)₃NHC—C₆H₄—CH₃(m) ‖ NH |

| | | | | | |
|---|---|---|---|---|---|
| 242.5 | 0.59 | | | 29370 | |
| | | 0.86 | — | | |
| 292 | (0.46) | | | 1443 | |
| | 0.80 | | | 4423 | |
| 292 | | 0.91 | — | | |
| | (0.67) | | | 963 | |
| | 0.60 | | | 5230 | |

3,922,262

Table 1-continued

| No. | Reagent | Name of derivative | Structure of terminal chain |
|---|---|---|---|
| 247 | (0.46) 0.76 | 0.90 — | 839 |
| 241 | | 0.90 — | 7692 |
| 296 | (0.65) 0.79 | | 786 |
| 290 | | 0.90 — | 5956 789 |

| | | | | | | |
|---|---|---|---|---|---|---|
| 3370 1100 | 2924 1060 | 1718 798 | 1642 765 | 1555 | 1461 | 1370 |
| 3350 1100 | 2920 1054 | 1725 803 | 1638 760 | 1545 | 1456 | 1370 |
| 3348 1092 | 2922 1050 | 1726 800 | 1640 760 | 1547 | 1455 | 1371 |
| 3350 1089 | 2900 1056 | 1724 805 | 1642 770 | 1550 | 1461 | 1367 |
| 3370 1086 | 2918 1052 | 1720 800 | 1641 760 | 1551 | 1450 | 1372 |

| No. | Reagent | Name of derivative | Structure of terminal chain |
|---|---|---|---|
| 36 | (m-NO₂-C₆H₄)-COCH₃ / NH·HCl | 3-(N-m-Nitrobenzimidoyl)-aminopropylaminobleomycin | (b) —NH(CH₂)₃NHC(=NH)-(m-NO₂-C₆H₄) |
| 37 | C₆H₅-CH₂COCH₃ / NH·HCl | 3-(N-Phenylacetimidoyl)-aminopropylaminobleomycin | (b) —NH(CH₂)₃NHC(=NH)CH₂-C₆H₅ |
| 38 | Cl-C₆H₄-CH₂COCH₃ / NH·HCl | 3-(N-p-Chlorophenyl-acetimidoyl)amino-propylaminobleomycin | (b) —NH(CH₂)₃NHC(=NH)CH₂-C₆H₄-Cl |
| 39 | C₆H₅-CH=CH-COCH₃ / NH·HCl | 3-(N-Cinnamoimidoyl)-aminopropylaminobleomycin | (b) —NH(CH₂)₃NHC(=NH)CH=CH-C₆H₅ |
| 40 | α-Naphthyl-CH₂COCH₃ / NH·HCl | 3-(N-α-Naphthylacetimidoyl)-aminopropylaminobleomycin | (b) —NH(CH₂)₃NHC(=NH)CH₂-α-Naphthyl |

| | | | |
|---|---|---|---|
| 287 | 0.76 (0.68) | 0.91 — | 5790 1676 |
| 243 | 0.76 | 0.95 — | 6875 1987 |
| 292.5 242.5 | (0.63) 0.75 | 0.93 — | 14975 1629 |
| 293 245 | (0.63) 0.60 | 0.90 — | 9900 843 |
| 288 291 | (0.46) 0.55 | 0.85 — | 10170 1119 |
| 300 | (0.46) | | |

| | | | | | | | |
|---|---|---|---|---|---|---|---|
| 3325 1095 | 2915 1055 | 1725 1002 | 1639 803 | 1550 760 | 1530 | 1461 | 1349 |
| 3350 1088 | 2915 1050 | 1730 805 | 1640 765 | 1545 | 1455 | 1370 | |
| 3352 1088 | 2918 1050 | 1722 800 | 1645 763 | 1552 | 1460 | 1370 | |
| 3352 1080 | 2921 1050 | 1720 804 | 1638 760 | 1547 | 1455 | 1370 | |
| 3350 1100 | 2925 1050 | 1728 800 | 1640 758 | 1550 | 1458 | 1372 | |

| No. | Reagent | Name of derivative | Structure of terminal chain |
|---|---|---|---|
| 41 | (CH₃)₂N(CH₂)₂COCH₃ / NH·HCl | 3-(N-3-Dimethylamino-propioimidoyl)amino-propylaminobleomycin | (b) —NH(CH₂)₃NHC(=NH)(CH₂)₂N(CH₃)₂ |
| 42 | CH₂=CHCN | 3-(N-Cyanoethyl)amino-propylaminobleomycin | (b) —NH(CH₂)₃NHC(=NH)(CH₂)₂CN |
| 43 | (CH₃CO)₂O | N-Acetylbleomycin A₅ | (b) —NH(CH₂)₃NH(CH₂)₄NHCOCH₃ |
| 44 | (CH₃CO)₂O | N-Acetylbleomycin A₅ | (e) —NH(CH₂)₃NH(CH₂)₄NHCOCH₃ |
| 45 | (C₂H₅CO)₂O | N-Propionylbleomycin A₅ | (b) —NH(CH₂)₃NH(CH₂)₄NHCOC₂H₅ |
| 46 | (C₃H₇CO)₂O | N-Butyrylbleomycin A₅ | (b) —NH(CH₂)₃NH(CH₂)₄NHCOC₃H₇ |

| | | | |
|---|---|---|---|
| 243 | 0.33 | 1.18 — | 1896 |
| 292 | (0.68) | | 5145 |
| 242 | 0.78 | | 1081 |

3,922,262

Table 1-continued

| No. | Reagent | | Name of derivative | | | | | Structure of terminal chain |
|---|---|---|---|---|---|---|---|---|
| 291 | (0.65) | | 0.99 | + | | 765 | | |
| 243 | 0.64 | | | | | 1400 | | |
| 292 | (0.21) | | 0.77 | − | | 340 | | |
| 243 | 0.53 | | | | | 1400 | | |
| 292 | (0.21) | | 0.89 | − | | 340 | | |
| 243 | 0.66 | | | | | 2000 | | |
| 292 | (0.21) | | 0.78 | − | | 880 | | |
| 243 | 0.66 | | | | | 3900 | | |
| 292 | (0.21) | | 0.82 | − | | 780 | | |
| | 3360 | 2925 | 1720 | 1641 | 1547 | 1455 | 1371 | |
| | 1090 | 1056 | 810 | 765 | | | | |
| | 3348 | 2920 | 1718 | 1639 | 1549 | 1457 | 1370 | |
| | 1088 | 1055 | 804 | 760 | | | | |
| | 3360 | 2920 | 1725 | 1645 | 1555 | 1460 | 1372 | |
| | 1095 | 1057 | 805 | 761 | | | | |
| | 3361 | 2919 | 1724 | 1645 | 1553 | 1462 | 1373 | |
| | 1096 | 1057 | 802 | 759 | | | | |
| | 3355 | 2922 | 1718 | 1645 | 1552 | 1461 | 1370 | |
| | 1085 | 1057 | 1005 | 800 | 760 | | | |
| | 3370 | 2925 | 1730 | 1641 | 1557 | 1460 | 1370 | |
| | 1085 | 1050 | 810 | 765 | | | | |

| No. | Reagent | Name of derivative | | Structure of terminal chain |
|---|---|---|---|---|
| 47 | $CH_3(CH_2)_6CO$\O / $CH_3(CH_2)_6CO$ | N-Octanoylbleomycin $A_5$ | (b) | $-NH(CH_2)_3NH(CH_2)_4NHCO(CH_2)_6CH_3$ |
| 48 | $CH_3CH=CHCO$\O / $CH_3CH=CHCO$ | N-Crotonylbleomycin $A_5$ | (b) | $-NH(CH_2)_3NH(CH_2)_4NHCOCH=CHCH_3$ |
| 49 | $CH_2-CO$\O / $CH_2-CO$ | N-Succinylbleomycin $A_5$ | (b) | $-NH(CH_2)_3NH(CH_2)_4NHCO-(CH_2)_2COOH$ |
| 50 | $CH_2-CO$\O / $CH_2-CO$ | N-Succinylbleomycin $A_3$ | (e) | $-NH(CH_2)_3NH(CH_2)_4NHCO-(CH_2)_2COOH$ |
| 51 | $CH_2-CO$\O / $CH_2-CO$ | N-Succinylbleomycin $A_5$ | (d) | $-NH(CH_2)_3NH(CH_2)_4NHCO-(CH_2)_2COOH$ |
| 52 | $CHCO$\O / $CHCO$ | N-Maleylbleomycin $A_5$ | (b) | $-NH(CH_2)_3NH(CH_2)_4NHCO-CH=CHCOOH$ |

| No. | Reagent | | | | | | | |
|---|---|---|---|---|---|---|---|---|
| 243 | 0.73 | | | | | 17200 | | |
| | | | 0.74 | − | | | | |
| 292 | (0.23) | | | | | 2980 | | |
| 243 | 0.70 | | | | | 4300 | | |
| | | | 0.78 | − | | | | |
| 292 | (0.21) | | | | | 840 | | |
| 243 | 0.62 | | | | | 200 | | |
| | | | 0.79 | − | | | | |
| 292 | (0.21) | | | | | 225 | | |
| 243 | 0.54 | | | | | 200 | | |
| | | | 0.93 | − | | | | |
| 292 | (0.21) | | | | | 225 | | |
| 243 | 0.62 | | | | | 200 | | |
| | | | 0.80 | − | | | | |
| 292 | (0.21) | | | | | 227 | | |
| 243 | 0.66 | | | | | 235 | | |
| | | | 0.75 | − | | | | |
| 292 | (0.22) | | | | | 600 | | |
| | 3400 | 2931 | 1724 | 1638 | 1547 | 1455 | 1371 | |
| | 1085 | 1052 | 800 | 762 | | | | |
| | 3390 | 2920 | 1730 | 1640 | 1555 | 1461 | 1367 | |
| | 1092 | 1050 | 800 | 757 | | | | |
| | | 2925 | 1725 | 1642 | 1550 | 1451 | 1370 | |
| | 3370 | | | | | | | |
| | 1005 | 1050 | 800 | | | | | |
| | 3370 | 2925 | 1724 | 1643 | 1551 | 1451 | 1370 | |
| | 1002 | 1050 | 801 | | | | | |
| | 3369 | 2926 | 1725 | 1641 | 1551 | 1450 | 1370 | |
| | 1052 | 1004 | 801 | | | | | |
| | 3371 | 2920 | 1728 | 1650 | 1545 | 1467 | 1372 | |
| | 1095 | 1057 | 795 | 761 | | | | |

| No. | Reagent | Name of derivative | | Structure of terminal chain |
|---|---|---|---|---|
| 53 | (Ph)-$OCH_2CO$\O / (Ph)-$OCH_2CO$ | N-Phenoxyacetylbleomycin $A_5$ | (b) | $-NH(CH_2)_3NH(CH_2)_4NHCO-CH_2-O-$(Ph) |

Table 1-continued

| No. | Reagent | Name of derivative | Structure of terminal chain |
|---|---|---|---|
| 54 | (PhCO)₂O (dibenzoyl) | N-Benzoylbleomycin A₅ | (b) $-NH(CH_2)_3NH(CH_2)_4NHCO-C_6H_5$ |
| 55 | (p-NO₂-C₆H₄CO)₂O | N-(p-Nitrobenzoyl)bleomycin A₅ | (b) $-NH(CH_2)_3NH(CH_2)_4NHCO-C_6H_4-NO_2$ |
| 56 | Adipic anhydride: CH₂—CO / (CH₂)₂—CH₂—CO \ O | N-Adipinylbleomycin A₅ | (b) $-NH(CH_2)_3NH(CH_2)_4CO(CH_2)_4COOH$ |
| 57 | $-NH(CH_2)_3NH(CH_2)_4-NHCOCH=CH-C_6H_5$ | N-Cinnamoylbleomycin A₅ | (b) $-NH(CH_2)_3NH(CH_2)_4NHCOCH=CH-C_6H_5$ |

| 268 | 0.65 |  | 8500 |
| 275 |  | 0.76 — |  |
| 292 | (0.21) |  | 615 |
| 235 | 0.70 |  | 5100 |
|  |  | 0.70 — |  |
| 292 | (0.21) |  | 680 |
| 247 | 0.60 |  | 16000 |
|  |  | 0.76 — |  |
| 280 | (0.23) |  | 2300 |
| 243 | 0.76 |  | 134 |
|  |  | 0.77 — |  |
| 292 | (0.25) |  | 45 |
| 247 | 0.54 |  | 14344 |
|  |  | 0.80 — |  |
| 280 | (0.24) |  | 773 |

| 3260 | 2880 | 1712 | 1637 | 1540 | 1452 | 1365 |
| 1087 | 1045 | 800 | 762 |  |  |  |
| 3300 | 2900 | 1705 | 1628 | 1540 | 1450 | 1362 |
| 1090 | 1046 | 802 | 767 |  |  |  |
| 3320 | 2917 | 1725 | 1660 | 1550 | 1520 | 1462 |
| 1345 | 1095 | 1050 | 1003 | 860 | 762 | 715 |
| 3350 | 2920 | 1715 | 1648 | 1550 | 1455 | 1370 |
| 1098 | 1048 | 805 | 760 |  |  |  |
| 3310 | 2870 | 1700 | 1630 | 1545 | 1460 | 1360 |
| 1080 | 1045 | 800 | 760 |  |  |  |

| No. | Reagent | Name of derivative | Structure of terminal chain |
|---|---|---|---|
| 58 | (Nicotinoyl)₂O | N-Nicotinoylbleomycin A₅ | (b) $-NH(CH_2)_3NH(CH_2)_4NHCO$-(3-pyridyl) |
| 59 | (Isonicotinoyl)₂O | N-Isonicotinoylbleomycin A₅ | (b) $-NH(CH_2)_3NH(CH_2)_4NHCO$-(4-pyridyl) |
| 60 | (ClCH₂CO)₂O | N-Chloroacetylbleomycin A₅ | (b) $-NH(CH_2)_3NH(CH_2)_4NHCO-CH_2Cl$ |
| 61 | (2-furoyl)₂O | N-(2-Froyl)bleomycin A₅ | (b) $-NH(CH_2)_3NH(CH_2)_4NHCO$-(2-furyl) |
| 62 | (2-thenoyl)₂O | N-(2-Thenoyl)bleomycin A₅ | (b) $-NH(CH_2)_3NH(CH_2)_4NHCO$-(2-thienyl) |

| 240 | 0.68 |  | 2800 |
|  |  | 0.92 — |  |
|  | (0.23) |  | 960 |
| 292 |  |  |  |
| 243 | 0.69 |  | 2700 |
|  |  | 0.92 — |  |
| 292 | (0.23) |  | 1000 |
| 243 | 0.74 |  | 2000 |
|  |  | 0.77 — |  |
| 292 | (0.23) |  | 960 |
| 248 | 0.65 |  | 4230 |
|  |  | 0.74 — |  |
| 292 | (0.21) |  | 1090 |
| 245 | 0.71 |  | 6090 |
|  |  | 0.78 — |  |
| 275 | (0.22) |  | 1110 |

| 3300 | 2905 | 1718 | 1642 | 1547 | 1450 | 1370 |
| 1100 | 1052 | 800 | 760 |  |  |  |

Table 1-continued

| No. | Reagent | Name of derivative | Structure of terminal chain |
|---|---|---|---|

| 3340 | 2900 | 1720 | 1640 | 1551 | 1452 | 1370 |
| 1100 | 1051 | 793 | 762 | | | |
| 3345 | 2915 | 1721 | 1642 | 1560 | 1460 | 1372 |
| 1095 | 1060 | 800 | 765 | | | |
| 3390 | 2927 | 1727 | 1642 | 1547 | 1462 | 1372 |
| 1095 | 1060 | 803 | 763 | | | |
| 3380 | 2920 | 1725 | 1640 | 1540 | 1450 | 1366 |
| 1095 | 1050 | 795 | | | | |

| 63 | $CH_3(CH_2)_{10}CO$—O, $CH_3(CH_2)_{10}CO$ | N-Lauroylbleomycin $A_5$ | (b) —$NH(CH_2)_3NH(CH_2)_4NHCO$—$(CH_2)_{10}CH_3$ |
| 64 | 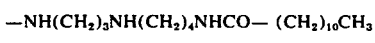 | N-Phthalylbleomycin $A_5$ | (b) —$NH(CH_2)_3NH(CH_2)_4NHCO$—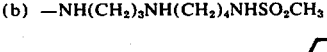  HOOC |
| 65 | 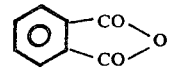 | N-4-Nitrophthalyl-bleomycin $A_5$ | (b) —$NH(CH_2)_3NH(CH_2)_4NHCO$—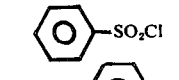—$NO_2$  HOOC |
| 66 | $C_2H_5Br$ | N-Ethylbleomycin $A_5$ | (c) —$NH(CH_2)_3NH(CH_2)_4NHC_2H_5$ |
| 67 | $CH_2=CHCH_2Br$ | N-Allylbleomycin $A_5$ | (c) —$NH(CH_2)_3NH(CH_2)_4NHCH_2$—$CH=CH_2$ |

| 243 | 0.70 | | | 5700 | | |
| | | 0.67 | — | | | |
| 292 | (0.18) | | | 1140 | | |
| 237 | 0.71 | | | 710 | | |
| | | 0.73 | — | | | |
| 292 | (0.24) | | | 2800 | | |
| | 0.64 | | | 390 | | |
| 238 | | 0.67 | — | | | |
| | (0.25) | | | 120 | | |
| 248 | 0.31 | | | 3300 | | |
| | | 0.98 | + | | | |
| 292 | (0.21) | | | 7500 | | |
| 243 | 0.33 | | | 3450 | | |
| | | 0.95 | + | | | |
| 292 | (0.21) | | | 8410 | | |

| 3380 | 2931 | 1725 | 1645 | 1541 | 1452 | 1370 |
| 1095 | 1050 | 810 | 764 | | | |
| 3365 | 2920 | 1720 | 1642 | 1547 | 1455 | 1372 |
| 1085 | 1054 | 812 | 767 | | | |
| 3370 | 2920 | 1721 | 1645 | 1555 | 1455 | 1350 |
| 1130 | 1092 | 1050 | 1005 | 705 | | |
| 3348 | 2925 | 1717 | 1645 | 1553 | 1460 | 1372 |
| 1100 | 1060 | 803 | 760 | | | |
| 3375 | 2930 | 1726 | 1639 | 1560 | 1455 | 1365 |
| 1100 | 1052 | 800 | | | | |

| 68 | $NO_2$—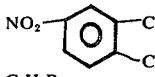—$CH_2Br$ | N-(p-Nitrobenzyl)bleomycin $A_5$ | (c) —$NH(CH_2)_3NH(CH_2)_4NHCH_2$—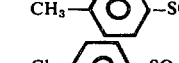—$NO_2$ |
| 69 | $CH_3SO_2Cl$ | N-(Methylsulfonyl)bleomycin $A_5$ | (b) —$NH(CH_2)_3NH(CH_2)_4NHSO_2CH_3$ |
| 70 | 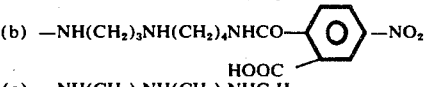—$SO_2Cl$ | N-(Benzenesulfonyl)-bleomycin $A_5$ | (b) —$NH(CH_2)_3NH(CH_2)_4NHSO_2$—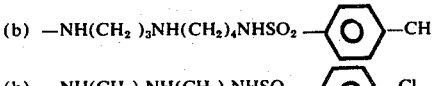 |
| 71 | $CH_3$—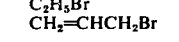—$SO_2Cl$ | N-(p-Toluenesulfonyl)-bleomycin $A_5$ | (b) —$NH(CH_2)_3NH(CH_2)_4NHSO_2$——$CH_3$ |
| 72 | $Cl$—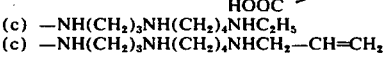—$SO_2Cl$ | N-(p-Chlorobenzenesulfonyl)-bleomycin $A_5$ | (b) —$NH(CH_2)_3NH(CH_2)_4NHSO_2$—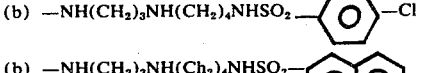—$Cl$ |
| 73 | 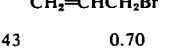—$SO_2Cl$ | N-(β-Naphthalenesulfonyl)-bleomycin $A_5$ | (b) —$NH(CH_2)_3NH(CH_2)_4NHSO_2$— |

| 246 | 0.59 | | | 6950 | | |
| | | 0.93 | + | | | |
| 280 | (0.21) | | | 3885 | | |
| 243 | 0.63 | | | 1670 | | |
| | | 0.82 | + | | | |
| 292 | (0.23) | | | 680 | | |
| 240 | 0.86 | | | 6400 | | |
| | | 0.78 | + | | | |
| 295 | (0.22) | | | 830 | | |
| 232 | 0.76 | | | 19000 | | |
| | | 0.73 | + | | | |
| 293 | (0.24) | | | 1500 | | |
| 230 | 0.84 | | | 23000 | | |
| | | 0.75 | + | | | |
| 295 | (0.24) | | | 1400 | | |
| 230 | 0.75 | | | 26000 | | |
| | | 0.71 | + | | | |
| 283 | (0.24) | | | 1500 | | |

| 3390 | 2931 | 1720 | 1650 | 1547 | 1520 | 1350 |
| 1462 | 1100 | 1055 | 1012 | 810 | 741 | |

Table 1-continued

| No. | Reagent | Name of derivative | Structure of terminal chain |
|---|---|---|---|

| 3345 | 2950 | 1720 | 1655 | 1550 | 1460 | 1347 |
| 1305 | 1100 | 1140 | 1050 | 856 | 760 | |
| 3350 | 2925 | 1721 | 1660 | 1547 | 1450 | 1365 |
| 1310 | 1138 | 1089 | 1045 | 1005 | 805 | 755 |
| 3340 | 2920 | 1725 | 1645 | 1546 | 1450 | 1360 |
| 1318 | 1150 | 1095 | 1052 | 1008 | 810 | 765 |
| 3360 | 2948 | 1721 | 1643 | 1555 | 1454 | 1360 |
| 1320 | 1160 | 1090 | 1006 | 825 | 764 | |
| 3400 | 2930 | 1725 | 1647 | 1550 | 1462 | 1370 |
| 1318 | 1150 | 1127 | 1055 | 1000 | 810 | |

| No. | Reagent | Name of derivative | Structure of terminal chain |
|---|---|---|---|
| 74 | $C_2H_5N=C=O$ | N-(Ethylcarbamoyl)-bleomycin $A_5$ | (b) $-NH(CH_2)_3NH(CH_2)_4NHCONHC_2H_5$ |
| 75 | ⟨phenyl⟩-N=C=O | N-(Phenylcarbamoyl)-bleomycin $A_5$ | (b) $-NH(CH_2)_3NH(CH_2)_4NHCONH-$⟨phenyl⟩ |
| 76 | ⟨cyclohexyl⟩-N=C=O | N-(Cyclohexylcarbamoyl)-bleomycin $A_5$ | (b) $-NH(CH_2)_3NH(CH_2)_4NHCONH-$⟨cyclohexyl⟩ |
| 77 | ⟨naphthyl⟩-N=C=O | N-(α-Naphthylcarbamoyl)-bleomycin $A_5$ | (b) $-NH(CH_2)_3NH(CH_2)_4NHCONH-$⟨naphthyl⟩ |
| 78 | $\underset{NH\cdot HCl}{HCOC_2H_5}$ | N-(Formimidoyl)-bleomycin $A_5$ | (c) $-NH(CH_2)_3NH(CH_2)_4NH-\underset{NH}{\overset{\|}{C}}-H$ |

| 243 | 0.73 | | | 2388 |
| | | 0.79 | + | |
| 292 | (0.22) | | | 896 |
| 244 | 0.63 | | | 4775 |
| | | 0.77 | + | |
| 287.5 | (0.19) | | | 1100 |
| 243 | 0.75 | | | 13560 |
| | | 0.75 | + | |
| 292 | (0.22) | | | 1160 |
| 290 | 0.82 | | | 3550 |
| | | 0.37 | − | |
| | (0.19) | | | 608 |
| 243 | 0.5 | | | 11229 |
| | | 0.81 | − | |
| 292 | (0.24) | | | 866 |

| 3361 | 2925 | 1721 | 1640 | 1547 | 1452 | 1368 |
| 1091 | 1052 | 810 | 760 | | | |
| 3346 | 2921 | 1718 | 1640 | 1548 | 1460 | 1370 |
| 1091 | 1059 | 805 | 764 | | | |
| 3350 | 2940 | 1725 | 1651 | 1550 | 1450 | 1379 |
| 1095 | 1058 | 807 | 763 | | | |
| 3391 | 2948 | 1730 | 1655 | 1550 | 1462 | 1375 |
| 1320 | 1150 | 1130 | 1060 | 1001 | 810 | |
| 3400 | 2940 | 1719 | 1643 | 1547 | 1452 | 1371 |
| 1101 | 1050 | 800 | 760 | | | |

| No. | Reagent | Name of derivative | Structure of terminal chain |
|---|---|---|---|
| 79 | $\underset{NH\cdot HCl}{CH_3\overset{\|}{C}OCH_3}$ | N-(Acetimidoyl)-bleomycin $A_5$ | (c) $-NH(CH_2)_3NH(CH_2)_4NH-\underset{NH}{\overset{\|}{C}}-CH_3$ |
| 80 | $\underset{NH\cdot HCl}{C_2H_5\overset{\|}{C}OCH_3}$ | N-(Propioimidoyl)-bleomycin $A_5$ | (c) $-NH(CH_2)_3NH(CH_2)_4NH-\underset{NH}{\overset{\|}{C}}-C_2H_5$ |
| 81 | $\underset{CH_3}{\overset{CH_3}{\diagdown}}CHCOCH_3$ $\underset{NH\cdot HCl}{\|}$ | N-(Isobutyroimidoyl)-bleomycin $A_5$ | (c) $-NH(CH_2)_3NH(CH_2)_4NH-\underset{NH}{\overset{\|}{C}}-CH\underset{CH_3}{\overset{CH_3}{\diagup}}$ |
| 82 | $\underset{NH\cdot HCl}{CH_3(CH_2)_3\overset{\|}{C}OCH_3}$ | N-(Valeroimidoyl)-bleomycin $A_5$ | (c) $-NH(CH_2)_3NH(CH_2)_4NH\underset{NH}{\overset{\|}{C}}(CH_2)_3CH_3$ |
| 83 | $\underset{NH\cdot HCl}{CH_3(CH_2)_7\overset{\|}{C}OCH_3}$ | N-(Pelargonimidoyl)-bleomycin $A_5$ | (c) $-NH(CH_2)_3NH(CH_2)_4NH\underset{NH}{\overset{\|}{C}}(CH_2)_7CH_3$ |

| 243 | 0.27 | | | 3100 |
| | | 0.91 | − | |
| 292 | (0.22) | | | 7425 |
| 243 | 0.36 | | | 3186 |
| | | 0.92 | − | |
| 292 | (0.22) | | | 19500 |
| 243 | 0.33 | | | 3725 |
| | | 0.93 | − | |
| 292 | (0.22) | | | 17640 |
| 243 | 0.43 | | | 10180 |
| | | 0.95 | − | |
| 292 | (0.22) | | | 15870 |
| 243 | 0.49 | | | 25500 |
| | | 0.90 | − | |
| 292 | (0.19) | | | 8950 |

Table 1-continued

| No. | Reagent | Name of derivative | Structure of terminal chain |
|---|---|---|---|

| 3390 | 2927 | 1725 | 1642 | 1555 | 1453 | 1381 |
| 1090 | 1049 | 805 | 757 | | | |
| 3382 | 2926 | 1720 | 1651 | 1548 | 1451 | 1365 |
| 1092 | 1047 | 807 | 763 | | | |
| 3405 | 2927 | 1723 | 1649 | 1539 | 1453 | 1371 |
| 1090 | 1049 | 812 | 767 | | | |
| 3390 | 2920 | 1725 | 1650 | 1541 | 1455 | 1374 |
| 1092 | 1052 | 807 | 759 | | | |
| 3371 | 2924 | 1720 | 1647 | 1543 | 1450 | 1375 |
| 1097 | 1055 | 804 | 760 | | | |

| 84 | Ph-C(=NH·HCl)-COCH$_3$ | N-(Benzimidoyl)-bleomycin A$_5$ | (c) —NH(CH$_2$)$_3$NH(CH$_2$)$_4$NH—C(=NH)—Ph |
| 85 | CH$_3$O-Ph-C(=NH·HCl)-COCH$_3$ | N-(p-Methoxybenzimidoyl)-bleomycin A$_5$ | (c) —NH(CH$_2$)$_3$NH(CH$_2$)$_4$NHC(=NH)—Ph—OCH$_3$ |
| 86 | CH$_3$-Ph-C(=NH·HCl)-COCH$_3$ | N-(p-Toluimidoyl)-bleomycin A$_5$ | (c) —NH(CH$_2$)$_3$NH(CH$_2$)$_4$NHC(=NH)—Ph—CH$_3$ |
| 87 | m-CH$_3$-Ph-C(=NH·HCl)-COCH$_3$ | N-(m-Toluimidoyl)-bleomycin A$_5$ | (c) —NH(CH$_2$)$_3$NH(CH$_2$)$_4$NHC(=NH)—Ph-CH$_3$ |
| 88 | m-NO$_2$-Ph-C(=NH·HCl)-COCH$_3$ | N-(m-Nitrobenzimidoyl)-bleomycin A$_5$ | (c) —NH(CH$_2$)$_3$NH(CH$_2$)$_4$NH—C(=NH)—Ph-NO$_2$ |

| 235(S) | 0.39 | | 5199 |
| | | 0.94 | — |
| 292 | (0.22) | | 12900 |
| 248 | 0.45 | | 6500 |
| | | 0.97 | — |
| 292 | (0.22) | | 9265 |
| 240 | 0.43 | | 11890 |
| | | 0.88 | — |
| 292 | (0.23) | | 10462 |
| 235(S) | 0.42 | | 10876 |
| | | 0.89 | — |
| 291 | (0.18) | | 13330 |
| 243 | 0.32 | | 9750 |
| | | 0.87 | — |
| 288 | (0.22) | | 17612 |

| 3355 | 2925 | 1721 | 1642 | 1547 | 1455 | 1372 |
| 1088 | 1050 | 807 | 763 | | | |
| 3410 | 2918 | 1725 | 1650 | 1551 | 1462 | 1367 |
| 1095 | 1060 | 808 | 765 | | | |
| 3370 | 2926 | 1721 | 1653 | 1552 | 1453 | 1370 |
| 1082 | 1056 | 800 | 764 | | | |
| 3371 | 2920 | 1720 | 1640 | 1550 | 1450 | 1366 |
| 1097 | 1056 | 804 | 763 | | | |
| 3355 | 2921 | 1725 | 1643 | 1530 | 1460 | 1350 |
| 1090 | 1050 | 1005 | 802 | 760 | 705 | |

| 89 | Ph-CH$_2$C(=NH·HCl)-OCH$_3$ | N-(Phenylacetimidoyl)-bleomycin A$_5$ | (c) —NH(CH$_2$)$_3$NH(CH$_2$)$_4$NHC(=NH)—CH$_2$—Ph |
| 90 | Cl-Ph-CH$_2$C(=NH·HCl)-OCH$_3$ | N-(p-Chlorophenylacetimidoyl)-bleomycin A$_5$ | (c) —NH(CH$_2$)$_3$NH(CH$_2$)$_4$NHC(=NH)—CH$_2$—Ph—Cl |
| 91 | m-Cl-Ph-CH$_2$C(=NH·HCl)-OCH$_3$ | N-(m-Chlorophenylacetimidoyl)-bleomycin A$_5$ | (c) —NH(CH$_2$)$_3$NH(CH$_2$)$_4$NHC(=NH)—CH$_2$—Ph-Cl |
| 92 | Br-Ph-CH$_2$C(=NH·HCl)-OCH$_3$ | N-(p-Bromophenylacetimidoyl)-bleomycin A$_5$ | (c) —NH(CH$_2$)$_3$NH(CH$_2$)$_4$NHC(=NH)—CH$_2$—Ph—Br |
| 93 | NO$_2$-Ph-CH$_2$C(=NH·HCl)-OCH$_3$ | N-(p-Nitrophenylacetimidoyl)-bleomycin A$_5$ | (c) —NH(CH$_2$)$_3$NH(CH$_2$)$_4$NHC(=NH)—CH$_2$—Ph—NO$_2$ |

Table 1-continued

| No. | Reagent | | | Name of derivative | | | Structure of terminal chain |
|---|---|---|---|---|---|---|---|
| | 243 | 0.42 | | | 11700 | | |
| | | | 0.98 | — | | | |
| | 292.5 | (0.22) | | | 20900 | | |
| | 242.5 | 0.40 | | | 18920 | | |
| | | | 0.97 | — | | | |
| | 292.5 | (0.22) | | | 23660 | | |
| | 242.5 | 0.40 | | | 19200 | | |
| | | | 0.97 | — | | | |
| | 292.5 | (0.22) | | | 23700 | | |
| | 242.5 | 0.40 | | | 22600 | | |
| | | | 0.97 | — | | | |
| | 292.5 | (0.22) | | | 27000 | | |
| | 246 | 0.31 | | | 17600 | | |
| | | | 0.91 | — | | | |
| | 283 | (0.22) | | | 24380 | | |
| | 3352 | 2920 | 1728 | 1642 | 1540 | 1453 | 1368 |
| | 1087 | 1052 | 804 | 760 | | | |
| | 3350 | 2922 | 1725 | 1648 | 1557 | 1458 | 1366 |
| | 1095 | 1047 | 810 | 757 | | | |
| | 3348 | 2920 | 1723 | 1650 | 1556 | 1458 | 1360 |
| | 1090 | 1048 | 812 | 756 | | | |
| | 3350 | 2918 | 1722 | 1651 | 1557 | 1460 | 1371 |
| | 1093 | 1045 | 805 | 757 | | | |
| | 3390 | 2950 | 1725 | 1647 | 1555 | 1520 | 1455 |
| | 1345 | 1095 | 1050 | 1005 | 808 | 762 | 712 |

94  C₆H₅—CH=CHCOCH₃ / NH·HCl    N-(Cinnamoimidoyl)-bleomycin A₅

(c) —NH(CH₂)₃NH(CH₂)₄NHC—CH=CH—C₆H₅
                              ‖
                              NH 95  (α-Naphthyl)—CH₂COCH₃ / NH·HCl    N-(α-Naphthylacetimidoyl)-bleomycin A₅

(c) —NH(CH₂)₃NH(CH₂)₄NHC—CH₂—(α-Naphthyl)
                              ‖
                              NH 96  (CH₃)₂N(CH₂)₂COCH₃ / NH·HCl    N-(3-Dimethylamino-propioimidoyl)-bleomycin A₅

(c) —NH(CH₂)₃NH(CH₂)₄NHC—(CH₂)₂N(CH₃)₂
                              ‖
                              NH

97  CH₂=CH—CN    N-(Cyanoethyl)bleomycin A₅

(c) —NH(CH₂)₃NH(CH₂)₄NH(CH₂)₂CN 98  (CH₃CO)₂O    3-(N-Methyl-N-3-acetyl-aminopropyl)-aminopropylaminobleomycin (b) —NH(CH₂)₃N(CH₂)₃NHCOCH₃
              |
              CH₃

| | 247 | 0.44 | | | 12240 | | |
| | | | 0.89 | — | | | |
| | 287 | (0.22) | | | 8450 | | |
| | 242.5 | 0.34 | | | 13000 | | |
| | 272 | | | 0.93 | — | | |
| | 281 | (0.22) | | | 8265 | | |
| | 288 | | | | | | |
| | 243 | 0.095 | | | 1690 | | |
| | | | 1.10 | — | | | |
| | 292 | (0.20) | | | 13760 | | |
| | 243 | 0.59 | | | 998 | | |
| | | | 1.00 | + | | | |
| | 293 | (0.22) | | | 1527 | | |
| | 242 | 0.58 | | | 1050 | | |
| | | | 0.82 | — | | | |
| | 292 | (0.30) | | | 800 | | |
| | 3365 | 2931 | 1719 | 1645 | 1550 | 1457 | 1366 |
| | 1092 | 1051 | 810 | 755 | | | |
| | 3349 | 2923 | 1726 | 1642 | 1557 | 1452 | 1371 |
| | 1098 | 1052 | 802 | 760 | | | |
| | 3350 | 2921 | 1726 | 1647 | 1560 | 1457 | 1357 |
| | 1091 | 1054 | 800 | 757 | | | |
| | 3350 | 2925 | 1720 | 1640 | 1560 | 1456 | 1370 |
| | 1090 | 1051 | 803 | 762 | | | |
| | 3348 | 2921 | 1726 | 1645 | 1547 | 1460 | 1378 |
| | 1091 | 1060 | 803 | 762 | | | |

99  (C₂H₅CO)₂O    3-(N-Methyl-N-3-propionyl-aminopropyl)aminopropyl-aminobleomycin (b) —NH(CH₂)₃N(CH₂)₃NHCOC₂H₅
              |
              CH₃

100  (CH₃(CH₂)₁₀CO)₂O    3-(N-Methyl-N-3-lauroyl-aminopropyl)aminopropyl-aminobleomycin (b) —NH(CH₂)₃N(CH₂)₃—NHCO(CH₂)₁₀CH₃
              |
              CH₃

101  (CH₂—CO)₂O (succinic anhydride)    3-(N-Methyl-N-3-succinyl-aminopropyl)aminopropyl-aminobleomycin (b) —NH(CH₂)₃N(CH₂)₃NHCO(CH₂)₂COOH
              |
              CH₃

3,922,262

Table 1-continued

| No. | Reagent | Name of derivative | Structure of terminal chain |
|---|---|---|---|
| 102 | CH—CO\\O / CH—CO | 3-(N-Methyl-N-maleyl-aminopropyl)aminopropyl-aminobleomycin | (b) —NH(CH$_2$)$_3$N(CH$_2$)$_3$NHCOCH=CH—COOH <br>                              CH$_3$ |
| 103 | (C$_6$H$_5$CO)$_2$O | 3-(N-Methyl-N-3-benzoyl-aminopropyl)aminopropyl-aminobleomycin | (b) —NH(CH$_2$)$_3$N(CH$_2$)$_3$NHCO—C$_6$H$_5$ <br>                           CH$_3$ |

| | | | | | | |
|---|---|---|---|---|---|---|
| 242 | 0.52 | | | 1710 | | |
| | | 0.79 | — | | | |
| 292 | (0.24) | | | 525 | | |
| 242 | 0.58 | | | 19000 | | |
| | | 0.69 | — | | | |
| 292 | (0.24) | | | 1100 | | |
| 243 | 0.64 | | | 90 | | |
| | | 0.85 | — | | | |
| 292 | (0.30) | | | 68 | | |
| 235(S) | 0.61 | | | 320 | | |
| | | 0.83 | — | | | |
| 292 | (0.26) | | | 1250 | | |
| 235 | 0.61 | | | 5620 | | |
| | | 0.86 | — | | | |
| 292 | (0.30) | | | 1340 | | |
| 3355 | 2916 | 1724 | 1650 | 1550 | 1449 | 1371 |
| 1090 | 1056 | 804 | 759 | | | |
| 3402 | 2720 | 1722 | 1649 | 1543 | 1450 | 1365 |
| 1094 | 1052 | 802 | 764 | | | |
| 3370 | 2915 | 1720 | 1650 | 1550 | 1456 | 1372 |
| 1104 | 1050 | 811 | 762 | | | |
| 3353 | 2924 | 1721 | 1645 | 1557 | 1450 | 1372 |
| 1104 | 1062 | 804 | 760 | | | |
| 3360 | 2915 | 1725 | 1642 | 1553 | 1450 | 1370 |
| 1084 | 1057 | 812 | 757 | | | |

| No. | Reagent | Name of derivative | Structure of terminal chain |
|---|---|---|---|
| 104 | (nicotinoyl)$_2$O | 3-(N-Methyl-N-3-nicotinoyl-aminopropyl)aminopropyl-aminobleomycin | (b) —NH(CH$_2$)$_3$N(CH$_2$)$_3$NHCO—(pyridyl) <br>                           CH$_3$ |
| 105 | ClCH$_2$COCl | 3-(N-Methyl-N-3-chloro-acetylaminopropyl)-aminopropyl-aminobleomycin | (b) —NH(CH$_2$)$_3$N(CH$_2$)$_3$NHCOCH$_2$Cl <br>                           CH$_3$ |
| 106 | (thienyl—CO)$_2$O | 3-(N-Methyl-N-3-thenoyl-aminopropyl)aminopropyl-aminobleomycin | (b) —NH(CH$_2$)$_3$N(CH$_2$)$_3$NHCO—(thienyl) <br>                           CH$_3$ |
| 107 | phthalic anhydride | 3-(N-Methyl-N-3-phthalyl-aminopropyl)aminopropyl-aminobleomycin | (b) —NH(CH$_2$)$_3$N(CH$_2$)$_3$NHCO—C$_6$H$_4$—COOH <br>                           CH$_3$ |
| 108 | 3-nitrophthalic anhydride | 3-[N-Methyl-N-3-(3-nitrophthalyl)aminopropyl]-aminopropylaminobleomycin | (b) —NH(CH$_2$)$_3$N(CH$_2$)$_3$NHCO—C$_6$H$_3$(NO$_2$)—COOH <br>                           CH$_3$ |

| | | | | | | | |
|---|---|---|---|---|---|---|---|
| | 0.48 | | | 2000 | | | |
| 292 | | 0.88 | — | | | | |
| | (0.24) | | | 570 | | | |
| 242 | 0.48 | | | 1200 | | | |
| | | 0.80 | — | | | | |
| 292 | (0.24) | | | 700 | | | |
| 245 | 0.58 | | | 6800 | | | |
| | | 0.77 | — | | | | |
| 275 | (0.26) | | | 1170 | | | |
| | 0.57 | | | 620 | | | |
| | | 0.74 | — | | | | |
| 292 | | | | | | | |
| | (0.24) | | | 680 | | | |
| 237 | 0.58 | | | 320 | | | |
| | | 0.73 | — | | | | |
| 287 | (0.26) | | | 65 | | | |
| 3340 | 2850 | *1725 | 1645 | 1550 | 1455 | 1370 | |
| 1100 | 1052 | 803 | 760 | | | | |
| 3350 | 2923 | 1719 | 1638 | 1554 | 1453 | 1368 | |
| 1095 | 1050 | 804 | 762 | | | | |
| 3360 | 2920 | 1725 | 1650 | 1560 | 1455 | 1367 | |
| 1106 | 1057 | 810 | 764 | | | | |
| 3360 | 2930 | 1725 | 1642 | 1560 | 1450 | 1365 | |
| 1100 | 1057 | 811 | 764 | | | | |
| 3350 | 2940 | 1720 | 1640 | 1558 | 1452 | 1350 | |
| 1130 | 1091 | 1055 | 1005 | 805 | 760 | 740 | 703 |

Table 1-continued

| No. | Reagent | Name of derivative | Structure of terminal chain |
|-----|---------|-------------------|----------------------------|
| 109 | CH₂(CH₂-CO)₂O | 3-(N-Methyl-N-3-glutaryl-aminopropyl)aminopropyl-aminobleomycin | (b) $-NH(CH_2)_3N(CH_2)_3NHCO(CH_2)_3COOH$ <br> $\quad\quad\quad\quad\quad CH_3$ |
| 110 | CH₃CH-CO / CH₂-CO ⟩O | 3-(N-Methyl-N-3-methyl-succinylaminopropyl)-aminopropylaminobleomycin | (b) $-NH(CH_2)_3N(CH_2)_3NHCOCH_2CH{-}COOH$ <br> $\quad\quad\quad\quad\quad CH_3 \quad\quad\quad\quad CH_3$ |
| 111 | CH₂=C-CO / CH₂-CO ⟩O | 3-(N-Methyl-N-3-itaconyl-aminopropyl)aminopropyl-aminobleomycin | (b) $-NH(CH_2)_3N(CH_2)_3NHCOCH_2CHCOOH$ <br> $\quad\quad\quad\quad\quad CH_3 \quad\quad\quad\quad CH$ <br> $\quad\quad\quad\quad\quad\quad\quad\quad\quad\quad\quad\quad\quad\quad CH_2$ |
| 112 | CH=CHCH₂Br | 3-(N-Methyl-N-3-allylamino-propyl)aminopropylamino-bleomycin | (c) $-NH(CH_2)_3N(CH_2)_3NHCH_2CH{=}CH_2$ <br> $\quad\quad\quad\quad\quad CH_3$ |

| | | | | | | |
|---|---|---|---|---|---|---|
| 243 | 0.66 | | | 116 | | |
| | | 0.83 | − | | | |
| 292 | (0.30) | | | 79 | | |
| 243 | 0.65 | | | 170 | | |
| | | 0.82 | − | | | |
| 292 | (0.29) | | | 220 | | |
| 243 | 0.69 | | | 230 | | |
| | | 0.82 | − | | | |
| 292 | (0.30) | | | 315 | | |
| 243 | 0.33 | | | 3400 | | |
| | | 0.94 | + | | | |
| 292 | (0.21) | | | 7600 | | |

| | | | | | | |
|---|---|---|---|---|---|---|
| 3381 | 2930 | 1732 | 1651 | 1547 | 1450 | 1372 |
| 1088 | 1062 | 798 | 756 | | | |
| 3327 | 2920 | 1730 | 1647 | 1560 | 1452 | 1372 |
| 1092 | 1055 | 795 | 762 | | | |
| 3320 | 2918 | 1730 | 1650 | 1558 | 1457 | 1376 |
| 1087 | 1049 | 810 | 760 | | | |
| 3354 | 2890 | 1723 | 1560 | 1455 | 1374 | 1145 |
| 1105 | 1058 | 810 | 762 | | | |

| No. | Reagent | Name of derivative | Structure of terminal chain |
|-----|---------|-------------------|----------------------------|
| 113 | NO₂-⟨O⟩-CH₂Br | 3-(N-Methyl-N-3-p-nitro-benzylaminopropyl)-aminopropylaminobleomycin | (c) $-NH(CH_2)_3N(CH_2)_3NHCH_2{-}⟨O⟩{-}NO_2$ <br> $\quad\quad\quad\quad\quad CH_3$ |
| 114 | ⟨O⟩-SO₂Cl | 3-(N-Methyl-N-3-benzene-sulfonylaminopropyl)-aminopropylaminobleomycin | (b) $-NH(CH_2)_3N(CH_2)_3NHSO_2{-}⟨O⟩$ <br> $\quad\quad\quad\quad\quad CH_3$ |
| 115 | Cl-⟨O⟩-SO₂Cl | 3-(N-Methyl-N-3-p-chloro-benzenesulfonylaminopropyl)-aminopropylaminobleomycin | (b) $-NH(CH_2)_3N(CH_2)_3NHSO_2{-}⟨O⟩{-}Cl$ <br> $\quad\quad\quad\quad\quad CH_3$ |
| 116 | CH₃-⟨O⟩-SO₂Cl | 3-(N-Methyl-N-3-p-toluene-sulfonylaminopropyl)-aminopropylaminobleomycin | (b) $-NH(CH_2)_3N(CH_2)_3NHSO_2{-}⟨O⟩{-}CH_3$ <br> $\quad\quad\quad\quad\quad CH_3$ |
| 117 | ⟨H⟩-N=C=O | 3-(N-Methyl-N-3-cyclo-hexylcarbamoylaminopropyl)-aminopropylaminobleomycin | (b) $-NH(CH_2)_3N(CH_2)_3NHCONH{-}⟨H⟩$ <br> $\quad\quad\quad\quad\quad CH_3$ |

| | | | | | | |
|---|---|---|---|---|---|---|
| 246 | 0.58 | | | 7050 | | |
| | | 0.95 | + | | | |
| 279 | (0.23) | | | 3500 | | |
| 272 | 0.59 | | | 6700 | | |
| | | 0.72 | − | | | |
| 292 | (0.22) | | | 1500 | | |
| | 0.65 | | | 17700 | | |
| 292 | | 0.69 | − | | | |
| | (0.26) | | | 1400 | | |
| | 0.74 | | | 10000 | | |
| 292 | | 0.73 | − | | | |
| | (0.30) | | | 1250 | | |
| 243 | 0.77 | | | 11500 | | |
| | | 0.76 | + | | | |
| 292 | (0.23) | | | 1052 | | |

| | | | | | | |
|---|---|---|---|---|---|---|
| 3355 | 2925 | 1720 | 1653 | 1547 | 1520 | 1463 |
| 1345 | 1095 | 1050 | 1007 | 810 | 742 | |
| 3348 | 2920 | 1720 | 1652 | 1547 | 1450 | 1365 |
| 1314 | 1145 | 1095 | 1050 | 1000 | 800 | 755 |
| 3350 | 2910 | 1723 | 1650 | 1550 | 1452 | 1369 |
| 1320 | 1158 | 1055 | 1010 | 830 | 750 | |
| 3352 | 2922 | 1718 | 1660 | 1545 | 1452 | 1367 |
| 1315 | 1140 | 1092 | 1047 | 1000 | 802 | 760 |
| 3348 | 2925 | 1722 | 1643 | 1556 | 1451 | 1370 |
| 1095 | 1060 | 800 | 760 | | | |

Table 1-continued

| No. | Reagent | Name of derivative | Structure of terminal chain |
|---|---|---|---|
| 118 | CH₃COCH₃ with NH·HCl | 3-(N-Methyl-N-3-acetimidoylaminopropyl)-aminopropylaminobleomycin | (c) —NH(CH₂)₃N(CH₂)₃NHCCH₃ with CH₃ and NH |
| 119 | C₆H₅-CH₂COCH₃ with NH·HCl | 3-(N-Methyl-N-3-phenyl-acetimidoylaminopropyl)-aminopropylaminobleomycin | (c) —NH(CH₂)₃N(CH₂)₃NHC—CH₂-C₆H₅ with CH₃ and NH |
| 120 | Cl-C₆H₄-CH₂COCH₃ with NH·HCl | 3-(N-Methyl-N-3-p-chlorophenylacetimidoylaminopropyl)aminopropylaminobleomycin | (c) —NH(CH₂)₃N(CH₂)₃NHC—CH₂-C₆H₄-Cl with CH₃ and NH |
| 121 | (CH₃CO)₂O | 3-(N-3-Acetylaminopropyl)-aminopropylaminobleomycin | (b) —NH(CH₂)₃NH(CH₂)₃COCH₃ |
| 122 | (C₆H₅-CO)₂O | 3-(N-3-Benzoylaminopropyl)aminopropylaminobleomycin | (b) —NH(CH₂)₃NH(CH₂)₃CO-C₆H₅ |

| | | | | | | |
|---|---|---|---|---|---|---|
| 242 | 0.24 | | | | 3640 | |
| 292 | (0.23) | 0.96 | — | | 6750 | |
| 242 | 0.37 | | | | 12750 | |
| 292 | (0.26) | 0.96 | — | | 7800 | |
| 242 | 0.32 | | | | 19000 | |
| 292 | (0.22) | 0.89 | — | | 14000 | |
| 243 | 0.65 | | | | 1250 | |
| 292 | (0.22) | 0.81 | — | | 900 | |
| 249 | 0.62 | | | | 4084 | |
| 293 | (0.21) | 0.79 | — | | 1084 | |

| | | | | | | |
|---|---|---|---|---|---|---|
| 3355 | 2925 | 1723 | 1645 | 1555 | 1462 | 1373 |
| 1091 | 1053 | 804 | 765 | | | |
| 3360 | 2915 | 1720 | 1645 | 1553 | 1456 | 1371 |
| 1098 | 1060 | 803 | 762 | | | |
| 3363 | 2927 | 1720 | 1645 | 1550 | 1455 | 1370 |
| 1092 | 1063 | 1005 | 802 | 760 | | |
| 3351 | 2918 | 1718 | 1642 | 1553 | 1455 | 1372 |
| 1094 | 1057 | 807 | 767 | | | |
| 3362 | 2927 | 1721 | 1645 | 1547 | 1450 | 1367 |
| 1089 | 1054 | 802 | 756 | | | |

| No. | Reagent | Name of derivative | Structure of terminal chain |
|---|---|---|---|
| 123 | CH₂—CO\CH₂—CO/O (succinic anhydride) | 3-(N-3-Succinylaminopropyl)aminopropylaminobleomycin | (b) —NH(CH₂)₃NH(CH₂)₃NHCO(CH₂)₂COOH |
| 124 | NO₂-C₆H₄-CH₂Br | 3-(N-3-p-Nitrobenzylaminopropyl)aminopropylaminobleomycin | (c) —NH(CH₂)₃NH(CH₂)₃NHCH₂-C₆H₄-NO₂ |
| 125 | C₆H₅-CH₂COCH₃ with NH | 3-(N-3-Phenylacetimidoylaminopropyl)aminopropylaminobleomycin | (c) —NH(CH₂)₃NH(CH₂)₃NHCCH₂-C₆H₅ with NH |
| 126 | (CH₃CO)₂O | 3-(N-6-Acetylaminohexyl)-aminopropylaminobleomycin | (b) —NH(CH₂)₃NH(CH₂)₆NHCOCH₃ |
| 127 | (C₆H₅-CO)₂O | 3-(N-6-Benzoylaminohexyl)-aminopropylaminobleomycin | (b) —NH(CH₂)₃NH(CH₂)₆NHCO-C₆H₅ |

| | | | | | | |
|---|---|---|---|---|---|---|
| 243 | 0.63 | | | | 150 | |
| 292 | (0.22) | 0.76 | — | | 130 | |
| 246 | 0.59 | | | | 6250 | |
| 280 | (0.22) | 0.91 | + | | 3100 | |
| 243 | 0.42 | | | | 9600 | |
| | (0.22) | 0.93 | — | | 7000 | |
| 292.5 | | | | | | |
| 243 | 0.73 | | | | 1480 | |
| 292 | (0.25) | 0.80 | — | | 1200 | |
| 240 | 0.78 | | | | 6388 | |
| 291 | (0.29) | 0.75 | — | | 589 | |

| | | | | | | |
|---|---|---|---|---|---|---|
| 3327 | 2920 | 1719 | 1641 | 1552 | 1447 | 1364 |
| 1087 | 1054 | 810 | 755 | | | |
| 3348 | 2920 | 1718 | 1648 | 1552 | 1520 | 1457 |
| 1347 | 1090 | 1050 | 1005 | 812 | 742 | |
| 3319 | 2920 | 1725 | 1650 | 1552 | 1449 | 1371 |
| 1100 | 1053 | 805 | | | | |
| 3360 | 2917 | 1727 | 1649 | 1557 | 1451 | 1374 |
| 1095 | 1055 | 802 | 757 | | | |
| 3355 | 2925 | 1724 | 1651 | 1560 | 1454 | 1369 |
| 1105 | 1055 | 810 | 761 | | | |

Table 1-continued

| No. | Reagent | Name of derivative | Structure of terminal chain |
|---|---|---|---|
| 128 | $\begin{array}{c}CH_2-CO\\|\\CH_2-CO\end{array}\!\!>\!\!O$ | 3-(N-6-Succinylamino-hexyl)aminopropylamino-bleomycin | (b) $-NH(CH_2)_3NH(CH_2)_6NHCO(CH_2)_2COOH$ |
| 129 | $NO_2\text{-}\!\!\bigcirc\!\!\text{-}CH_2Br$ | 3-(N-6-p-Nitrobenzylamino-hexyl)aminopropylamino-bleomycin | (c) $-NH(CH_2)_3NH(CH_2)_6NHCH_2\text{-}\!\!\bigcirc\!\!\text{-}NO_2$ |
| 130 | $Cl\text{-}\!\!\bigcirc\!\!\text{-}\underset{\underset{NH}{\|}}{C}\!CH_2OCH_3$ | 3-(N-6-p-Chlorophenyl-acetimidoylaminohexyl)-aminopropylaminobleomycin | (c) $-NH(CH_2)_3NH(CH_2)_6NH\underset{\underset{NH}{\|}}{C}CH_2\text{-}\!\!\bigcirc\!\!\text{-}Cl$ |
| 131 | $\begin{array}{c}CH_3C-CO\\\|\\CH-CO\end{array}\!\!>\!\!O$ | 3-(N-6-Citraconylamino-hexyl)aminopropylamino-bleomycin | (c) $-NH(CH_2)_3NH(CH_2)_6NHCOCH=CCOOH$<br>$\qquad\qquad\qquad\qquad\qquad\qquad\qquad\qquad\quad|$<br>$\qquad\qquad\qquad\qquad\qquad\qquad\qquad\qquad\quad CH_3$ |
| 132 | $\bigcirc\!\!\text{-}\underset{\underset{NH}{\|}}{C}\!CH_2OCH_3$ | 3-(N-Phenylacetimidoyl-aminohexyl)aminopropyl-aminobleomycin | (c) $-NH(CH_2)_3NH(CH_2)_6NH\underset{\underset{NH}{\|}}{C}CH_2\text{-}\!\!\bigcirc$ |

| | | | | | | |
|---|---|---|---|---|---|---|
| 243 | 0.68 | | | | 220 | |
| | | 0.72 | — | | 176 | |
| 292 | (0.25) | | | | | |
| 245 | 0.60 | | | | 8100 | |
| | | 0.95 | + | | | |
| 281 | (0.25) | | | | 4600 | |
| 244 | 0.36 | | | | 17640 | |
| | | 0.98 | — | | | |
| 293 | (0.25) | | | | 21000 | |
| 243 | 0.65 | | | | 185 | |
| | | 0.74 | — | | | |
| 292 | (0.24) | | | | 161 | |
| 242 | 0.48 | | | | 10153 | |
| | | 0.90 | — | | | |
| 291 | (0.37) | | | | 14313 | |

| | | | | | | |
|---|---|---|---|---|---|---|
| 3305 | 2920 | 1720 | 1647 | 1547 | 1450 | 1374 |
| 1090 | 1057 | 807 | 760 | | | |
| 3352 | 2923 | 1720 | 1652 | 1550 | 1517 | 1345 |
| 1462 | 1093 | 1048 | 1009 | 810 | 745 | |
| 3320 | 2931 | 1716 | 1655 | 1517 | 1442 | 1362 |
| 1097 | 1061 | 811 | 757 | | | |
| 3341 | 2918 | 1719 | 1647 | 1550 | 1447 | 1370 |
| 1105 | 1064 | 805 | 762 | | | |
| 3354 | 2925 | 1726 | 1640 | 1541 | 1452 | 1371 |
| 1090 | 1052 | 800 | 760 | | | |

| | | Name of derivative | Structure of terminal chain |
|---|---|---|---|
| | Control | 3-Aminopropylaminobleomycin | (b) $-NH(CH_2)_3NH_2$ |
| | Control | Bleomycin $A_5$ | (c) $-NH(CH_2)_3NH(CH_2)_4NH_2$ |
| | Control | 3-(N-Methyl-N-3-amino-propyl)aminopropyl-Aminobleomycin | (c) $-NH(CH_2)_3\underset{\underset{CH_3}{\|}}{N}(CH_2)_3NH_2$ |
| | Control | 3-(N-3-Aminopropyl)-aminopropylaminobleomycin | (c) $-NH(CH_2)_3NH(CH_2)_3NH_2$ |
| | Control | 3-(N-6-Aminohexyl)amino-propylaminobleomycin | (c) $-NH(CH_2)_3NH(CH_2)_6NH_2$ |

| | | | | | | |
|---|---|---|---|---|---|---|
| 243 | | | | | 1850 | |
| | | 1 | + | | | |
| 292 | | | | | 1800 | |
| 243 | | | | | 2100 | |
| | | 1 | + | | | |
| 293 | | | | | 17000 | |
| 243 | | | | | 1900 | |
| | | 1 | + | | | |
| | | | | | 12500 | |
| 292 | | | | | | |
| 243 | | | | | 2067 | |
| | | 1 | + | | | |
| 292 | | | | | 8960 | |
| 243 | | | | | 2517 | |
| | | 1 | + | | | |
| 292 | | | | | 12819 | |

| | | | | | | |
|---|---|---|---|---|---|---|
| 3310 | 2940 | 1720 | 1642 | 1555 | 1460 | 1370 |
| 1090 | 1052 | 1010 | 870 | 805 | 760 | |
| 3300 | 2910 | 1720 | 1640 | 1550 | 1459 | 1370 |
| 1095 | 1059 | 1005 | 921 | 875 | 765 | |
| 3300 | 2910 | 1722 | 1653 | 1555 | 1460 | 1373 |
| 1095 | 1050 | 1010 | 875 | 775 | | |
| 3300 | 2910 | 1720 | 1655 | 1554 | 1457 | 1370 |
| 1095 | 1050 | 1008 | 874 | 775 | | |
| 3300 | 2950 | 1721 | 1650 | 1551 | 1458 | 1370 |
| 1050 | 1098 | 1009 | 860 | 810 | 767 | |

Table 1-continued

*Thin layer chromatography:
Adsorbent: Silica gel
Solvent system: Methanol - 10 % aqueous ammonium acetate - 10 % ammonia water (10 : 9 : 1)
**Migration distance ratio to control bleomycin in high voltage filter paper electrophoresis (control bleomycin = 1) (pH: 1.9, 3000 volts)
***mcg Potency/mg: Biological test values against Mycobacterium smegmatis 607 (upper) and Bacillus Subtilis (lower) Standard: Bleomycin $A_2$ hydrochloride (free from copper).
(a): Cu-containing hydrochloride
(b): Cu-containing dihydrochloride
(c): Cu-containing trihydrochloride
(d): Cu-containing sulfate
(e): Cu-free dihydrochloride
Copper-free bleomycins were obtained by adding a copper removal reagent, such as for example hydrogen sulfide, to an aqueous solution of a copper-containing bleomycin, separating copper sulfide formed by filtration and then concentrating and drying up the filtrate under a reduced pressure (U.S. Pat. No. 3,646,197).
(s): Shoulder in UV absorption curve The IR absorption spectra of seven representative novel derivatives obtained by the process of the present invention are shown in the accompanying drawings in which:

FIG. 6 is IR absorption spectrum of 3-(N-methyl-N-acetimidoylaminopropyl)-aminopropylaminobleomycin Cu-containing trihydrochloride (No. 115).

FIG. 7 is IR absorption spectrum of 3-(N-methyl-N-p-chlorophenylacetimidoylaminopropyl)aminopropylaminobleomycin Cu-containing trihydrochloride (No. 118).

Figure 1:
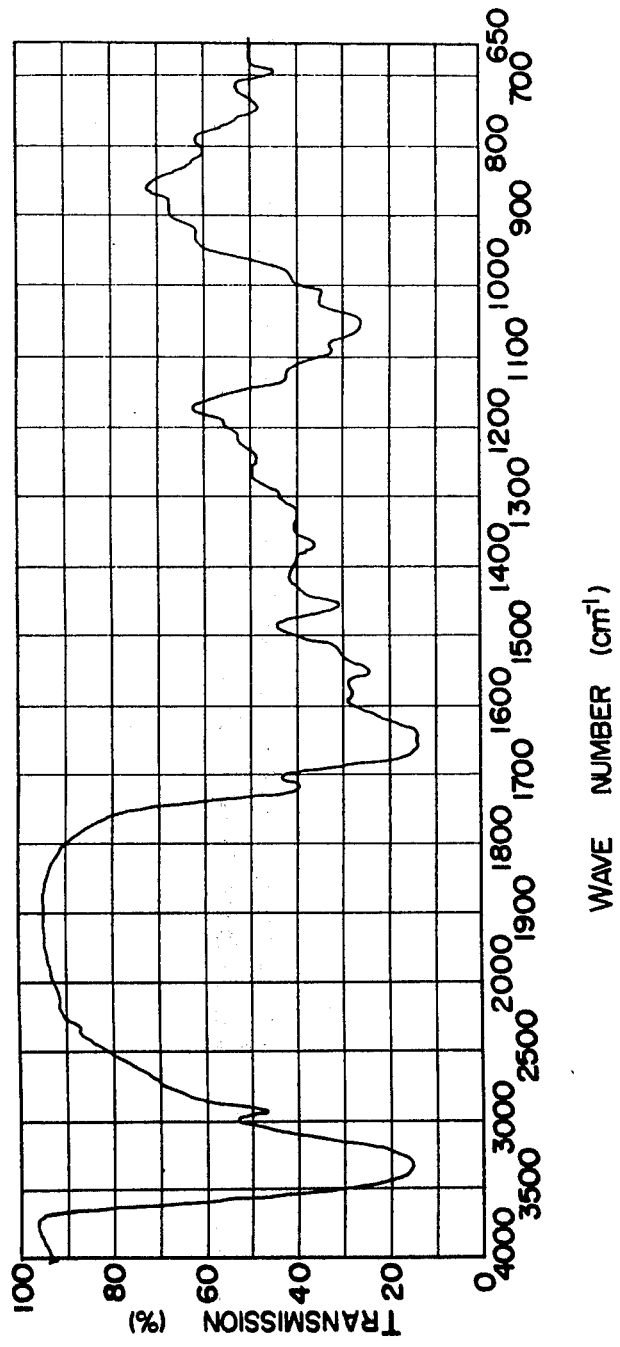
FIG. 1 is IR absorption spectrum of 3-(N-benzyl)-aminopropylaminobleomycin Cu-containing dihydrochloride (No. 18).
Figure 2:
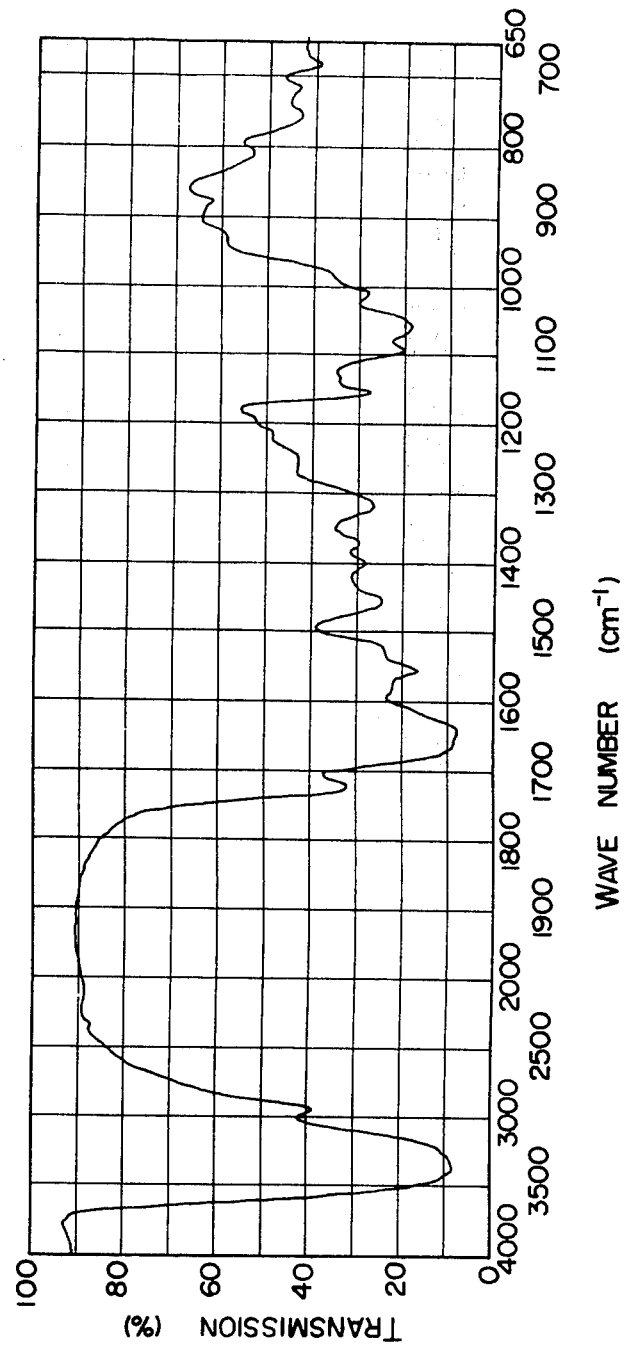
FIG. 2 is IR absorption spectrum of 3-(N-benzenesulfonyl)-aminopropylaminobleomycin Cu-containing hydrochloride (No. 21).
Figure 3:
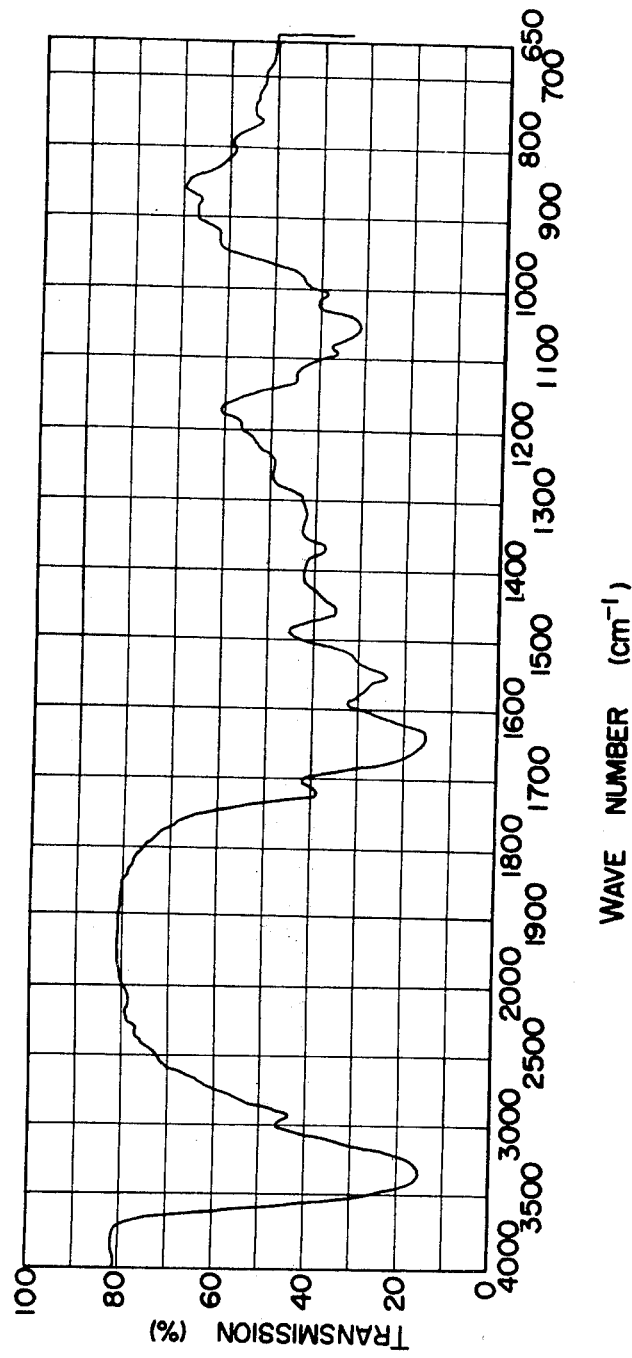
FIG. 3 is IR absorption spectrum of N-acetylbleomycin $A_5$ Cu-containing dihydrochloride (No. 43).
Figure 4:
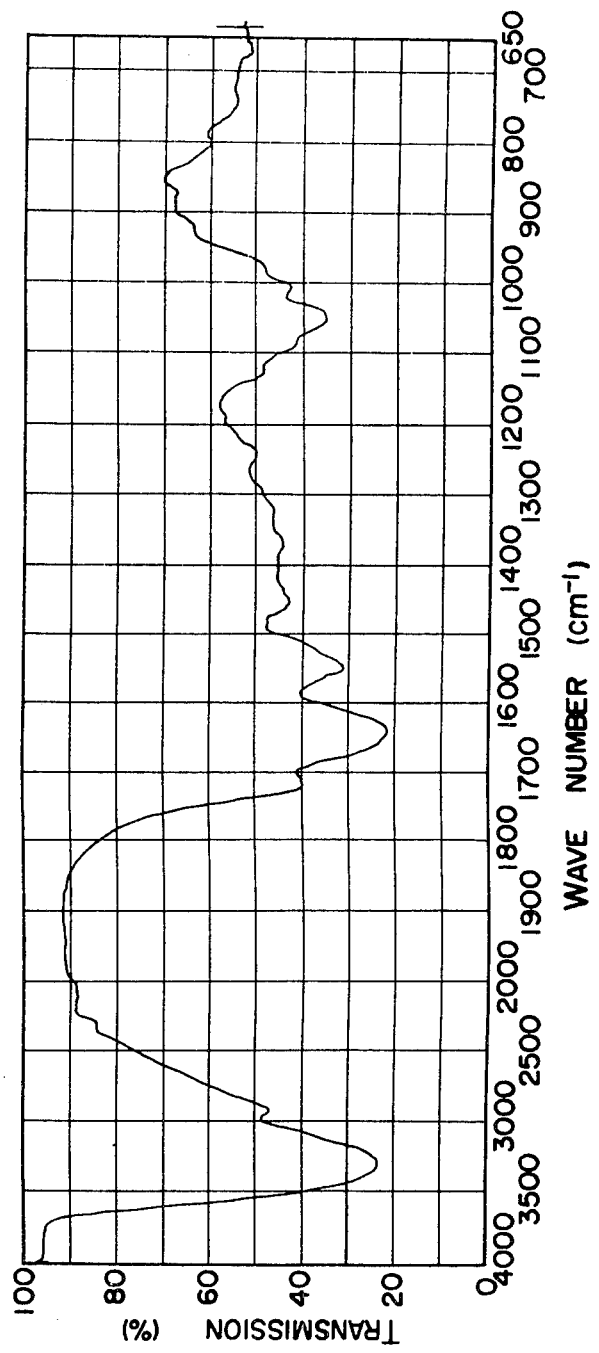
FIG. 4 is IR absorption spectrum of N-succinylbleomycin $A_5$ Cu-containing dihydrochloride (No. 49).
Figure 5:
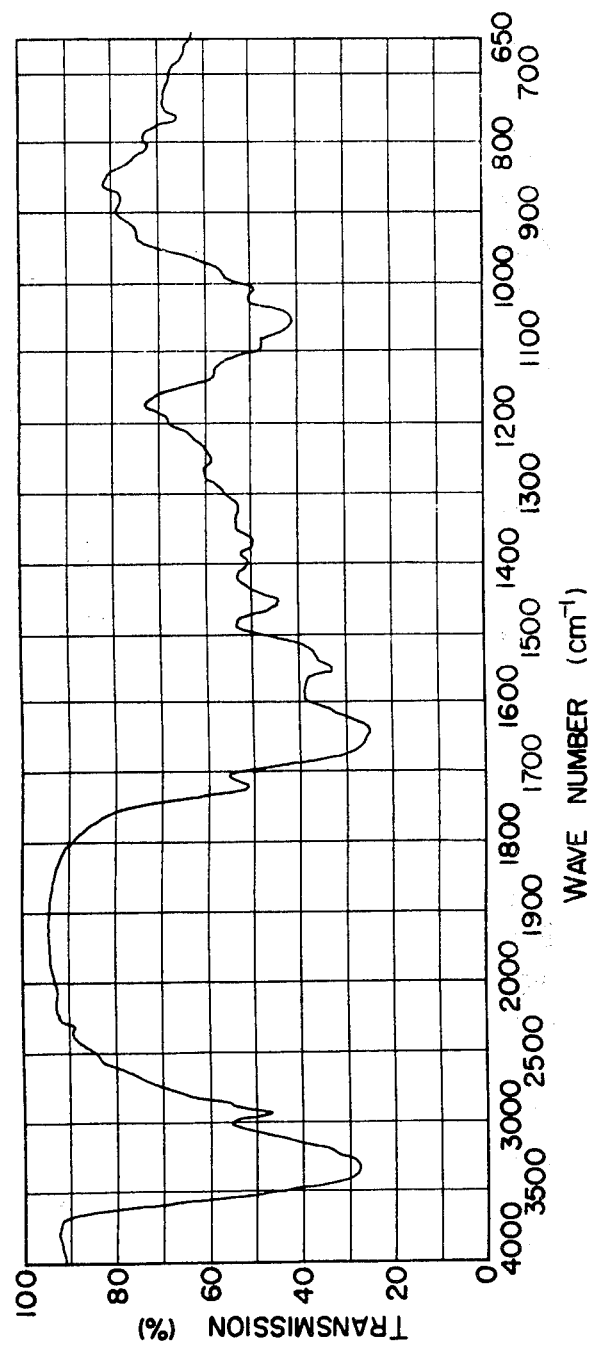
FIG. 5 is IR absorption spectrum of N-(cyclohexylcarbamoyl)bleomycin $A_5$ Cu-containing dihydrochloride (No. 74).

(The numbers in the parentheses represent the compound number shown in the above-mentioned table.)

The N-substituted derivatives of bleomycins obtained according to the process of the present invention show no definite melting, decomposition or boiling points and inhib gram positive and negative bacteria and have antitumor activity. Also, they are soluble in water and aqueous methanol, and form salts with acids and chelate with copper, and give positive reaction in Pauly, Ehrlich, Dragendorff and permanganate reactions but give negative reaction in Molish, Biuret, Elson-Morgan, Maltol, Fehling, Tollens, Anthrone and ferric chloride reactions. The N-substituted derivatives of bleomycin exhibit, in infrared region, absorption zone at the following wave numbers: 1040–1075 $cm^{-1}$, 1710 – 1735 $cm^{-1}$, 1625 – 1680 $cm^{-1}$, 2800 – 2960 $cm^{-1}$ and 3200 – 3500 $cm^{-1}$. They are further characterized by the fact that they give L-threonine, $\beta$-amino-$\beta$-(4-amino-6-carboxy-5-methylpyrimidine-2-yl)-propionic acid, 4-amino-3-hydroxy-2-methyl-n-valeric acid, $\beta$-hydroxyhistidine, L-$\beta$-aminoalanine, L-gulose, 3-O-carbamoyl-D-mannose, 2'-(2-aminoethyl)-2,4'-bithiazole-4-carboxylic acid and each amino compound corresponding to terminal chain portion by acid hydrolysis.

As is shown in the above table, many of the novel derivatives obtained by the process of the present invention show higher antimicrobial activity against *Mycobacterium smegmatis* 607 and Bacillus Subtilis than the starting bleomycins, and also have remarkably excellent anticancer effect against experimental Erlich ascites cancer in animals. Further, the enzymic degradation in the terminal chain amino group of the starting bleomycins may be prevented. Also, 3-(N-succinyl)aminopropylaminobleomycin, 3-(N-acetyl)aminopropylaminobleomycin, N-succinylbleomycin $A_5$, N-acetylbleomycin $A_5$ and 3-(N-methyl-N-3-succinylaminopropyl)aminopropylaminobleomycin did not show an increase in anticancer activity in the above-mentioned animal test, but showed an increase in chemotherapeutic coefficient ($LD_{50}/ED_{50}$) compared with 3-aminopropylaminobleomycin and bleomycin $A_5$ as controls owing to their lower toxicity.

In order to show the fact that bleomycins derivatives obtained according to the present invention have a more safty and excellent antitumor effect as compared with starting bleomycins, the life-prolongation effect of bleomycin derivatives obtained according to the present invention is compared with that of each starting bleomycins as a control medicine on mice inoculated with the ascites type of the Ehrlich carcinoma and the inhibition effect of said derivatives to Ehrlich solid carcinoma in this animal is ascertained.

Method of experiment:

I. Mice of ICR/JCL strain (male, 5 weeks old, 5 for 1 group) are inoculated with Ehrlich ascites carcinoma cells in a dose of 2 millions/mouse.

Bleomycin ranging from 25 mg/kg to 0.19 mg/kg is administered intraperitoneally once a day for 10 days starting from 2 hours after the inoculation, the death is observed everyday up to 50 days after the inoculation and body weights are measured every 5 days.

Judgement of the effect:

$LD_{50}$ is calculated by Behrens-Kärber's method from the group poisoned at high dose levels. A survival percentage at each dose level is obtained by assuming the average number of survival days observed with the control group administered with physiological saline water to be 100%, and those having survived for such periods as 200% of that of the control or longer are regarded as effective.

The maximum dose level at which they survive for such period as 100 to 200% of the survival days for the control is signified by $ED_{50}$.

With $LD_{50}/ED_{50}$ = Index, it is shown that the higher this value is, the loss toxic as well as the more effective the sample tested can be.

II. Mice (ICR-SLC, male, 5 weeks old) are subcutaneously inoculated to axillary region with Ehrlich carcinoma (ascites type) at a dose of 2 million cells per mouse.

After 24 hours, one species of bleomycin is intraperitoneal injected once a day for successive ten days with each dose level.

Five mice are used for each group. Animals are sacrificed on 15th days after inoculation.

Weights of tumor of the test animals are compared with those of control animals.

Results are expressed as percentages to control growth.

Table 2

Terminal chain: $-NH(CH_2)_3X'$

| No.* | X' | mcg pot/mg M. 607 | mcg pot/mg B. subtilis | $LD_{50}/ED_{50}$ | Dose (mg/kg) Ehrlich Solid Inhibition % | | | | | |
|---|---|---|---|---|---|---|---|---|---|---|
| | | | | | 8.1 | 2.7 | 0.9 | 0.3 | 0.1 | 0.03 |
| 1 | $-NHCOCH_3$ | 460 | 120 | 15.9/0.78 = 20.4 | 82 | 63 | 43 | 21 | 7 | |
| 2 | $-NHCOC_2H_5$ | 900 | 180 | 17.0/0.78 = 21.8 | 84 | 66 | 46 | 25 | 9 | 0 |
| 3 | $-NHCOC_3H_7$ | 1530 | 50 | 20.0/0.78 = 25.6 | 83 | 52 | 40 | 18 | 6 | 0 |
| 4 | $-NHCO(CH_2)_6CH_3$ | 9600 | 1400 | 41.5/3.12 = 13.3 | 87 | 60 | 42 | 20 | 8 | 0 |
| 5 | $-NHCO(CH_2)_{10}CH_3$ | 7560 | 61 | 31.6/3.12 = 10 | 89 | 59 | 33 | 12 | 0 | 0 |
| 6 | $-NHCOCH=CHCH=CHCH_3$ | 1850 | 108 | 12.3/0.78 = 15.7 | 76 | 49 | 16 | 10 | 4 | 0 |
| 7 | $-NHCO(CH_2)_2COOH$ | 101 | 96 | 25.5/0.78 = 32.6 | 88 | 72 | 53 | 29 | 18 | 4 |
| 8 | $-NHCOCH=CHCOOH$ | 88 | 58 | 34/3.12 = 10.9 | 74 | 51 | 32 | 18 | 9 | 0 |
| 9 | $-NHCOCH_2O-\text{C}_6\text{H}_5$ | 3500 | 220 | 19.6/0.78 = 25.1 | 90 | 67 | 54 | 40 | 23 | 10 |
| 10 | $-NHCO-\text{C}_6\text{H}_5$ | 1800 | 110 | 24.0/0.78 = 30.8 | 92 | 65 | 43 | 43 | 36 | 18 |
| 11 | $-NHCO-\text{(pyridyl)}$ | 2200 | 760 | 26.5/0.78 = 34.0 | 88 | 64 | 40 | 36 | 29 | 20 |
| 12 | $-NHCOCH_2Cl$ | 760 | 98 | 14.2/0.78 = 18.2 | 73 | 47 | 36 | 34 | 21 | 15 |
| 13 | $-NHCO-\text{(thienyl)}$ | 2280 | 107 | 49.0/3.12 = 15.8 | 74 | 50 | 39 | 27 | 15 | 0 |
| 14 | $-NHCO-\text{(furyl)}$ | 1780 | 100 | 36.3/3.12 = 11.6 | 78 | 49 | 36 | 25 | 13 | 0 |
| 15 | $-NHCO-\text{C}_6\text{H}_4-NO_2$ | 3880 | 220 | 22.5/0.78 = 28.8 | 95 | 73 | 52 | 46 | 31 | 12 |
| 16 | $-NHCO-\text{C}_6\text{H}_4-COOH$ | 332 | 123 | 20.9/0.78 = 26.8 | 86 | 70 | 53 | 50 | 38 | 20 |
| 17 | $-NHC_2H_5$ | 1700 | 2520 | 7.9/0.39 = 20.3 | 80 | 62 | 47 | 37 | 14 | 0 |
| 18 | $-NHCH_2-\text{C}_6\text{H}_5$ | 5833 | 230 | 10.2/0.39 = 26.2 | 87 | 49 | 39 | 28 | 22 | 11 |
| 19 | $-NHCH_2-\text{C}_6\text{H}_4-NO_2$ | 11800 | 2760 | 11.0/0.39 = 28.2 | 76 | 49 | 42 | 37 | 9 | 0 |
| 20 | $-NHSO_2CH_3$ | 501 | 122 | 8.7/1.56 = 5.8 | 74 | 46 | 39 | 27 | 0 | 0 |
| 21 | $-NHSO_2-\text{C}_6\text{H}_5$ | 3500 | 230 | 16.9/3.12 = 5.41 | 74 | 53 | 42 | 29 | 16 | 0 |
| 22 | $-NHSO_2-\text{C}_6\text{H}_4-CH_3$ | 8000 | 140 | 18.9/1.56 = 12.1 | 80 | 52 | 46 | 37 | 20 | 15 |
| 23 | $-NHSO_2-\text{C}_6\text{H}_4-Cl$ | 7010 | 121 | 9.4/1.56 = 6.0 | 80 | 48 | 47 | 35 | 16 | 7 |

Table 2-continued

| No.* | X' | Terminal chain: —NH(CH₂)₃X' mcg pot/mg M. 607 | B. subtilis | LD₅₀/ED₅₀ | Dose (mg/kg) Ehrlich Solid Inhibition % 8.1 | 2.7 | 0.9 | 0.3 | 0.1 | 0.03 |
|---|---|---|---|---|---|---|---|---|---|---|
| 24 | —NHSO₂—(naphthyl) | 4350 | 202 | 12.3/1.56 = 7.9 | 91 | 71 | 63 | 49 | 18 | 0 |
| 25 | —NHCONH—(phenyl) | 3236 | 225 | 13.6/0.39 = 34.9 | 91 | 86 | 64 | 53 | 32 | 21 |
| 26 | —NHCONH—(H-phenyl) | 8750 | 321 | 12.0/0.39 = 30.8 | 93 | 88 | 67 | 49 | 42 | 38 |
| 27 | —NHCH‖NH | 272 | 74 | 4.2/0.19 = 22.1 | 88 | 69 | 48 | 42 | 31 | 0 |
| 28 | —NHCCH₃‖NH | 1867 | 1080 | 7.5/0.19 = 39.5 | 90 | 72 | 63 | 50 | 47 | 32 |
| 29 | —NHCC₂H₅‖NH | 2252 | 986 | 7.4/0.19 = 39.0 | 90 | 69 | 47 | 36 | 18 | 0 |
| 30 | —NHCC₄H₉‖NH | 6531 | 1157 | 7.3/0.19 = 38.4 | 89 | 62 | 39 | 20 | 4 | 0 |
| 31 | —NHC(CH₂)₇CH₃‖NH | 29370 | 1443 | 6.70/0.19 = 17.2 | 86 | 62 | 46 | 30 | 15 | 0 |
| 32 | —NHC—(phenyl)‖NH | 4423 | 963 | 4.60/0.19 = 24.2 | 89 | 73 | 55 | 36 | 20 | 10 |
| 33 | —NHC—(phenyl-OCH₃)‖NH | 5230 | 839 | 10.63/0.39 = 27.3 | 87 | 69 | 50 | 30 | 16 | 4 |
| 34 | —NHC—(phenyl-CH₃)‖NH | 7692 | 786 | 5.00/0.19 = 26.3 | 89 | 72 | 46 | 31 | 9 | 9 |
| 35 | —NHC—(phenyl-CH₃)‖NH | 5956 | 789 | 4.15/0.19 = 21.8 | 89 | 78 | 55 | 42 | 19 | 9 |
| 36 | —NHC—(phenyl-NO₂)‖NH | 5790 | 1676 | 3.41/0.19 = 17.9 | 76 | 62 | 41 | 19 | 8 | 0 |
| 37 | —NHCCH₂—(phenyl)‖NH | 6875 | 1987 | 2.46/0.39 = 6.31 | 90 | 64 | 66 | 53 | 41 | 20 |
| 38 | —NHCCH₂—(phenyl-Cl)‖NH | 14975 | 1629 | 1.26/0.19 = 6.6 | 95 | 49 | 62 | 36 | 27 | 16 |
| 39 | —NHCCH=CH—(phenyl)‖NH | 9900 | 843 | 4.5/0.39 = 11.5 | 81 | 42 | 38 | 19 | 0 | 0 |
| 40 | —NHCCH₂—(naphthyl)‖NH | 10170 | 1119 | 12.0/0.39 = 30.8 | 84 | 46 | 42 | 20 | 16 | 0 |
| 41 | —NHC(CH₂)₂N(CH₃)₂‖NH | 1896 | 5145 | 9.2/0.19 = 48.4 | 96.8 | 96.8 | 58.4 | 46.1 | 13.6 | 39.0 |
| 42 | —NH(CH₂)₂CN | 1081 | 765 | 9.38/0.39 = 24.1 | 84 | 64 | 52 | 49 | 36 | 18 |
| Starting material | —NH₂ | 1850 | 1800 | 11.9/0.39 = 28.5 | 86 | 82 | 71 | 4 | 0 | 0 |

Table 3

| NO.* | X' | Terminal Chain: —NH(CH₂)₃NH(CH₂)₄X' mcg pot/mg | | LD₅₀ED₅₀ | Dose (mg/kg), Ehrlich solid inhibition % 0.9 | 0.3 | 0.1 | 0.03 |
|---|---|---|---|---|---|---|---|---|
| 43 | —NHCOCH₃ | 1400 | 340 | 18.75/0.39 = 48.1 | 73 | 56 | 45 | 40 | 28 | 0 |
| 44 | —NHCOCH₃ | 1400 | 340 | 15.00/0.39 = 38.5 | 70 | 51 | 43 | 40 | 29 | 0 |
| 45 | —NHCOC₂H₅ | 2000 | 880 | 20.0/0.39 = 51.3 | 76 | 49/ 51 | 40 | 27 | 2 | 0 |
| 46 | —NHCOC₃H₇ | 3900 | 780 | 24.5/0.39 = 62.8 | 85 | 59 | 50 | 42 | 36 | 1 |
| 47 | —NHCO(CH₂)₆CH₃ | 17200 | 2930 | 22.6/0.39 = 57.9 | 84 | 54 | 41 | 25 | 20 | 0 |
| 48 | —NHCOCH=CHCH₃ | 4300 | 840 | 18.5/0.39 = 47.4 | 85 | 56 | 42 | 37 | 21 | 0 |
| 49 | —NHCO(CH₂)₂COOH | 200 | 225 | 21.4/0.19 = 113 | 84 | 70 | 89 | 37 | 65 | 7 |
| 50 | —NHCO(CH₂)₂COOH | 200 | 225 | 20.4/0.19 = 107.3 | 79 | 70 | 61 | 40 | 37 | 5 |
| 51 | —NHCO(CH₂)₂COOH | 200 | 227 | 22.0/0.19 = 115.8 | 82 | 72 | 70 | 41 | 40 | 11 |
| 52 | —NHCOCH=CHCOOH | 266 | 867 | 18.75/0.78 = 24.0 | 92 | 74 | 76 | 35 | 33 | 5 |
| 53 | —NHCOCH₂O—(phenyl) | 8500 | 615 | 8.0/0.19 = 42.1 | 92 | 84 | 56 | 21 | 7 | 0 |

Table 3-Continued

Terminal Chain: $-NH(CH_2)_3NH(CH_2)_4X'$

| NO.* | X' | mcg pot/mg | $LD_{50}ED_{50}$ | Dose (mg/kg), Ehrlich solid inhibition % | | | | |
|---|---|---|---|---|---|---|---|---|
| | | | | | 0.9 | 0.3 | 0.1 | 0.03 |
| 54 | —NHCO—⟨O⟩ | 5100 | 680 | 6.1/0.19 = 32.1 | 97 | 87 | 45 | 0 | 0 | 0 |
| 55 | —NHCO—⟨O⟩—NO₂ | 16000 | 2300 | 5.4/0.19 = 28.4 | 98 | 90 | 64 | 23 | 15 | 0 |
| 56 | —NHCO(CH₂)₄COOH | 134 | 45 | 35.4/0.39 = 76.9 | 88 | 62 | 50 | 41 | 27 | 3 |
| 57 | —NHCOCH=CH—⟨O⟩ | 14344 | 773 | 13.1/0.78= 16.8 | 87 | 52 | 46 | 32 | 14 | 0 |
| 58 | —NHCO—⟨O_N⟩ | 2500 | 830 | 10.3/0.19 = 54.3 | 86 | 60 | 55 | 42 | 30 | 10 |
| 59 | —NHCO—⟨O⟩-N | 2700 | 1000 | 12/0.19 = 63.2 | 84 | 55 | 50 | 35 | 27 | 10 |
| 60 | —NHCOCH₂Cl | 2000 | 960 | 21.5/0.39 = 55.1 | 88 | 62 | 53 | 45 | 32 | 9 |
| 61 | —NHCO—⟨O_O⟩ | 4230 | 1090 | 18.6/0.39 = 47.7 | 67 | 50 | 42 | 31 | 20 | 0 |
| 62 | —NHCO—⟨O_S⟩ | 6090 | 1110 | 17.0/0.39 = 37.8 | 70 | 55 | 36 | 29 | 25 | 0 |
| 63 | "NHCO(CH₂)₁₀CH₃ | 17200 | 2930 | 12.3/0.39 = 31.5 | 84 | 76 | 52 | 36 | 16 | 0 |
| 64 | —NHCO—⟨O⟩ HOOC | 710 | 2800 | 18.7/0.19 = 98.4 | 90 | 74 | 62 | 25 | 16 | 0 |
| 65 | —NHCO—⟨O⟩ HOOC | 390 | 120 | 19.0/0.19 = 100 | 93 | 83 | 74 | 31 | 20 | 0 |
| 66 | —NHC₂H₅ | 3300 | 750 | 5.2/0.19 = 27.4 | 85 | 70 | 52 | 50 | 26 | 10 |
| 67 | —NHCH₂CH=CH₂ | 3450 | 8410 | 1.56/0.19 =>8 | 89 | 68 | 57 | 60 | 32 | 16 |
| 68 | "NHCH₂—⟨O⟩—NO₂ | 6950 | 3885 | 11.3/0.78 = 14.4 | 85 | 77 | 56 | 47 | 0 | 14 |
| 69 | —NHSO₂CH₃ | 1670 | 680 | 9.0/0.39 = 23.0 | 80 | 70 | 40 | 32 | 29 | 18 |
| 70 | —NHSO₂—⟨O⟩ | 6400 | 830 | 9.6/0.39 = 24.6 | 88 | 72 | 26 | 36 | 65 | 26 |
| 71 | —NHSO₂—⟨O⟩—CH₃ | 19000 | 1500 | 10.0/0.39 = 25.6 | 82 | 58 | 42 | 37 | 34 | 29 |
| 72 | —NHSO₂—⟨O⟩—Cl | 23000 | 1400 | >3.0/0.39 =>8 | — | 95 | 90 | 38 | 18 | 10 |
| 73 | —NHSO₂—⟨OO⟩ | 26000 | 1500 | 14.3/0.78 = 18.3 | 96 | 93 | 82 | 50 | 21 | 8 |
| 74 | —NHCONHC₂H₅ | 2388 | 896 | 9.0/0.19 = 47.4 | 77 | 59 | 49 | 36 | 29 | 20 |
| 75 | —NHCONH—⟨O⟩ | 4775 | 1100 | 10.5/0.19 = 55.3 | 85 | 62 | 55 | 45 | 36 | 18 |
| 76 | —NHCONH—⟨H⟩ | 12040 | 1060 | 7.5/<0.19 =>40 | 67 | 59 | 67 | 65 | 27 | 11 |
| 77 | —NHCONH—⟨OO⟩ | 3550 | 608 | >1.56/0.39 =>4.0 | 88 | 66 | 75 | 70 | 36 | 18 |
| 78 | —NHC(=NH)—H | 11229 | 866 | 14.5/0.39 = 37.1 | 90 | 76 | 50 | 47 | 27 | 16 |
| 79 | —NHC(=NH)—CH₃ | 3100 | 7425 | 6.56 =34.5 | 93 | 81 | 44 | 62 | 0 | 29 |
| 80 | —NHC(=NH)—C₂H₅ | 3186 | 19500 | 7.1/0.19 = 37.4 | 90 | 74 | 52 | 41 | 29 | 15 |
| 81 | —NHC(=NH)CH(CH₃)₂ | 3725 | 17640 | 16.4/0.19 = 86.3 | 95 | 88 | 72 | 59 | 48 | 30 |
| 82 | —NHC(=NH)(CH₂)₃CH₃ | 10180 | 15870 | 13.2/0.19 = 69.5 | 85 | 64 | 50 | 42 | 29 | 7 |
| 83 | —NHC(=NH)(CH₂)₇CH₃ | 25500 | 8950 | 17.5/0.19 = 92.1 | 80 | 52 | 39 | 28 | 16 | 0 |
| 84 | —NHC(=NH)—⟨O⟩ | 5199 | 12900 | 1.56/>0.19 =>8.2 | 90 | 88 | 70 | 56 | 22 | 10 |
| 85 | —NHC(=NH)—⟨O⟩—OCH₃ | 6500 | 9265 | 8.6/0.19 = 45.2 | 90 | 82 | 64 | 46 | 30 | 15 |

Table 3 - Continued

Terminal Chain: —NH(CH$_2$)$_3$NH(CH$_2$)$_4$X'

| NO.* | X' | mcg pot/mg | | LD$_{50}$ED$_{50}$ | Dose (mg/kg), Ehrlich solid inhibition % | | | | | |
|---|---|---|---|---|---|---|---|---|---|---|
| | | | | | | 0.9 | 0.3 | 0.1 | 0.03 | |
| 86 | —NHC—⬡—CH$_3$ (NH) | 11890 | 10462 | 10.2/0.19 = 53.7 | 92 | 78 | 60 | 47 | 44 | 21 |
| 87 | —NHC—⬡ (NH) CH$_3$ | 10876 | 13330 | 7.6/0.19 = 40.0 | 88 | 76 | 61 | 52 | 46 | 25 |
| 88 | —NHC—⬡—NO$_2$ (NH) | 9750 | 17612 | 9.4/0.19 = 49.5 | 96 | 63 | 45 | 30 | 18 | 0 |
| 89 | —NHCCH$_2$—⬡ (NH) | 11700 | 20900 | 4.7/<0.19 = >25 | 91 | 89 | 65 | 57 | 2 | 1 |
| 90 | —NHCCH$_2$—⬡—Cl (NH) | 18920 | 23600 | 3.99/0.19 = 21 | 93 | 90 | 87 | 72 | 15 | 0 |
| 91 | —NHCCH$_2$—⬡—Cl (NH) | 19200 | 23700 | 6.2/0.09 = 68.9 | 100 | 82 | 63 | 60 | 48 | 35 |
| 92 | —NHCCH$_2$—⬡—Br (NH) | 22600 | 27000 | 8.9/0.09 = 98.9 | 96 | 79 | 59 | 51 | 37 | 42 |
| 93 | —NHCCH$_2$—⬡—NO$_2$ (NH) | 17600 | 24380 | 1.56/<0.19 =>8.2 | 100 | 89 | 66 | 62 | 47 | 40 |
| 94 | —NHCCH=CH—⬡ (NH) | 12240 | 850 | 7.4/0.38 = 19.5 | 95 | 71 | 62 | 46 | 29 | 10 |
| 95 | —NHCCH$_2$—⬡⬡ (NH) | 13000 | 8265 | 5.2/0.19 = 27.4 | 88 | 62 | 53 | 35 | 19 | 0 |
| 96 | —NHC(CH$_2$)$_2$N(CH$_3$)$_2$ (NH) | 1690 | 13760 | 20.1/0.19 = 105.8 | 96 | 72 | 70 | 63 | 50 | 45 |
| 97 | —NH.(CH$_2$)$_2$CN | 998 | 1527 | 4.2/0.19 = 22.1 | 80 | 71 | 51 | 39 | 30 | 21 |
| Starting material | —NH$_2$ | 2100 | 17000 | 3.8/0.19 = 20 | 87 | 67 | 58 | 46 | 41 | 31 |

Table 4

Terminal Chain: —NH(CH$_2$)$_3$N(CH$_2$)$_3$X'
 CH$_3$

| No.* | X' | mcg pot/mg M. 607 | B. Subtilis | LD$_{50}$/ED$_{50}$ | 8.1 | Dose (mg/kg) Ehrlich Solid Inhibition % | | | | |
|---|---|---|---|---|---|---|---|---|---|---|
| | | | | | | 2.7 | 0.9 | 0.3 | 0.1 | 0.03 |
| 98 | —NHCOCH$_3$ | 1050 | 800 | 17.0/0.39 = 43.5 | 76 | 56 | 48 | 42 | 26 | 0 |
| 99 | —NHCOC$_2$H$_5$ | 1710 | 525 | 16.9/0.39 = 43.3 | 78 | 50 | 42 | 36 | 19 | 10 |
| 100 | —NHCO(CH$_2$)$_{10}$CH$_3$ | 19000 | 1100 | 20.0/0.39 = 51.2 | 88 | 50 | 39 | 30 | 10 | 0 |
| 101 | —NHCO(CH$_2$)$_2$COOH | 90 | 68 | 41.7/0.78 = 54 | — | 79 | 71 | 58 | 39 | 18 |
| 102 | —NHCOCH=CHCOOH | 320 | 1250 | 11.5/0.19 = 60.5 | 84 | 64 | 71 | 34 | 30 | 14 |
| 103 | —NHCO—⬡ | 5620 | 1340 | 18.6/0.39 = 47.7 | 90 | 67 | 49 | 46 | 25 | 0 |
| 104 | —NHCO—⬡ | 2000 | 570 | 30.0/0.39 = 77.7 | 84.6 | 47.9 | 16.2 | 49.7 | 50.8 | 34.7 |
| 105 | —NHCOCH$_2$Cl | 1200 | 700 | 22.0/0.39 = 56.4 | 89 | 63 | 50 | 42 | 30 | 6 |
| 106 | —NHCO—⟨S⟩ | 6800 | 1170 | 15.4/0.39 = 39.5 | 72 | 55 | 35 | 26 | 10 | 0 |
| 107 | —NHCO—⬡ HOOC | 620 | 680 | 18.0/0.19 = 94.7 | 90 | 62 | 48 | 37 | 22 | 10 |
| 108 | —NHCO—⬡—NO$_2$ HOOC | 320 | 65 | 15.4/0.19 = 81.1 | 64.9 | 35.1 | 33.8 | 0 | 0 | 0 |

Table 4-continued

Terminal Chain: —NH(CH$_2$)$_3$N(CH$_2$)$_3$X'

| No.* | X' | mcg pot/mg M. 607 | B. Subtilis | LD$_{50}$/ED$_{50}$ CH$_3$ | Dose (mg/kg) Ehrlich Solid Inhibition % 8.1 | 2.7 | 0.9 | 0.3 | 0.1 | 0.03 |
|---|---|---|---|---|---|---|---|---|---|---|
| 109 | —NHCO(CH$_2$)$_3$COOH | 116 | 79 | $\frac{34.2}{0.39}=87.7$ | 89 | 63 | 51 | 44 | 30 | 16 |
| 110 | —NHCOCH$_2$CHCOOH<br>   CH$_3$ | 170 | 220 | $\frac{18.6}{0.39}=47.7$ | 87 | 49 | 38 | 21 | 17 | 10 |
| 111 | —NHCOCH$_2$CHCOOH<br>   CH<br>   CH$_2$ | 230 | 315 | $\frac{17.2}{0.39}=44.1$ | 79 | 62 | 41 | 22 | 10 | 1 |
| 112 | —NHCH$_2$CH=CH$_2$ | 19000 | 14000 | $\frac{14.0}{0.39}=35.8$ | 76.3 | 59.2 | 49.5 | 32.6 | 27.5 | 5 |
| 113 | —NHCH$_2$-⬡-NO$_2$ | 7050 | 3500 | $\frac{12.4}{0.39}=31.8$ | 89.2 | 80.3 | 47.9 | 40.0 | 30.5 | 10.0 |
| 114 | —NHSO$_2$-⬡ | 6700 | 1500 | $\frac{10.5}{0.39}=26.9$ | 98.5 | 90.3 | 61.1 | 62.8 | 45.4 | 16.3 |
| 115 | —NHSO$_2$-⬡-Cl | 17700 | 1400 | $\frac{6.0}{0.39}=15.4$ | 100 | 86.7 | 58.0 | 82.5 | 37.4 | 10.8 |
| 116 | —NHSO$_2$-⬡-CH$_3$ | 10000 | 1250 | $\frac{7.8}{0.39}=20.0$ | 94.2 | 80.4 | 50.0 | 46.3 | 32.6 | 5 |
| 117 | —NHCONH-⬡-H | 11500 | 1052 | $\frac{14.2}{0.19}=74.7$ | 90.0 | 76.3 | 60.4 | 47.0 | 39.5 | 20.0 |
| 118 | —NHCCH$_3$<br>   ‖<br>   NH | 3640 | 6750 | $\frac{8.0}{0.19}=42.1$ | — | 95.6 | 69.9 | 33.0 | 9.8 | 35.1 |
| 119 | —NHCCH$_2$-⬡<br>   ‖<br>   NH | 12750 | 7800 | $\frac{5.1}{0.09}=56.7$ | 100 | 98.1 | 92.4 | 34.6 | 0 | 0 |
| 120 | —NHCCH$_2$-⬡-Cl<br>   ‖<br>   NH | 19000 | 14000 | $\frac{4.8}{0.09}=53.3$ | 98.6 | 83.1 | 82.7 | 65.7 | 39.7 | 0 |
| Starting material | —NH$_2$ | 19000 | 12500 | $\frac{9.3}{0.19}=49.0$ | 99 | 84 | 73 | 16 | 49 | 1 |

Table 5

Terminal Chain: —NH(CH$_2$)$_3$NH(CH$_2$)$_3$X'

| No.* | X' | mcg pot/mg | | LD$_{50}$/ED$_{50}$ | Dose (mg/kg), Ehrlich Solid Inhibition % 8.1 | 2.7 | 0.9 | 0.3 | 0.1 | 0.03 |
|---|---|---|---|---|---|---|---|---|---|---|
| 121 | —NHCOCH$_3$ | 1250 | 900 | $\frac{20.0}{0.39}=51.2$ | 72 | 50 | 42 | 36 | 18 | 0 |
| 122 | —NHCO-⬡ | 4084 | 1084 | $\frac{20.0}{0.39}=51.2$ | 88 | 76 | 32 | 16 | 0 | 0 |
| 123 | —NHCO(CH$_2$)$_2$COOH | 150 | 130 | $\frac{21.0}{0.19}=110.0$ | 87 | 67 | 53 | 31 | 16 | 3 |
| 124 | —NHCH$_2$-⬡-NO$_2$ | 6250 | 3100 | $\frac{12.2}{0.39}=31.2$<br>$\frac{14.8}{0.19}=77.9$ | 74<br>92 | 53<br>79 | 46<br>56 | 25<br>39 | 7<br>20 | 0<br>7 |
| 125 | —NHCCH$_2$-⬡<br>   ‖<br>   NH | 9600 | 7000 | $\frac{9.3}{0.19}=49$ | 99 | 84 | 73 | 16 | 49 | 1 |
| Starting material | —NH$_2$ | 2067 | 8900 | | | | | | | |

Table 6

Terminal Chain: —NH(CH$_2$)$_3$NH(CH$_2$)$_6$X'

| No.* | X' | mcg pot/mg | | LD$_{50}$ED$_{50}$ | Dose (mg/kg), Ehrlich Solid Inhibition % 8.1 | 2.7 | 0.9 | 0.3 | 0.1 | 0.03 |
|---|---|---|---|---|---|---|---|---|---|---|
| 126 | —NHCOCH$_3$ | 1480 | 1200 | $\frac{17.2}{0.39}=44.1$ | 80 | 59 | 50 | 42 | 35 | 16 |
| 127 | —NHCO-⬡ | 6388 | 589 | $\frac{17.4}{0.39}=44.6$ | 90 | 81 | 56 | 18 | 8 | 0 |
| 128 | —NHCO(CH$_2$)$_2$COOH | 220 | 176 | $\frac{21.0}{0.19}=110.5$ | 95 | 69 | 58 | 38 | 25 | 10 |

Table 6 -Continued

Terminal Chain: $-NH(CH_2)_3NH(CH_2)_4X'$

| No.* | X' | | mcg pot/mg | $LD_{50}ED_{50}$ | | Dose (mg/kg), Ehrlich Solid Inhibition % | | | | | |
|---|---|---|---|---|---|---|---|---|---|---|---|
| | | | | | | 8.1 | 2.7 | 0.9 | 0.3 | 0.1 | 0.03 |
| 129 | $-NHCH_2$ | $-NO_2$ | 8100 | 4600 | $\frac{11.5}{0.39}=29.5$ | 82 | 63 | 49 | 32 | 16 | 0 |
| 130 | $-NHCCH_2$<br>$\ \ \ \|\|$<br>$\ \ \ NH$ | $-Cl$ | 17640 | 21000 | $\frac{16.5}{0.19}=86.8$ | 95 | 83 | 61 | 42 | 36 | 20 |
| 131 | $-NHCOCH=C-COOH$<br>$\ \ \ \ \ \ \ \ \ \ \ \ \|$<br>$\ \ \ \ \ \ \ \ \ \ \ \ CH_3$ | | 185 | 161 | $\frac{11.0}{0.39}=28.2$ | 89 | 62 | 48 | 29 | 15 | 5 |
| 132 | $-NHCCH_2-$<br>$\ \ \ \|\|$<br>$\ \ \ NH$ | | 10153 | 14313 | $\frac{13.6}{0.19}=71.6$ | 90 | 76 | 55 | 49 | 32 | 10 |
| Starting material | $-NH_2$ | | 2517 | 12819 | $\frac{8.3}{0.19}=43.7$ | 83 | 57 | 42 | 26 | 65 | 0 |

Note:
*:The compound numbers correspond to those mentioned in Table 1 of the present specification.

As is clear from above Table 1, bleomycin derivatives show high index number indicating a large difference between a measure amount showing toxicity and that showing life-prolonging effect as compared with each starting bleomycin used as a control medicine. The growth inhibition values of Ehrlich solid carcinoma in animal show that a long reached action of said substances is very effective. Therefore, it can be said that these derivatives are safer and more effective to treat tumor than their mother compounds bleomycins.

Subsequently an anticancer effect observed with a Compound No. 49, N-succinylbleomycin $A_5$ (to be called Compound No. 49 below) among compounds of the present invention will be described.

1. Mouse Ehrlich cancer (Solid type)

Ehrlich ascites carcinoma, $2 \times 10^6$ cells, was subcutaneously transplanted to the inquinal region of 6 weeks old male mice, ICR family, 5 in one group, to which Bleomycin was intraperitoneally administered once a day continuously for 10 days from 24 hours after the transplantation. Subcutaneous carcinoma was taken out and weighed on the 15th day after the subcutaneous transplantation. The effect was decided by obtaining the inhibition ratios to the weight of subcutaneous carcinoma observed in the non-treated control group, followed by plotting each inhibition ratio for each dose on a normal probability paper to obtain $LD_{50}$.

The result is shown in Table 7. The result of Bleomycin complex Cu-free hydrochloride measured at the same time is simultaneously shown for the comparison.

Table 7

Anticancer action to Ehrlich solid cancer

| | Compound No. 49 (122 μ/mg) | | Bleomycin complex (1340 μ/mg) | |
|---|---|---|---|---|
| dose mg/kg×10 | weight of carcinoma mg (mean±SE) | inhibition ratio (%) | weight of carcinoma mg (mean±SE) | inhibition ratio (%) |
| 8.1 | 240±60 | 91.8 | 220±40 | 91.1 |
| 2.7 | 690±170 | 76.4 | 770±220 | 69.0 |
| 0.9 | 1290±260 | 55.8 | 970±370 | 60.9 |
| 0.3 | 1330±160 | 54.5 | 1550±100 | 37.5 |
| 0.1 | 1680±140 | 42.5 | 1900±410 | 23.4 |
| 0.03 | 2060±300 | 29.5 | 2280±220 | 8.1 |
| 0 | 2920±220 | 0 | 2480±900 | 0 |
| $LD_{50}$ | 0.25 mg/kg | | 0.58 mg/kg | |

As is shown in the above table, the anticancer potency of Compound No. 49 to Ehrlich solid cancer is about twice as strong as that of Bleomycin-complex.

2. Naturally grown sarcoma in dog

A mongrel (15.1 kg) with Sticker sarcoma grown in the vagina mucous membrane was intravenously administered with 1.8 mg/kg of Compound No. 49 twice a week.

The progress of the therapeutical effectiveness is summarized as follows:

A remarkable reduction was observed in size of sarcoma (diameter $6.0 \times 4.0 \rightarrow 3.2 \times 2.2$ cm) showing a marked effectivenss. The sarcoma was so reduced in size that it was not observed from outside after 7th administration (4th week), but the sarcoma slightly remained inside the vagina. Gradual reduction was still observed thereafter, but a slight rise of serum GPT (Glutamic Pyruvic Transaminase) (13   55) was observed after 28 times administrations (14th week) (total dose 52.2 mg/kg) and since toxic symptoms such as supplation at ruffed part of extremity appeared after 32 times administrations (16th week) (total dose 57.6 mg/kg), treatment was discontinued. The sarcoma in the vagina has almost disappeared 30 weeks after the initiation of the therapy (13 weeks after the discontinuation) and none of relaps has been observed even after 43 weeks. Any abnormal values have not been found in clinical test values, the value of serum GPT which showed a rise before became normal again and the body weight also showed no change compared with that observed before the treatment.

As mentioned above, Compound No. 49 showed a remarkable efficacy to Sticker sarcoma naturally grown in dog.

3. Inhibitory effect for cancerization observed with Compound No. 49 on 20-methylcholanthrane (20-MC)-induced mouse squamous cell carcinoma.

dd/Y-F mice (female 10 weeks old), 12 in 1 group, were shaved at the back on which 20-MC acetone solution was applied twice a week for 18 weeks to induce squamous cell carcinoma. 250 mg/mouse or 62.5 mg/mouse of Compound No. 49 was intraperitoneally injected twice a week extending over 14 weeks from 6 weeks after the initiation of the treatment. Bleomycin $A_5$ Cu-containing trihydrochloride was used as a control.

The result was decided 1 week after the final injection of Bleomycin, and the cancer part was fixed with formalin for tissue specimen to confirm the squamous cell carcinoma. The result is shown in Table 8.

Table 8

Effect of Compound No. 49 and Bleomycin A₅ on Squamous Cell Carcinoma Induced by 20 MC to Mice

| Bleomycin | mcg/mouse | Cancerized treated | Cancerization % | Inhibition % |
|---|---|---|---|---|
| A₅ | 250.0 | 4/11 | 36.4 | 48.6 |
|  | 62.5 | 6/11 | 54.5 | 23.0 |
| No. 49 | 250.0 | 3/12 | 25.0 | 64.7 |
|  | 62.5 | 6/12 | 50.0 | 29.4 |
| Control | — | 17/24 | 70.8 | 0 |

As shown in the Table 8, Compound No. 49 showed 64.7% cancer inhibition ratio to the non-treated control group by 250 mg/mouse administration as well as 29.4% cancer inhibition ratio by 62.5 mg/mouse administration, which is excellent efficacy also compared with that observed by the administration of the same amount of Bleomycin A₅, and none of toxicity was observed with any doses.

For purpose of illustration only, this invention will now be illustrated by the following examples. Of course, this invention shall not be limited to the following examples.

EXAMPLE 1

Synthesis of 3-(N-crotonyl)aminopropylaminobleomycin

100 Milligrams of 3-aminopropylaminobleomycin Cu-containing dihydrochloride was dissolved in 5 ml of methanol. To the solution were added 0.12 ml of pyridine and 116 mg of crotonic anhydride with stirring. The mixture was then allowed to stand at room temperature for 24 hours. The reaction liquid was concentrated under reduced pressure. The residue was dissolved in a small amount of water. The solution was passed through a column packed with a suspension of 23 ml of CM-Sephadex C-25 in 0.02 M aqueous ammonium chloride to adsorb the objective product. The product once adsorbed on the adsorbent was eluted with 0.1 M aqueous ammonium chloride. The fractions of the eluate containing the objective product were collected and then passed through a column packed with a suspension of 7 ml of active carbon in water to adsorb the objective product. After washing with water, the product once adsorbed on the adsorbent was eluted with acetone-0.02 N hydrochloric acid (1 : 1 by volume). The eluate was concentrated to dryness to obtain 85.9 mg of 3-(N-crotonyl)aminopropylaminobleomycin Cu-containing hydrochloride (1850 mcg potency/mg against *Mycobacterium smegmatis* 607). Yield: 82%.

EXAMPLE 2

Synthesis of 3-(N-phenoxyacetyl)aminopropylaminobleomycin

One gram of 3-aminopropylaminobleomycin Cu-containing dihydrochloride was dissolved in a mixture of 13 ml of water and 120 ml of acetone. To the solution were added 400 mg of sodium bicarbonate and 780 mg of phenoxyacetyl chloride with stirring. The mixture was allowed to stand at room temperature for 4.5 hours. The pH value of the mixture was adjusted to 4.5 by the addition of hydrochloric acid, and the mixture was concentrated under reduced pressure, and the concentrate was filtered. The filtrate was passed through a column packed with a suspension of 120 ml of CM-Sephadex C-25 in 0.02 M aqueous ammonium chloride to adsorb the objective product. The product once adsorbed on the adsorbent was eluted with 0.1 M aqueous ammonium chloride. The eluate fraction containing the objective product was collected and passed through a column packed with a suspension of 150 ml of Amberlite CG-50 (H-type) in water to adsorb the objective product and washed successively with 750 ml of 0.5% acetic acid and 750 ml of water. The product once adsorbed on the adsorbent was eluted with 0.02 N hydrochloric acid-methanol (1 : 1 by volume). The eluate was concentrated to dryness under reduced pressure to obtain 390 mg of 3-(N-phenoxyacetyl)aminopropylaminobleomycin Cu-containing hydrochloride (3500 mcg potency/mg against *Mycobacterium smegmatis* 607). Yield: 35.4%

The above-mentioned reaction was repeated by replacing the phenoxyacetyl chloride by 359 mg of chloroacetyl chloride to obtain 438 mg of 3-(N-chloroacetyl)aminopropylaminobleomycin Cu-containing hydrochloride (760 mcg potency/mg against *Mycobacterium smegmatis* 607). Yield: 41.5%.

EXAMPLE 3

Synthesis of 3-(N-butyryl)aminopropylaminobleomycin

100 Milligrams of 3-aminopropylaminobleomycin Cu-containing (free base) was dissolved in 2 ml of acetone and 0.5 ml of water. To the solution was added 1 ml of acetone solution containing 20 mg of butyric acidazide prepared from butyric acid hydrazide. The mixture was allowed to stand at room temperature for 16 hours, and warmed to 40°C for 40 minutes. The reaction liquid was concentrated under reduced pressure. To the residue was added 10 ml of water. The mixture was passed through a column packed with a suspension of 20 ml of CM-Sephadex C-25 in a 0.02 M aqueous ammonium chloride solution to adsorb the objective product. The product once adsorbed on the adsorbent was eluted successively with 0.1 M aqueous ammonium chloride and 0.2 M aqueous ammonium chloride. The collected eluate fraction containing the objective product was treated in the same manner as in the above-mentioned examples to desalt the product. Thus, 38 mg of 3-(N-butyryl)aminopropylaminobleomycin Cu-containing hydrochloride (1480 mcg potency/mg against *Mycobacterium smegmatis* 607) was obtained. Yield: 36%.

EXAMPLE 4

Synthesis of 3-(N-propionyl)aminopropylaminobleomycin

100 Milligrams of 3-aminopropylaminobleomycin Cu-containing dihydrochloride was dissolved in a mixture of 3 ml of acetone and 2 ml of water. To the solution were added 14 mg of 1-ethyl-3-dimethylaminopropylcarbodiimide and 10 mg of propionic acid. The pH value of the mixture was adjusted to 4.8 and the mixture was allowed to stand for 16 hours. The reaction liquid was concentrated under reduced pressure. To the residue was added 10 ml of water. The mixture was passed through a column packed with a suspension of 20 ml of CM-Sephadex C-25 in a 0.02 M aqueous ammonium chloride solution to adsorb the objective product. The product once adsorbed on the adsorbent was eluted with a 0.1 M aqueous ammonium chloride solution.

The collected eluate fraction containing the objective product was passed through a column packed with 20 ml of Amberlite CG-50 (H type) to adsorb the objective product. The product once adsorbed on the adsorbent was successively washed with 100 ml of water, 100 ml of 0.5% aqueous acetic acid solution, 100 ml of water and then eluted with acetone-0.02 N hydrochloric acid (1 : 1 by volume). The eluate was concentrated to dryness under reduced pressure to obtain 28 mg of 3-(N-propionyl)aminopropylaminobleomycin Cu-containing hydrochloride (900 mcg potency/mg against *Mycobacterium smegmatis* 607). Yield: 26.5%.

In the same manner as described above, the compounds as mentioned in Table 9 were synthesized.

Table 9

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | 3-(N-Acetyl)aminopropyl-aminobleomycin 100 mg | (a) MeOH 5 ml | $CH_3CO$<br>$\phantom{CH_3CO}$>O<br>$CH_3CO$<br>0.11 ml | Pyridine 0.14 ml | 24 |
| 2 | 3-(N-Propionyl)aminopropyl-propylaminobleomycin 100 mg | (a) MeOH 5 ml | $C_2H_5CO$<br>$\phantom{C_2H_5CO}$>O<br>$C_2H_5CO$<br>0.12 ml | Pyridine 0.08 ml | 5 |
| 3 | 3-(N-Butyryl)aminopropyl-aminobleomycin 100 mg | (a) MeOH 5 ml | $C_3H_7CO$<br>$\phantom{C_3H_7CO}$>O<br>$C_3H_7CO$<br>0.22 ml | Pyridine 0.24 ml | 4 |

| Amount of CM Sephadex (ml) | Concentration of ammonium chloride eluent | Yield | mcg Potency per mg against Mycobacterium smegmatis 607 |
|---|---|---|---|
| 23 | 0.1 M | 50.6 mg 49 % | 460 |
| 15 | 0.1 M | 50.5 mg 48 % | 900 |
| 23 | 0.1 M | 75.5 mg 72 % | 1530 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 4 | 3-(N-OCtanoyl)aminopropyl-aminobleomycin 100 mg | (a) MeOH 5 ml | $C_7H_{15}CO$<br>$\phantom{C_7H_{15}CO}$>O<br>$C_7H_{15}CO$<br>0.15 ml | Pyridine 0.15 ml | 5 2/3 |
| 5 | 3-(N-Lauryol)aminopropyl-aminobleomycin 100 mg | (a) MeOH 5 ml | $C_{11}H_{23}CO$<br>$\phantom{C_{11}H_{23}CO}$>O<br>$C_{11}H_{23}CO$<br>314 mg | — | 6 (boil) |
| 6 | 3-(N-Crotonyl)aminopropyl-aminobleomycin 100 mg | (a) MeOH 5 ml | $CH_3CH{=}CHCO$<br>$\phantom{CH_3CH{=}CHCO}$>O<br>$CH_3CH{=}CHCO$<br>116 mg | Pyridine 0.12 ml | 3 |
| 7 | 3-(N-Succinyl)aminopropyl-aminobleomycin 100 mg | (a) MeOH 5 ml | $CH_2CO$<br>$\phantom{CH_2CO}$>O<br>$CH_2CO$<br>100 mg | Pyridine 0.1 ml | 4 |

| Amount of CM Sephadex (ml) | Concentration of ammonium chloride eluent | Yield | mcg Potency per mg against Mycobacterium smegmatis 607 |
|---|---|---|---|
| 20 | 0.1 – 0.2 M | 56.4 mg 52 % | 9600 |
| 20* | — | 38.4 mg 34 % | 7560 |
| 23 | 0.1 M | 85.9 mg 82 % | 1850 |
| 20 | 0.1 M | 58 mg 53.9 % | 101 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 8 | 3-(N-Maleyl)aminopropyl-aminobleomycin 100 mg | (a) MeOH 5 ml | $CHCO$<br>$\phantom{CHCO}$‖ >O<br>$CHCO$<br>52 mg | Pyridine 0.1 ml | 3 |

Table 9-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 9 | 3-(N-Phenoxyacetyl)amino-propylaminobleomycin<br><br>100 mg | (a)<br>MeOH<br><br>5 ml | (PhO-OCH$_2$CO)$_2$O<br><br>100 mg | | 24 (50°C) |
| 10 | 3(N-Benzoyl)aminopropyl-aminobleomycin<br><br>100 mg | (a)<br>MeOH<br><br>5 ml | (Ph-CO)$_2$O<br><br>97 mg | Pyridine<br><br>0.05 ml | 3 1/3 |
| 11 | 3-(N-Nicotinoyl)amino-propylaminobleomycin<br><br>100 mg | (a)<br>MeOH<br><br>5 ml | (Pyridyl-CO)$_2$O<br><br>176 mg | Pyridine<br><br>0.15 ml | 4 |
| 12 | 3-(N-Thenoyl)aminopropyl-aminobleomycin<br><br>100 mg | (a)<br>MeOH<br><br>5 ml | (Thienyl-CO)$_2$O<br><br>125 mg | Pyridine<br><br>0.1 ml | 3 |
| 13 | 3-(N-Furoyl)aminopropyl-aminobleomycin<br><br>100 mg | (a)<br>MeOH<br><br>5 ml | (Furyl-CO)$_2$O<br><br>620 mg | Pyridine<br><br>0.48 ml | 48 |

| | | | | |
|---|---|---|---|---|
| 30 | 0.1 M | 73.4 mg<br>68 % | 88 | |
| 20 | 0.1 – 0.2 M | 31 mg<br>25.5 % | 3500 | |
| 22 | 0.1 M | 35.5 mg<br>33 % | 1800 | |
| 15 | 0.2 M | 51.1 mg<br>47 % | 2200 | |
| 24 | 0.1 M | 66 mg<br>61 % | 2280 | |
| 23 | 0.05 – 0.1 M | 41.7 mg<br>39 % | 1780 | |

*To the reaction liquid was added 5 times the volume of ether. The resulting precipitate was recovered by filtration and dissolved in n-butanol. The solution was passed through a column packed with 20 ml of Sephadex LH20 to adsorb the objective product. The product once adsorbed on the adsorbent was eluted with n-butanol. (a): Cu-containing hydrochloride

EXAMPLE 5

Synthesis of 3-(N-benzyl)aminopropylaminobleomycin

200 Milligrams of 3-aminopropylaminobleomycin Cu-containing dihydrochloride was dissolved in a mixture of 4 ml of water and 12 ml of ethanol. To the solution was added 0.1 ml of triethylamine, and 73.5 mg of benzyl bromide was added with stirring. The mixture was allowed to stand at room temperature for 26 hours and then at 3°C for 48 hours. The reaction liquid was concentrated and then passed through a column packed with a suspension of 50 ml of CM-Sephadex C-25 in a 0.02 M aqueous ammonium chloride solution to adsorb the objective product. The product once adsorbed on the adsorbent was eluted with a 0.1 M aqueous ammonium chloride solution. 270 Milliliters of the second half of the eluate was collected and passed through a column packed with 35 ml of Amberlite CG-50 (H type) to adsorb the objective product. The product once adsorbed on the adsorbent was washed successively with each 175 ml of water, 0.5% acetic acid and water and then eluted with 0.02 N hydrochloric acid-methanol (1 : 1 by volume). 147 Milliliters of the second half of the eluate (total volume: 217 ml) was collected and neutralized with Dowex 44 (tradename for an ion exchange resin manufactured and sold by the Dow Chemical Co.). The treated eluate was concentrated under reduced pressure and dried to obtain 80 mg of 3-(N-benzyl)aminopropylaminobleomycin Cu-containing dihydrochloride (5833 mcg potency/mg against *Mycobacterium smegmatis* 607). Yield: 37.2%.

EXAMPLE 6

Synthesis of 3-(N-p-toluenesulfonyl)amino-propylaminobleomycin

100 Milligrams of 3-aminopropylaminobleomycin

Cu-containing dihydrochloride was dissolved in a mixture of 2.5 ml of water and 4 ml of acetone. To the solution was added 20 mg of sodium bicarbonate, and 28.4 mg of p-toluenesulfonyl chloride was added with stirring. The mixture was reacted at room temperature for 2 2/3 hours. The reaction liquid was neutralized and passed through a column packed with a dispersion of 5 ml of Amberlite IRA 400 (Cl type) in water and then the resin layer was washed with 10 ml of water. The resin eluate and washings were combined and passed through a column packed with a suspension of 20 ml of CM-Sephadex C-25 in a 0.02 M aqueous ammonium chloride solution to adsorb the objective product. The product once adsorbed on the adsorbent was eluted with 139 ml of a 0.1 M aqueous ammonium chloride solution. 76 Milliliters of the second half fractions of the eluate were collected and passed through a column packed with 10 ml of Amberlite CG-50 (H type) to adsorb the objective product. The resin layer was washed successively with each 50 ml of water, 0.5% acetic acid and water and eluted with acetone-0.02 N hydrochloric acid (1 : 1 by volume). The eluate was concentrated under reduced pressure and dried to obtain 52.8 mg of 3-(N-p-toluenesulfonyl)-aminopropylaminobleomycin Cu-containing hydrochloride (8000 mcg potency/mg against *Mycobacterium smegmatis* 607). Yield: 47%.

In the same manner as described above, the compounds of Table 10 were synthesized.

Table 10

| No. | Name of derivative; amount of the starting bleomycin | Solvent and amount thereof used | Reagent and amount thereof used | Alkali and amount thereof used | Reaction time (hrs) | Amount CM-Sephadex (ml) | Concentration of ammonium chloride eluent | Yield | mcg Potency per mg against Mycobacterium smegmatis 607 |
|---|---|---|---|---|---|---|---|---|---|
| 1 | 3-(N-Ethyl)aminopropyl-aminobleomycin 100 mg | (b) EtOH 3 ml / H$_2$O 1.5 ml | C$_2$H$_5$Br 15 mg | Et$_3$N 0.025 ml | 16 | 15 | 0.1 M | 19 mg / 18.6 % | 1700 |
| 2 | 3-(N-p-Nitrobenzyl)amino-propylaminobleomycin 500 mg | (b) H$_2$O 10 ml / EtOH 30 ml | NO$_2$-C$_6$H$_4$-CH$_2$Br 235 mg | Et$_3$N 0.25 ml | 3.5 / 30(50°C) | 70 | 0.1 – 0.2 M | 90 mg / 16.2 % | 11800 |
| 3 | 3-(N-Methylsulfonyl)amino-propylaminobleomycin 200 mg | (b) H$_2$O 2 ml / Acetone 2 ml | CH$_3$SO$_2$Cl 20 mg | NaHCO$_3$ 40 mg | 10 | 20 | 0.1 M | 29.4 mg / 28 % | 501 |
| 4 | 3-(N-Benzenesulfonyl)amino-propylaminobleomycin 200 mg | (a) H$_2$O 2.5 ml / Acetone 4 ml | C$_6$H$_5$-SO$_2$Cl 34 mg | NaHCO$_3$ 20 mg | 1 45/60 | 35 | 0.1 M | 89.7 mg / 41 % | 3500 |
| 5 | 3-(N-p-Chlorobenzenesulfonyl)-aminopropylaminobleomycin 100 mg | (a) H$_2$O 2 ml / Acetone 4 ml | Cl-C$_6$H$_4$-SO$_2$Cl 13.7 mg | NaHCO$_3$ 20 mg | 3.5 | 17 | 0.1 M | 49.7 mg / 43.9 % | 7010 |
| 6 | 3-(N-β-Naphthalenesulfonyl)-aminopropylaminobleomycin 100 mg | (a) H$_2$O 2 ml / Acetone 4 ml | C$_{10}$H$_7$-SO$_2$Cl 17.6 mg | NaHCO$_3$ 20 mg | 2 | 20 | 0.1 M | 34.9 mg / 30.5 % | 4350 |

(a): Cu-containing hydrochloride
(b): Cu-containing dihydrochloride

EXAMPLE 7

Synthesis of 3-(N-phenylcarbamoyl)aminopropylaminobleomycin

200 Milligrams of 3-aminopropylaminobleomycin Cu-containing dihydrochloride was dissolved in 10 ml of water. To the solution was added 60 mg of sodium bicarbonate, and 0.04 ml of phenyl isocyanate was added dropwise with stirring. The mixture was reacted at room temperature for 7 hours and then at 3°C for 40 hours. The pH of the reaction liquid was adjusted to 3 and filtered. The filtrate was passed through a column packed with a suspension of 20 ml of CM-Sephadex C-25 in a 0.02 M aqueous ammonium chloride solution to adsorb the objective product. The product once adsorbed on the adsorbent was eluted with a 0.1 M aqueous ammonium chloride solution. 125 Milliliters of the second half of the eluate (total volume: 215 ml) was collected and passed through a column packed with 30 ml of Amberlite CG-50 (H type) to adsorb the objective product. The product once adsorbed on the adsorbent was washed successively with each 150 ml of water, 0.5% acetic acid and water and eluted with 0.02 N hydrochloric acid-acetone (1 : 1 by volume). The eluate was concentrated to dryness under reduced pressure to obtain 90 mg of 3-(N-phenylcarbamoyl)aminopropylaminobleomycin Cu-containing hydrochloride (3566 mcg potency/mg against *Mycobacterium smegmatis* 607). Yield: 41.6%

The above-mentioned reaction was repeated by replacing the said phenyl isocyanate by 0.06 ml of cyclohexyl isocyanate to obtain 40 mg of 3-(N-cyclohexylcarbamoyl)aminopropylaminobleomycin Cu-containing hydrochloride (8751 mcg potency/mg against *Mycobacterium smegmatis* 607). Yield: 18.3%.

EXAMPLE 8

Synthesis of 3-(N-benzimidoyl)aminopropylaminobleomycin

100 Milligrams of 3-aminopropylaminobleomycin Cu-containing dihydrochloride was dissolved in 25 ml of water. To the solution was added 25 mg of methyl benzimidate hydrochloride with stirring. The pH of the mixture was adjusted to 9.2 by the addition of triethylamine. The mixture was maintained at room temperature for 5 hours. The reaction liquid was concentrated and the pH of the concentrate was adjusted to 6.2. The treated concentrate was passed through a column packed with a suspension of 20 ml of CM-Sephadex C-25 in a 0.02 M aqueous ammonium chloride solution to adsorb the objective product. The product once adsorbed on the adsorbent was eluted with a 0.1 M aqueous ammonium chloride solution. The eluate fractions containing the product were collected and adsorbed on 5 ml of active carbon. The product adsorbed was washed with water and eluted with 0.02 N hydrochloric acid-acetone (1 : 1 by volume). The eluate was concentrated under reduced pressure and then dried to obtain 45 mg of 3-(N-benzimidoyl)aminopropylaminobleomycin Cu-containing dihydrochloride ( 4423 mcg potency/mg against *Mycobacterium smegmatis* 607). Yield: 40.9%.

In the same manner as described above, the compounds of Table 11 were synthesized.

Table 11

| No. | Name of derivative; amount of the starting bleomycin | Solvent and amount thereof used | Reagent and amount thereof used | Alkali and amount thereof used | Reaction time (hrs) | Amount of CM-Sephadex (ml) | Concentration of ammonium chloride eluent | Yield | mcg Potency per mg against *Mycobacterium smegmatis* 607 |
|---|---|---|---|---|---|---|---|---|---|
| 1 | 3-(N-Acetimidoyl)aminopropylaminobleomycin 600 mg | (b) $H_2O$ 15 ml | $CH_3COCH_3$ $\|$ $NH \cdot HCl$ 90 mg | Triethylamine (pH 8.9) | 10 | 50 | 0.1 – 0.25 M | 320 mg 50 % | 1867 |
| 2 | 3-(N-Formimidoyl)aminopropylaminobleomycin 100 mg | (b) $H_2O$ 5 ml | $H-C-OC_2H_5$ $\|$ $NH \cdot HCl$ 164 mg | $Et_3N$ (pH 9.25) | 142 | 20 | 0.02 – 0.2 M | 73.8 mg 70.9 % | 272 |
| 3 | 3-(N-Propioimidoyl)aminopropylaminobleomycin 100 mg | (b) $H_2O$ 2.5 ml | $C_2H_5C-OCH_3$ $\|$ $NH \cdot HCl$ 66 mg | $Et_3N$ (pH 9.4) | 5 | 20 | 0.02 – 0.2 M | 53.5 mg 50.4 % | 2252 |
| 4 | 3-(N-Valeroimidoyl)aminopropylaminobleomycin 100 mg | (b) $H_2O$ 2.5 ml | $C_4H_9C-OCH_3$ $\|$ $NH \cdot HCl$ 22 mg | $Et_3N$ (pH 9.4) | 2 | | | | |

Table 11-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 5 | 3-(N-Pelargonimidoyl)amino-propylaminobleomycin<br>100 mg | (b) H$_2$O<br>2.5 ml<br>Acetone<br>2 ml | $C_8H_{17}C(=NH\cdot HCl)OCH_3$<br>3 mg | Et$_3$N<br>(pH 9.1) | 3 |
| 6 | 3-(N-Benzimidoyl)amino-propylaminobleomycin<br>100 mg | (b) H$_2$O<br>2.5 ml | $C_6H_5-C(=NH\cdot HCl)OCH_3$<br>25 mg | Et$_3$N<br>(pH 9.2) | 5 |
| 7 | 3-(N-p-Methoxybenzimidoyl)-aminopropylaminobleomycin<br>100 mg | (b) H$_2$O<br>5 ml | $CH_3O-C_6H_4-C(=NH\cdot HCl)OCH_3$<br>54.5 mg | Et$_3$N<br>(pH 9.3) | 6.5 |
|  | 20 | 0.1 M | 35 mg<br>32.3 % | | 6531 |
|  | 20 | 0.05 – 0.1 M | 22 mg<br>19.7 % | | 29370 |
|  | 20 | 0.1 M | 45 mg<br>40.9 % | | 4423 |
|  | 20 | 0.02 – 0.1 M | 76 mg<br>68.1 % | | 5230 |
| 8 | 3-(N-p-Toluimidoyl)amino-propylaminobleomycin<br>100 mg | (b) H$_2$O<br>2.5 ml<br>Acetone<br>1 ml | $CH_3-C_6H_4-C(=NH\cdot HCl)OCH_3$<br>25 mg | Et$_3$N<br>(pH 8.9) | 5 |
| 9 | 3-(N-m-toluimidoyl)amino-propylaminobleomycin<br>100 mg | (b) H$_2$O<br>2.5 ml<br>Acetone<br>1 ml | $m\text{-}CH_3\text{-}C_6H_4\text{-}C(=NH\cdot HCl)OCH_3$<br>27 mg | Et$_3$N<br>(pH 9.1) | 5 |
| 10 | 3-(N-m-Nitrobenzimidoyl)-aminopropylaminobleomycin<br>100 mg | (b) H$_2$O<br>2.5 ml<br>Acetone<br>1 ml | $m\text{-}NO_2\text{-}C_6H_4\text{-}C(=NH\cdot HCl)OCH_3$<br>30 mg | Et$_3$N<br>(pH 9.2) | 23 |
| 11 | 3-(N-Phenylacetimidoyl)-aminopropylaminobleomycin<br>200 mg | (b) H$_2$O<br>5 ml | $C_6H_5-CH_2-C(=NH\cdot HCl)OCH_3$<br>60 mg | Et$_3$N<br>(pH 9.0) | 5.5 |
|  | 20 | 0.1 M | 40 mg<br>35.9 % | | 7692 |
|  | 20 | 0.1 M | 50 mg<br>44.8 % | | 5956 |
|  | 20 | 0.1 M | 40 mg<br>35.3 % | | 5790 |
|  | 20 | 0.1 M | 70 mg<br>32.4 % | | 6875 |
| 12 | 3-(N-p-Chlorophenylacet-imidoyl)aminopropylamino-bleomycin<br>300 mg | (b) H$_2$O<br>7 ml | $Cl-C_6H_4-CH_2COCH_3$<br>$NH\cdot HCl$<br>190 mg | Et$_3$N<br>(pH 9.1) | 5 |

Table 11-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 13 | 3-(N-Cinnamoimidoyl)amino-propylaminobleomycin<br><br>100 mg | (b) $H_2O$<br>2.5 ml<br><br>Acetone<br>1 ml | ⟨O⟩-CH=CH-C(-OCH$_3$)=NH·HCl<br><br>60 mg | Et$_3$N<br><br>(pH 9.1) | 24 |
| 14 | 3-(N-α-Naphthylacetimidoyl)-aminopropylaminobleomycin<br><br>100 mg | (b) $H_2O$<br>3 ml<br><br>Acetone<br>3 ml | CH$_2$-C(-OCH$_3$)=NH·HCl (naphthyl)<br><br>105 mg | Et$_3$N<br><br>(pH 9.1) | 29 |
| 15 | 3-(N-3-Dimethylamino-propioimidoyl)aminopropyl-aminobleomycin<br><br>100 mg | (b)<br><br>$H_2O$<br>2.5 ml | (CH$_3$)$_2$N(CH$_2$)$_2$-C(-OCH$_3$)=NH·HCl<br><br>88 mg | Et$_3$N<br><br>(pH 9.0) | 22 |

(b): Cu-containing dihydrochloride

| | | 100 mg | | |
| --- | --- | --- | --- | --- |
| 60 | 0.1 – 0.15 M | 29.2 % | 14975 | |
| 20 | 0.02 – 0.2 M | 80.9 mg<br>72.7 % | 9900 | |
| 20 | 0.02 – 0.3 M | 51.6 mg<br>45.3 % | 10170 | |
| 20 | 0.1 – 0.2 M | 30 mg<br>27.2 % | 1896 | |

EXAMPLE 9

Synthesis of N-chloroacetylbleomycin A$_5$

One gram of bleomycin A$_5$ Cu-containing trihydrochloride was dissolved in a mixture of 13 ml of water and 20 ml of acetone. To the solution were added 520 mg of sodium bicarbonate and 330 mg of chloroacetyl chloride with stirring. The mixture was allowed to stand for 1 3/4 hours. The pH of the mixture was then adjusted to 4.5 by the addition of hydrochloric acid. Acetone was distilled off under reduced pressure. The residue was diluted with water and passed through a column packed with a suspension of 110 ml of CM-Sephadex C-25 in a 0.02 M aqueous ammonium chloride solution to adsorb the objective product. The product once adsorbed on the adsorbent was eluted successively with 220 ml of a 0.1 M aqueous ammonium chloride solution and 580 ml of a 0.2 M aqueous ammonium chloride solution. The fractions containing the objective product were collected and desalted in the same manner as described above using Amberlite CG-50. The eluate was concentrated to dryness to obtain 439.6 mg of N-chloroacetylbleomycin A$_5$ Cu-containing dihydrochloride (2000 mcg potency/mg against *Mycobacterium smegmatis* 607). Yield: 41.7%.

In the same manner as described above N-(p-nitrobenzoyl)bleomycin A$_5$ Cu-containing dihydrochloride (16000 mcg potency/mg against *Mycobacterium smegmatis* 607) was obtained from p-nitrobenzoyl chloride. Yield: 17.7%.

EXAMPLE 10

Synthesis of N-octanoylbleomycin A$_5$

100 Milligrams of bleomycin A$_5$ Cu-containing trihydrochloride was dissolved in a mixture of 2 ml of ethanol and 0.5 ml of water. To the solution was added 50 mg of ethyl caprylate and the mixture was maintained at 37°C for 16 hours. After the completion of the reaction, the solvent was distilled off under reduced pressure. To the residue was added 10 ml of water. The mixture was extracted with 10 ml of ether. The aqueous layer was passed through a column packed with a suspension of 20 ml of CM-Sephadex C-25 in a 0.02 M aqueous ammonium chloride solution to adsorb the objective product. The product once adsorbed on the adsorbent was eluted successively with 120 ml of a 0.1 M aqueous ammonium chloride solution and 44 ml of a 0.3 M aqueous ammonium chloride solution.

The fractions containing the objective product were collected and then desalted with Amberlite CG-50. The eluate from the residue was concentrated to dryness to obtain 28.2 mg of N-octanoylbleomycin A$_5$ Cu-containing dihydrochloride (17200 mcg potency/mg against *Mycobacterium smegmatis* 607). Yield: 25.5%.

EXAMPLE 11

Synthesis of N-propionylbleomycin A$_5$

100 Milligrams of bleomycin A$_5$ Cu-containing trihydrochloride was dissolved in a mixture of 2 ml of acetone and 0.5 ml of water. To the solution was added 1 ml of acetone solution containing 10 mg of propionic acid azide prepared from propionic acid hydrazide. The mixture was allowed to stand for 24 hours.

After the completion of the reaction, acetone was distilled off under reduced pressure. To the residue was added 10 ml of water. The mixture was passed through a column packed with a suspension of 20 ml of CM-Sephadex C-25 in a 0.02 M aqueous ammonium chloride solution to adsorb the objective product. The product once adsorbed on the adsorbent was eluted successively with a 0.1 M aqueous ammonium chloride solution and a 0.2 M aqueous ammonium chloride solution. The fractions containing the objective product were collected and desalted in the same manner as described above using Amberlite CG-50. The resulting eluate was concentrated to dryness to obtain 21.4 mg of N-propionylbleomycin $A_5$ Cu-containing dihydrochloride (2000 mcg potency/mg against *Mycobacterium smegmatis* 607). Yield: 20.6%.

EXAMPLE 12

Synthesis of N-acetylbleomycin $A_5$

One gram of bleomycin $A_5$ Cu-containing trihydrochloride was dissolved in 50 ml of methanol. To the solution was added 0.78 ml of pyridine and 0.58 ml of acetic anhydride with stirring. The mixture was reacted at room temperature for 5 hours. The reaction mixture was then concentrated under reduced pressure. The concentrate was dissolved in a small amount of water. The solution was passed through a column packed with suspension of 110 ml of CM-Sephadex C-25 in a 0.02 M aqueous ammonium chloride solution to adsorb the objective product. The blue adsorption band containing the objective product was eluted with a 0.2 M aqueous ammonium chloride solution. The eluate fractions containing the product were collected and passed through a column packed with a suspension of 70 ml of active carbon in water to adsorb the objective product. The product once adsorbed on the adsorbent was washed with water and eluted with acetone-0.02 N hydrochloric acid (1 : 1 by volume). The eluate was concentrated to dryness to obtain 552.3 mg of N-acetylbleomycin $A_5$ Cu-containing dihydrochloride (1400 mcg potency/mg against *Mycobacterium smegmatis* 607). Yield: 53.6%.

In the same manner as described above, the compounds of Table 12 were synthesized.

Table 12

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | N-Propionylbleomycin $A_5$<br><br>200 mg | (b)<br>MeOH<br>10 ml | $C_2H_5CO$<br>$C_2H_5CO$ >O<br>0.15 ml | Pyridine<br>0.13 ml | 2.5 |
| 2 | N-butyrylbleomycin $A_5$<br><br>200 mg | (b)<br>MeOH<br>10 ml | $C_3H_7CO$<br>$C_3H_7CO$ >O<br>0.34 ml | Pyridine<br>0.24 ml | 0.75 |
| 3 | N-Octanoylbleomycin $A_5$<br><br>100 mg | (b)<br>MeOH<br>5 ml | $C_7H_{15}CO$<br>$C_7H_{15}CO$ >O<br>295 mg | Pyridine<br>0.1 ml | 23 |

| Amount of CM-Sephadex (ml) | Concentration of ammonium chloride eluent | Yield | mcg Potency per mg against *Mycobacterium smegmatis* 607 |
|---|---|---|---|
| 40 | 0.2, 0.4 M | 107.1 mg<br>51.5 % | 2000 |
| 30 | 0.1, 0.2 M | 117.3 mg<br>55.9 % | 3900 |
| 20 | 0.1, 0.3 M | 56.4 mg<br>51.0 % | 17200 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 4 | N-Crotonylbleomycin $A_5$<br><br>200 mg | (b)<br>MeOH<br>10 ml | $CH_3CH=CHCO$<br>$CH_3CH=CHCO$ >O<br>0.22 ml | Pyridine<br>0.17 ml | 1 |
| 5 | N-Succinylbleomycin $A_5$<br><br>100 mg | (b)<br>MeOH<br>5 ml | $CH_2CO$<br>$\|$<br>$CH_2CO$ >O<br>20 mg | Pyridine<br>0.1 ml | 2.5 |
| 6 | N-Maleylbleomycin $A_5$<br><br>250 mg | (b)<br>MeOH<br>10 ml | $CH-CO$<br>$\|\|$<br>$CH-CO$ >O<br>87 mg | Pyridine<br>0.12 ml | 2.5 |
| 7 | N-Phenoxyacetylbleomycin $A_5$<br><br>300 mg | (b)<br>MeOH<br>10 ml | Ph-$OCH_2CO$<br>Ph-$OCH_2CO$ >O<br>1.13 g | — | 52 (37°C) |

Table 12-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| | 30 | 0.1, 0.2 M | 100.9 mg  48.1 % | 4300 | |
| | 20 | 0.1 M | 70 mg  65.5 % | 200 | |
| | 40 | 0.1, 0.5 M | 133.3 mg  49.8 % | 235 | |
| | 55 | 0.1, 0.2 M | 83 mg  25.3 % | 8500 | |
| 8 | N-Benzoylbleomycin $A_5$  200 mg | (b) MeOH  10 ml | (PhCO)$_2$O  323 mg | Pyridine  0.17 ml | 1 |
| 9 | N-(p-Nitrobenzoyl)-bleomycin $A_5$  100 mg | (b) H$_2$O  4 ml  Acetone  4 ml | (p-NO$_2$-C$_6$H$_4$-CO)$_2$O  77 mg | NaHCO$_3$  50 mg | 1.75 |
| 10 | N-Lauroylbleomycin $A_5$  100 mg | (b) MeOH  5 ml | (CH$_3$(CH$_2$)$_{10}$CO)$_2$O  191 mg | Pyridine  0.06 ml | 5.5  (65°C) |
| 11 | N-Nicotinoylbleomycin $A_5$  200 mg | (b) MeOH  10 ml | (nicotinoyl)$_2$O  236 mg | Pyridine  0.23 ml | 4 |
| | 30 | 0.1, 0.5 M | 118.5 mg  55.2 % | 5100 | |
| | 20 | 0.1, 0.3 M | 18.7 mg  17.7 % | 16000 | |
| | 20 | 0.1, 0.5 M | 39.7 mg  35.1 % | 5700 | |
| | 40 | 0.1, 0.3 M | 137.3 mg  63.9 % | 2800 | |
| 12 | N-Isonicotinoylbleomycin $A_5$  200 mg | (b) MeOH  10 ml | (isonicotinoyl)$_2$O  236 mg | Pyridine  0.23 ml | 6 |
| 13 | N-(2-Furoyl)bleomycin $A_5$  100 mg | (b) MeOH  10 ml | (2-furoyl-CO)$_2$O  368 mg | Pyridine  0.3 ml | 28 |
| 14 | N-(2-Thenoyl)bleomycin $A_5$  300 mg | (b) MeOH  5 ml | (2-thienyl-CO)$_2$O  307 mg | Pyridine  0.24 ml | 4.5 |

Table 12-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 15 | N-Phthalylbleomycin $A_5$<br>200 mg | (b)<br>MeOH<br>10 ml | [phthalic anhydride]<br>146 mg | Pyridine<br>0.17 ml | 1.5 |
|  | 40 | 0.1, 0.3 M | 120.0 mg<br>55.2 % | | 2700 |
|  | 22 | 0.1, 0.3 M | 56.5 mg<br>52.9 % | | 4230 |
|  | 55 | 0.1, 0.5 M | 233.1 mg<br>72.0 % | | 6090 |
|  | 35 | 0.05, 0.1 M | 133.7 mg<br>60.5 % | | 710 |
| 16 | N-4-Nitrophthalylbleomycin $A_5$<br>200 mg | (b)<br>MeOH<br>10 ml | $NO_2$-[phthalic anhydride]<br>100 mg | O Pyridine<br>0.21 ml | 3.5 |
|  | 50 | 0.1 M | 117.2 mg<br>51.5 % | | 390 |

(b): Cu-containing dihydrochloride

EXAMPLE 13

Synthesis of N-butyrylbleomycin $A_5$

100 Milligrams of bleomycin $A_5$ Cu-containing trihydrochloride was dissolved in a mixture of 3 ml of acetone and 2 ml of water. To the solution were added 12 mg of 1-ethyl-3-dimethylaminopropylcarbodiimide hydrochloride and 8 mg of butyric acid. The pH of the mixture was adjusted to 4.7 and the mixture was then allowed to stand for 16 hours. The reaction liquid was concentrated to about one third of its original volume under reduced pressure. To the concentrate was added 10 ml of water. The mixture was passed through a column packed with a suspension of 20 ml of CM-Sephadex C-25 in a 0.02 M aqueous ammonium chloride solution to adsorb the objective product. The product once adsorbed on the adsorbent was eluted with a 0.1 M aqueous ammonium chloride solution.

The fractions containing the objective product were collected and passed through a column packed with 20 ml of Amberlite CG-50 (H type) to adsorb the objective product. The product once adsorbed on the adsorbent was washed successively with 100 ml of water, 100 ml of 0.5% acetic acid and 100 ml of water and then eluted with acetone-0.02 N hydrochloric acid (1 : 1 by volume). The eluate was concentrated to dryness to obtain 32 mg of N-butyrylbleomycin $A_5$ Cu-containing dihydrochloride (3900 mcg potency/mg against *Mycobacterium smegmatis* 607). 25 Milligrams of the thus obtained substance was dissolved in 1 ml of methanol, and hydrogen sulfide gas was introduced into the solution for 10 minutes. Thereafter, the solution was filtered and the filtrate was concentrated to dryness to obtain 20 mg of N-butrylbleomycin $A_5$ Cu-free dihydrochloride (1400 mcg potency/mg, total potency 28 mg). Yield: 80%.

EXAMPLE 14

Synthesis of N-(p-nitrobenzyl)bleomycin $A_5$

One gram of bleomycin $A_5$ Cu-containing trihydrochloride was dissolved in a mixture of 20 ml of water and 60 ml of ethanol. To the solution was added 0.58 ml of triethylamine, and 600 mg of p-nitrobenzyl bromide was added with stirring. The mixture was reacted at room temperature for 35 hours.

The reaction liquid was concentrated and insoluble materials were removed by filtration. The concentrated reaction liquid was then passed through a column packed with a suspension of 150 ml of Sephadex G-25 (tradename for gelfiltrant composed of dextrane derivative, manufactured by Pharmacia Fine Chemicals Inc.), in water to adsorb the Objective product. 35 Milliliters of the fore part of the eluate fractions was discarded and 27 ml of the latter part of the fractions was passed through a column packed with 50 ml of CM-Sephadex C-25 to adsorb the objective product. The product once adsorbed on the adsorbent was eluted successively with a 0.1 M aqueous ammonium chloride solution and a 0.25 M aqueous ammonium chloride solution. The eluate fractions containing the objective product were collected and desalted with active carbon. The resulting solution was concentrated to obtain 120 mg of N-(p-nitrobenzyl)bleomycin $A_5$ Cu-containing trihydrochloride (6950 mcg potency/mg against *Mycobacterium smegmatis* 607). Yield: 11%.

In the same manner as described above, the compounds of Table 13 were synthesized.

Table 13

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | N-Allylbleomycin $A_5$ 200 mg | (c) EtOH 4 ml $H_2O$ 1.6 ml | $CH_2=CHCH_2Br$ 60 mg | $Et_3N$ 75 mg | 16 |
| 2 | N-Ethylbleomycin $A_5$ 200 mg | (c) EtOH 4 ml $H_2O$ 1.6 ml | $C_2H_5Br$ 27 mg | $Et_3N$ 50 mg | 8 |

(c): Cu-containing trihydrochloride

| Amount of CM-Sephadex (ml) | Concentration of ammonium chloride eluent | Yield | mcg Potency per mg against Mycobacterium smegmatis 607 |
|---|---|---|---|
| 25 | 0.1 M, 0.25 M | 70 mg 34 % | 3450 |
| 25 | 0.1 M, 0.25 M | 84 mg 41.5 % | 3300 |

EXAMPLE 15

Synthesis of N-(methylsulfonyl)bleomycin $A_5$

100 Milligrams of bleomycin $A_5$ Cu-containing dihydrochloride was dissolved in a mixture of 4 ml of acetone and 8 ml of distilled water. To the solution was added 160 mg of sodium bicarbonate, and 104 mg of methanesulfonyl chloride was added dropwise with stirring. The mixture was reacted at room temperature for 19 hours. The reaction liquid was neutralized and then passed through a column packed with a suspension of 5 ml of Amberlite IRA 400 (Cl type) in distilled water to adsorb the objective product. The product once adsorbed on the adsorbent was washed with 10 ml of distilled water. The resin eluate and the washings were combined. The mixture was passed through a column packed with a suspension of 20 ml of Sephadex G-25 in a 0.02 M aqueous ammonium chloride solution to adsorb the objective product. The product once adsorbed on the adsorbent was eluted successively with 200 ml of a 0.1 M aqueous ammonium chloride solution and 78 ml of 0.2 M aqueous ammonium chloride solution. The eluate fractions containing the objective product were collected and passed through a layer of 5 ml of Amberlite CG-50 (H type) to adsorb the objective product. The resin layer was washed successively with each 25 ml of water, 0.5% acetic acid and water, and the objective product was then eluted with acetone-0.02 N hydrochloric acid (1 : 1 by volume). The eluate was concentrated to dryness to obtain 16.2 mg of N-(methylsulfonyl)bleomycin $A_5$ Cu-containing dihydrochloride (1670 mcg potency/mg against Mycobacterium smegmatis 607). Yield: 15.3%.

In the same manner as described above, the compounds of Table 14 were synthesized.

Table 14

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | N-Benzenesulfonylbleomycin $A_5$ 200 mg | (b) $H_2O$ 3 ml Acetone 4 ml | 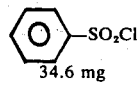 34.6 mg | $NaHCO_3$ 20 mg | 19 |
| 2 | N-(p-Toluenesulfonyl)-bleomycin $A_5$ 200 mg | (b) $H_2O$ 4 ml Acetone 4 ml | 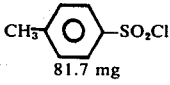 81.7 mg | $NaHCO_3$ 60 mg | 22 |
| 3 | N-(p-Chlorobenzene-sulfonyl)bleomycin $A_5$ 200 mg | (b) $H_2O$ 3.5 ml Acetone 4 ml | 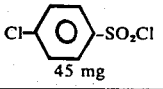 45 mg | $NaHCO_3$ 40 mg | 24 |

| Amount of CM-Sephadex (ml) | Concentration of ammonium chloride eluent | Yield | mcg Potency per mg against Mycobacterium smegmatis 607 |
|---|---|---|---|
| 30 | 0.1, 0.2 M | 27.6 mg 12.6 % | 6400 |

Table 14-continued

| No. | Name of derivative; amount of the starting bleomycin | | Solvent and amount thereof used | Reagent and amount thereof used | Alkali and amount thereof used | Reaction time (hrs) |
|---|---|---|---|---|---|---|
| | 20 | | 0.1, 0.3 M  19.5 mg  8.8 % | 19000 | | |
| | 40 | | 0.1, 0.2 M  75.9 mg  33.8 % | 23000 | | |
| 4 | N-(β-Naphthalenesulfonyl)- bleomycin $A_5$  200 mg | (b) | $H_2O$  3 ml  Acetone  4 ml | 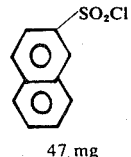  47 mg | NaHCO$_3$  40 mg | 4.25 |

(b): Cu-containing dihydrochloride

| | 50 | 0.1, 0.2 M | 47.1 mg  20.7 % | 26000 | | |

EXAMPLE 16

Synthesis of N-(ethylcarbamoyl)bleomycin $A_5$

200 Milligrams of bleomycin $A_5$ Cu-containing trihydrochloride was dissolved in 10 ml of water. To the solution was added 60 mg of sodium bicarbonate, and 0.1 ml of ethyl isocyanate was added dropwise with stirring. The mixture was reacted at room temperature for 4⅓ hours. The reaction liquid was filtered. The pH of the filtrate was adjusted to 4. The filtrate was then passed through a column packed with 30 ml of CM-Sephadex C-25 to adsorb the objective product. The product once adsorbed on the adsorbent was eluted successively with 0.1 M aqueous ammonium chloride and 0.25 M aqueous ammonium chloride. The eluate fractions containing the objective product were collected and desalted with active carbon. The thus obtained solution was concentrated to obtain 100 mg of N-(ethylcarbamoyl)bleomycin $A_5$ Cu-containing dihydrochloride (2388 mcg potency/mg against *Mycobacterium smegmatis* 607). Yield: 28.6%.

In the same manner as described above, the compounds of Table 15 were synthesized.

EXAMPLE 17

Synthesis of N-(acetimidoyl)bleomycin $A_5$

600 Milligrams of bleomycin $A_5$ Cu-containing trihydrochloride was dissolved in 15 ml of water. To the solution was added 90 mg of methyl acetimidate hydrochloride. The pH of the mixture was adjusted to 8.8 by the addition of triethylamine. The mixture was stirred at room temperature for 4 hours and then concentrated to one third of its original volume. The pH of the concentrate was adjusted to 7.

The reaction liquid was passed through a column packed with 60 ml of CM-Sephadex C-25 to adsorb the objective product. The product once adsorbed on the adsorbent was eluted with 417 ml of a 0.3 M aqueous ammonium chloride solution, and 320 ml of the second half of the eluate was passed through a column packed with 40 ml of active carbon. The carbon layer was washed with water and eluted with acetone-0.02 N hydrochloric acid (1 : 1 by volume). The eluate was concentrated to obtain 410 mg of N-(methylacetimidoyl)-bleomycin $A_5$ Cu-containing trihydrochloride (3100 mcg potency/mg against *Mycobacterium smegmatis* 607). Yield: 65%.

Table 15

| No. | Name of derivative; amount of the starting bleomycin | | Solvent and amount thereof used | Reagent and amount thereof used | Alkali and amount thereof used | Reaction time (hrs) |
|---|---|---|---|---|---|---|
| 1 | N-(Phenylcarbamoyl)- bleomycin $A_5$  500 mg | (b) | $H_2O$  2 ml | ⟨O⟩—N=C=O  0.08 ml | NaHCO$_3$  120 mg | 6 |
| 2 | N-(Cyclohexylcarbamoyl)- bleomycin $A_5$  200 mg | (b) | $H_2O$  10 ml | ⟨H⟩—N=C=O  0.05 ml | NaHCO$_3$  60 mg | 1.3 |

(b): Cu-containing dihydrochloride

| Amount of CM-Sephadex (ml) | Concentration of ammonium chloride eluent | Yield | mcg Potency per mg against *Mycobacterium smegmatis* 607 |
|---|---|---|---|
| 50 | 0.1, 0.15 M | 80 mg  15 % | 4725 |
| 30 | 0.1, 0.25 M | 60 mg  27.5 % | 13560 |

In the same manner as described above, the compounds of Table 16 were synthesized.

Table 16

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | N-(Propioimidoyl)bleomycin $A_5$<br>100 mg | (c) $H_2O$<br>2.5 ml | $C_2H_5\underset{\underset{NH\cdot HCl}{\|}}{C}\cdot OCH_3$<br>44 mg | $Et_3N$<br>(pH 9.1) | 6.25 |
| 2 | N-(Isobutyroimidoyl)-bleomycin $A_5$<br>100 mg | (c) $H_2O$<br>2.5 ml | $\begin{array}{c}CH_3\\CH_3\end{array}\underset{\underset{NH\cdot HCl}{\|}}{C}\cdot OCH_3$<br>32 mg | $Et_3N$<br>(pH 9.4) | 6.75 |
| 3 | N-(Valeroimidoyl)-bleomycin $A_5$<br>100 mg | (c) $H_2O$<br>2.5 ml | $CH_3(CH_2)_3\underset{\underset{NH\cdot HCl}{\|}}{C}\cdot OCH_3$<br>21 mg | $Et_3N$<br>(pH 9.4) | 2 |
| 4 | N-(Pelargonimidoyl)-bleomycin $A_5$<br>100 mg | (c) $H_2O$<br>2.5 ml<br>Acetone<br>2 ml | $CH_3(CH_2)_7\underset{\underset{NH\cdot HCl}{\|}}{C}\cdot OCH_3$<br>30 mg | $Et_3N$<br>(pH 9.0) | 2 |
| 5 | N-(Benzimidoyl)bleomycin $A_5$<br>200 mg | (c) $H_2O$<br>5 ml | Ph-$\underset{\underset{NH\cdot HCl}{\|}}{C}$-$OCH_3$<br>50 mg | $Et_3N$<br>(pH 9.1) | 7 |
| 6 | N-(p-Methoxybenzimidoyl)-bleomycin $A_5$<br>100 mg | (c) $H_2O$<br>5 ml | $CH_3O$-C$_6H_4$-$\underset{\underset{NH\cdot HCl}{\|}}{C}\cdot OCH_3$<br>54.5 mg | $Et_3N$<br>(pH 9.4) | 6.5 |
| 7 | N-(p-Toluimidoyl)bleomycin $A_5$<br>100 mg | (c) $H_2O$<br>2.5 ml<br>Acetone<br>1 ml | $CH_3$-C$_6H_4$-$\underset{\underset{NH\cdot HCl}{\|}}{C}\cdot OCH_3$<br>50 mg | $Et_3N$<br>(pH 9.1) | 4 |

| Amount of CM-Sephadex (ml) | Concentration of ammonium chloride eluent | Yield | mcg Potency per mg against *Mycobacterium smegmatis* 607 |
|---|---|---|---|
| 15 | 0.25 M | 70 mg<br>66 % | 3186 |
| 15 | 0.25 M | 60 mg<br>56 % | 3725 |
| 20 | 0.25 M | 75 mg<br>75 % | 10180 |
| 20 | 0.25 M | 52 mg<br>46.6 % | 25500 |
| 30 | 0.1, 0.4 M | 130 mg<br>62.5 % | 5199 |
| 15 | 0.25 M | 80 mg<br>71.7 % | 6500 |
| 20 | 0.25 M | 65 mg<br>65 % | 11890 |

Table 16-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 8 | N-(m-Toluimidoyl)bleomycin A₅<br><br>100 mg | (c)<br>H₂O 2.5 ml<br>Acetone 1 ml | 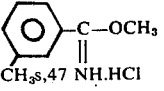 27 mg | Et₃N (pH 9.1) | 5 |
| 9 | N-(m-Nitrobenzimidoyl)-bleomycin A₅<br><br>100 mg | (c)<br>H₂O 2.5 ml | 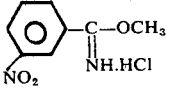 32 mg | Et₃N (pH 9.0) | 20 |
| 10 | N-(Phenylacetimidoyl)-bleomycin A₅<br><br>200 mg | (c)<br>H₂O 5 ml | 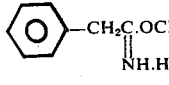 60 mg | Et₃N (pH 9.0) | 20 |
| 11 | N-(p-Chlorophenylacet-imidoyl)bleomycin A₅<br><br>100 mg | (c)<br>H₂O 2 ml<br>Acetone 2 ml | 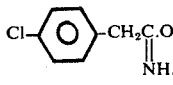 60 mg | Et₃N (pH 9.3) | 3.5 |

| | | | |
|---|---|---|---|
| 20 | 0.25 M | 53 mg 47 % | 10876 |
| 15 | 0.1, 0.25 M | 60 mg 53.8 % | 9750 |
| 20 | 0.25 M | 100 mg 45.3 % | 11700 |
| 28 | 0.25 M | 70 mg 61.9 % | 18920 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 12 | N-(p-Nitrophenylacet-imidoyl)bleomycin A₅<br><br>100 mg | (c)<br>H₂O 2.5 ml<br>Acetone 2.5 ml | 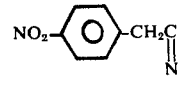 137 mg | Et₃N (pH 9.3) | 50 |
| 13 | N-(Cinnamoimidoyl)-bleomycin A₅<br><br>100 mg | (c)<br>H₂O 2.5 ml<br>Acetone 1.5 ml | 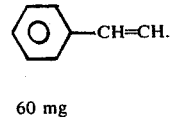 60 mg | Et₃N (pH 8.8) | 16 |
| 14 | N-(α-Naphthylacetimidoyl)-bleomycin A₅<br><br>100 mg | (c)<br>H₂O 5 ml<br>Acetone 5 ml | 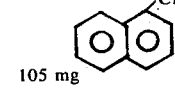 105 mg | Et₃N (pH 9.5) | 9% |
| 15 | N-(3-Dimethylaminopropio-imidoyl)bleomycin A₅<br><br>100 mg | (c)<br>H₂O 5 ml | 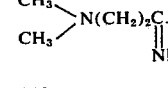 240 mg | Et₃N (pH 9.2) | 28 |

| | | | |
|---|---|---|---|
| 20 | 0.25 M | 60 mg 50.9 % | 17600 |
| 20 | 0.25 M | 70 mg 62.6 % | 12240 |
| 14 | 0.25 M | 80 mg 70.2 % | 13000 |
| 40 | 0.25, 0.5 M | 90 mg 41.4 % | 13760 |

Table 16-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 16 | (c) N-(Formimidoyl)bleomycin A$_5$<br><br>100 mg | H$_2$O<br><br>2.5 ml | H—C.OC$_2$H$_5$<br>‖<br>NH.HCl<br>82 mg | Et$_3$N<br><br>(pH 9.2) | 124 |

| (c): Cu-containing trihydrochloride | | | |
|---|---|---|---|
| 15 | 0.25 M | 30 mg<br>28.8 % | 1229 |

EXAMPLE 18

Synthesis of 3-(N-methyl-N-3-succinylaminopropyl)aminopropylaminobleomycin

200 Milligrams of 3-(N-methyl-N-3-aminopropyl)-aminopropylaminobleomycin Cu-containing trihydrochoride was dissolved in 10 ml of methanol. To the solution was added 0.14 ml of pyridine, and 85 mg of succinic anhydride was added with stirring. The mixture was stirred at room temperature for 2.5 hours. The reaction liquid was concentrated under reduced pressure. The residue was dissolved in water. The solution was passed through a column packed with a suspension of 40 ml of CM-Sephadex C-25 in a 0.02 M aqueous ammonium chloride solution to adsorb the objective product. The product once adsorbed on the adsorbent was eluted successively with 0.1 M and 0.2 M aqueous ammonium chloride solutions. The eluate fractions containing the objective product were collected and passed through column packed with 30 ml of Amberlite CG-50 (H type) to adsorb the objective product. The product once adsorbed on the adsorbent was washed successively with each 150 ml of water, 0.5% acetic acid and water, and eluted with acetone-0.02 N hydrochloric acid (1 : 1 by volume). The eluate was concentrated to dryness under reduced pressure to obtain 166.9 mg of 3-(N-methyl-N 3-succinylaminopropyl)aminopropylaminobleomycin Cu-containing dihydrochloride (90 mcg potency/mg against *Mycobacterium smegmatis* 607). Yield: 77.9%

In the same manner as described above, the compounds of Table 17 were synthesized.

Table 17

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | 3-(N-Methyl-N-3-acetyl-[b] aminopropyl)aminopropyl-aminobleomycin<br>200 mg | MeOH<br>10 ml | CH$_3$CO<br>       $>$O<br>CH$_3$CO<br>0.12 ml | Pyridine<br>0.23 ml | 3.5 |
| 2 | 3-(N-Methyl-N-3-propionyl-[b] aminopropyl)aminopropyl-aminobleomycin<br>100 mg | MeOH<br>5 ml | C$_2$H$_5$CO<br>       $>$O<br>C$_2$H$_5$CO<br>0.12 ml | Pyridine<br>0.15 ml | 3 |
| 3 | 3-(N-Methyl-N-3-lauroyl-[b] aminopropyl)aminopropyl-aminobleomycin<br>100 mg | MeOH<br>5 ml | CH$_3$(CH$_2$)$_{10}$CO<br>       $>$O<br>CH$_3$(CH$_2$)$_{10}$CO<br>270 mg | Pyridine<br>0.11 ml | 2.5 (Reflux) |

| Amount of CM-Sephadex (ml) | Concentration of ammonium chloride eluent | against Yield | mcg Potency per mg aginst *Mycobacterium smegmatis* 607 |
|---|---|---|---|
| 39 | 0.1, 0.2 M | 165.5 mg<br>80.3 % | 1050 |
| 20 | 0.1, 0.2 M | 81.8 mg<br>78.7 % | 1710 |
| 20 | 0.1, 0.2 M | 67.7 mg<br>60.0 % | 19000 |

| 4 | 3-(N-methyl-N-3-maleyl-[b] aminopropyl)aminopropyl-aminobleomycin<br>100 mg | MeOH<br>5 ml | CH—CO<br>       $>$O<br>CH—CO<br>70 mg | Pyridine<br>0.28 ml | 2.5 |

Table 17-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 5 | 3-(N-Methyl-N-3-benzoyl-[b] aminopropyl)amino-propylaminobleomycin 200 mg | MeOH 10 ml | 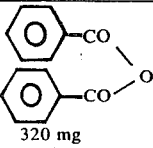 320 mg | Pyridine 0.23 ml | 2.5 |
| 6 | 3-(N-Methyl-N-3-nicotinoyl-[b] aminopropyl)aminopropyl-aminobleomycin 100 mg | MeOH 5 ml | 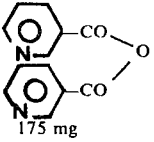 175 mg | Pyridine 0.15 ml | 3.5 |
| 7 | 3-(N-Methyl-N-3-thenoyl-[b] aminopropyl)aminopropyl-aminobleomycin 200 mg | MeOH 10 ml | 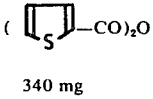 340 mg | Pyridine 0.35 ml | 2.5 |

|  |  |  |  |
|---|---|---|---|
| 20 | 0.1 M | 75 mg 65.5 % | 320 |
| 40 | 0.1, 0.2 M | 167 mg 77.8 % | 5620 |
| 20 | 0.1, 0.2 M | 88.1 mg 82.6 % | 2000 |
| 30 | 0.1, 0.2 M | 150 mg 70 % | 6800 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 8 | 3-[N-Methyl-N-3-(3-nitro-[b] phthalyl)aminopropyl]-aminopropylaminobleo-mycin 200 mg | MeOH 10 ml | 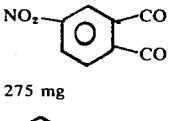 275 mg | Pyridine 0.23 ml | 2 |
| 9 | 3-(N-Methyl-N-3-phthalyl-[b] aminopropyl)aminopropyl-aminobleomycin 200 mg | MeOH 10 ml | 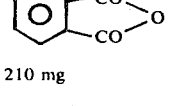 210 mg | Pyridine 0.23 ml | 2 |
| 10 | 3-(N-Methyl-N-3-glutary-[b] aminopropyl)aminopropyl-aminobleomycin 200 mg | MeOH 10 ml | 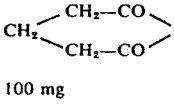 100 mg | Pyridine 0.14 ml | 4 |
| 11 | 3-(N-Methyl-N-3-methyl-succinylaminopropyl)-aminopropylaminobleomycin 100 mg | MeOH 5 ml | 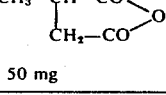 50 mg | Pyridine 0.1 ml | 6 |

|  |  |  |  |
|---|---|---|---|
| 35 | 0.1 M | 121.9 mg 53.6 % | 320 |
| 35 | 0.1 M | 165.2 mg 74.7 % | 620 |
| 40 | 0.1, 0.2 M | 140 mg 64.8 % | 110 |
| 20 | 0.1, 0.2 M | 63 mg 58.3 % | 170 |

| No. | Name of derivative; amount of the starting bleomycin | Solvent and amount thereof used | Reagent and amount thereof used | Alkali and amount thereof used | Reaction time (hrs) |
|---|---|---|---|---|---|
| 12 | 3-(N-Methyl-N-3-itaconyl-aminopropyl)aminopropyl-aminobleomycin | MeOH 5 ml | 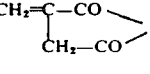 | Pyridine 0.1 ml | 6 |

Table 17-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| | 100 mg | | | | |
| | 20 | 0.1, 0.2 M | 52 mg 47.8 % | 230 | |

(b): Cu-containing dihydrochloride

EXAMPLE 19

Synthesis of 3-(N-methyl-N-3-benzenesulfonylaminopropyl)aminopropylaminobleomycin 100 Milligrams of 3-(N-methyl-N-3-aminopropyl)-aminopropylaminobleomycin Cu-containing trihydrochloride was dissolved in a mixture of 2 ml of acetone and 7.5 ml of water. To the solution was added 200 mg of sodium bicarbonate and 47 mg of benzenesulfonyl chloride with stirring. The mixture was reacted at room temperature for 24 hours. The reaction liquid was neutralized and passed through a column packed with a suspension of 5 ml of Amberlite IRA 400 (Cl type). The resin layer was washed with 10 ml of water. The resin eluate and the washings were combined. The mixture was passed through a column packed with a suspension of 20 ml of CM-Sephadex C-25 in a 0.02 M aqueous ammonium chloride solution to adsorb the objective product. The product once adsorbed on the adsorbent was eluted successively with 63 ml of a 0.1 M aqueous ammonium chloride solution and 131 ml of a 0.2 M aqueous ammonium chloride solution. 65 Milliliters of the second half of the 0.2 M aqueous ammonium chloride eluate was recovered and passed through a layer of 10 ml of Amberlite CG-50 (H type) to adsorb the objective product. The product once adsorbed on the adsorbent was washed successively with each 50 ml of water, 0.5% acetic acid and water and then eluted with acetone-0.02 N hydrochloric acid (1 : 1 by volume). The eluate was concentrated to dryness under reduced pressure to obtain 60.9 mg of 3-(N-methyl-N-3-benzenesulfonylaminopropyl)aminopropylaminobleomycin Cu-containing dihydrochloride (6700 mcg potency/mg against Mycobacterium smegmatis 607). Yield: 55.4%.

In the same manner as described above, the compounds of Table 18 were synthesized.

Table 18

| No. | Name of derivative; amount of the starting bleomycin | Solvent and amount thereof used | Reagent and amount thereof used | Alkali and amount thereof used | Reaction time (hrs) |
|---|---|---|---|---|---|
| 1 | 3-(N-Methyl-N-3-chloroacetylaminopropyl)-aminopropylaminobleomycin 1.5 g | (b) Acetone 13 ml H$_2$O 145 ml | ClCH$_2$COCl 3 g | NaHCO$_3$ 5.8 g | 50 |
| 2 | 3-(N-Methyl-N-3-p-chlorobenzenesulfonylaminopropyl)aminopropylaminobleomycin 300 mg | (b) Acetone 10 ml H$_2$O 3 ml |  Cl—⟨O⟩—SO$_2$Cl 45 mg | NaHCO$_3$ 60 mg | 24 |
| 3 | 3-(N-Methyl-N-3-p-toluenesulfonylaminopropyl)-aminopropylaminobleomycin 100 mg | (b) Acetone 2 ml H$_2$O 3 ml |  CH$_3$—⟨O⟩—SO$_2$Cl 25.2 mg | NaHCO$_3$ 120 mg | 24 |

| | Amount of CM-Sephadex (ml) | Concentration of ammonium chloride eluent | Yield | mcg Potency per mg against Mycobacterium smegmatis 607 |
|---|---|---|---|---|
| | 250 | 0.1, 0.2, 0.3 M | 477 mg 30.2 % | 1200 |
| | 43 | 0.1, 0.2 M | 220.3 mg 65 % | 17700 |
| | 20 | 0.1, 0.2 M | 49.2 mg 43.6 % | 10000 |

Table 18-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 4 | 3(N-Methyl-N-3-p-nitrobenzylaminopropyl)-aminopropylaminobleomycin<br>1 g | (c) EtOH 60 ml<br>H₂O 20 ml |  600 mg | Et₃N 0.58 ml | 35 |
| 5 | 3-(N-Methyl-N-3-allyl-aminopropyl)aminopropyl-aminobleomycin<br>200 mg | (c) EtOH 4 ml<br>H₂O 16 ml | CH₂=CHCH₂Br 60 mg | Et₃N 70 mg | 16 |

(b): Cu-containing dihydrochloride
(c): Cu-containing trihydrochloride

|  |  |  |  |
|---|---|---|---|
| 150 | 0.1, 0.2 M | 132 mg<br>12 % | 7050 |
| 25 | 0.1, 0.2 M | 77 mg<br>37.4 % | 3400 |

EXAMPLE 20

Synthesis of 3-(N-methyl-N-3-phenylacetimidoylaminopropyl)aminopropylaminobleomycin 200 Milligrams of 3-(N-methyl-N-3-aminopropyl)aminopropylaminobleomycin Cu-containing trihydrochloride was dissolved in 5 ml of water. To the solution was added 60 mg of methyl phenylacetimidate hydrochloride with stirring. The pH of the mixture was adjusted to 9.1 by the addition of triethylamine. The mixture was reacted at room temperature for 26 hours. The reaction liquid was diluted with water and passed through a column packed with a suspension of 25 ml of CM-Sephadex C-25 in a 0.02 M aqueous ammonium chloride solution to adsorb the objective product. The product once adsorbed on the adsorbent was eluted successively with 150 ml of 0.1 M aqueous ammonium chloride, 100 ml of 0.2 M ammonium chloride and 260 ml of 0.3 M aqueous ammonium chloride. 90 Milliliters of the last 0.3 M aqueous ammonium chloride eluate fraction was passed through a column packed with 30 ml of Amberlite CG-50 (H type) to adsorb the objective product. The product once adsorbed on the adsorbent was washed successively with each 150 ml of water, 0.5% acetic acid and water, and then eluted with acetone-0.02 N hydrochloric acid (1 : 1 by volume). The eluate was concentrated to dryness under reduced pressure to obtain 170.8 mg of 3-(N-methyl-N-3-phenylacetimidoylaminopropyl)aminopropylaminobleomycin Cu-containing trihydrochloride (12750 mcg potency/mg against *Mycobacterium smegmatis* 607). Yield: 78.9%.

In the same manner as described above, the compounds of Table 19 were synthesized. Note: In cases of Compound numbers 8 - 13, 3-(N-6-aminohexyl)aminopropylaminobleomycin Cu-containing trihydrochloride was used as a starting bleomycin.

Table 19

| No. | Name of derivative; amount of the starting bleomycin | Solvent and amount thereof used | Reagent and amount thereof used | Alkali and amount thereof used | Reaction time (hrs)) |
|---|---|---|---|---|---|
| 1 | 3-(N-Methyl-N-3-acetimidoyl-aminopropyl)aminopropyl-aminobleomycin<br>100 mg | (c) H₂O 5 ml | CH₃C(=NH·HCl)—OCH₃<br>30 mg | Et₃N (pH 8.8) | 4 |
| 2 | 3-(N-Methyl-N-3-p-chloro-phenylacetimidoylamino-propyl)aminopropyl-aminobleomycin<br>100 mg | (c) Acetone 4 ml<br>H₂O 4 ml | Cl-C₆H₄-CH₂C(=NH·HCl)—OCH₃<br>50 mg | Et₃N (pH 9.1) | 4.5 |
| 3 | 3-(N-3-Acetylamino-propyl)aminopropylamino-bleomycin<br>500 mg | (b) MeOH 25 ml | (CH₃CO)₂O 0.3 ml | Pyridine 0.4 ml | 5 |

| Amount of CM-Sephadex (ml) | Concentration of ammonium chloride eluent | Yield | mcg Potency per mg against *Mycobacterium smegmatis* 607 |
|---|---|---|---|
|  | 0.1, 0.2, | 144 mg |  |

Table 19-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| | 25 | 0.3 M | 70 % | 3640 | |
| | 30 | 0.1, 0.2, 0.3 M | 193.4 mg 87 % | 19000 | |
| | 60 | 0.2 M | 298 mg 57.8 % | 1250 | |
| 4 | 3-(N-3-Benzoylamino-propyl)aminopropyl-aminobleomycin 85 mg | (b) MeOH 4.2 ml |  138 mg | Pyridine 0.21 ml | 1 |
| 5 | 3-(N-3-Succinylamino-propyl)aminopropyl-aminobleomycin 100 mg | (b) MeOH 5 ml |  40 mg | Pyridine 0.1 ml | 3 |
| 6 | 3-(N-3-p-Nitrobenzyl-aminopropyl)aminopropyl-aminobleomycin 500 mg | (c) EtOH 30 ml H$_2$O 10 ml | 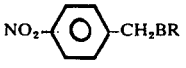 300 mg | Et$_3$N 0.3 ml | 40 |
| 7 | 3-(N-3-Phenylacetimidoyl-aminopropyl)aminopropyl-aminobleomycin 100 mg | (c) H$_2$O 2.5 ml | CH$_2$COCH$_3$<br>‖<br>NH·HCl<br>40 mg | Et$_3$N (pH 9.0) | 16 |
| | 10 | 0.1 – 0.4 M | 46.5 mg 50.9 % | 4084 | |
| | 20 | 0.1 M | 65 mg 60.6 % | 180 | |
| | 30 | 0.1 – 0.25 M | 85 mg 15.2 % | 6250 | |
| | 12 | 0.25 M | 55 mg 50.7 % | 9600 | |
| 8 | 3-(N-6-Acetylaminohexyl)-aminopropylaminobleomycin 100 mg | (b) MeOH 5 ml | (CH$_3$CO)$_2$O 0.1 ml | Pyridine 0.13 ml | 7 |
| 9 | 3-(N-6-Benzoylamino-hexyl)aminopropylamino-bleomycin 100 mg | (b) MeOH 5 ml |  162 mg | Pyridine 0.25 ml | 1 |
| 10 | 3-(N-6-Succinylamino-hexyl)aminopropylamino-bleomycin 100 mg | (b) MeOH 5 ml |  40 mg | Pyridine 0.1 ml | 7 |
| 11 | 3-(N-6-p-Nitrobenzyl-aminohexyl)aminopropyl-aminobleomycin 200 mg | (c) EtOH 12 ml H$_2$O 4 ml |  120 mg | Et$_3$N 0.15 ml | 41 |
| | 20 | 0.25 M | 57 mg 55.4 % | 1480 | |
| | 10 | 0.1 – 0.4 M | 55.8 mg 52.0 % | 6388 | |
| | 20 | 0.1 M | 60 mg 56.1 % | 257 | |
| | 15 | 0.1 – 0.25 M | 45 mg 20.2 % | 8100 | |

Table 19-continued

| No. | Name of derivative; amount of the starting bleomycin | Solvent and amount thereof used | Reagent and amount thereof used | Alkali and amount thereof used | Reaction time (hrs) |
|---|---|---|---|---|---|
| 12 | 3-(N-6-p-Chlorophenyl-acetimidoylaminohexyl)-aminopropylaminobleomycin 100 mg | (c) H₂O 2 ml | CL-⟨O⟩-CH₂COCH₃ ‖ NH.HCl 45 mg | Et₃N (up to pH 9.0) | 20 |
| 13 | 3-(N-6-Citraconylamino-hexyl)aminopropylamino-bleomycin 100 mg | (c) MeOH 5 ml | CH₃C—CO ⟩O CH—CO 40 mg | Pyridine 0.1 ml | 12 |

(b): Cu-containing dihydrochloride
(c): Cu-containing trihydrochloride

| | | 46 mg | |
|---|---|---|---|
| 12 | 0.25 M | | 17640 |
| | | 41.6 % | |
| | | 39 mg | |
| 20 | 0.1 M | | 185 |
| | | 36.2 % | |

EXAMPLE 21

Synthesis of 3-(N-methyl-N-3-cyclohexylcarbamoylaminopropyl)aminopropylaminobleomycin 200 Milligrams of 3-(N-methyl-N-3-aminopropyl)-aminopropylaminobleomycin Cu-containing trihydrochloride was dissolved in 10 ml of water. To the solution was added 60 mg of sodium bicarbonate and 0.05 ml of cyclohexyl isocyanate with stirring. The mixture was reacted for 2 hours. The reaction liquid was filtered. The pH of the filtrate was adjusted to 5.0. The filtrate was diluted with water and passed through a column packed with a suspension of 30 ml of CM-Sephadex C-25 in 0.02 M aqueous ammonium chloride to adsorb the objective product. The product once adsorbed was eluted successively with 0.1 M aqueous ammonium chloride and 0.25 M aqueous ammonium chloride. The eluate fractions containing the objective product were collected and passed through a column packed with 30 ml of Amberlite CG-50 (H type) to adsorb the objective product. The product once adsorbed on the adsorbent was washed successively with each 150 ml of water, 0.5% acetic acid and water, and then eluted with acetone-0.02 N hydrochloric acid (1 : 1 by volume). The eluate was concentrated to dryness under reduced pressure to obtain 88 mg of 3-(N-methyl-N-3-cylohexylcarbamoylaminopropyl)aminopropylaminobleomycin Cu-containing dihydrochloride (11500 mcg potency/mg against *Mycobacterium smegmatis* 607). Yield: 40.4%.

EXAMPLE 22

Synthesis of 3-N-succinylbleomycin A₅ sulfate

20 Milligrams of 3-N-succinylbleomycin A₅ Cu-containing trihydrochloride (200 mcg potency/mg against *Mycobacterium smegmatis* 607) was dissolved in 2 ml of distilled water. The solution was charged into a column packed with 5 ml of an anion-exchange resin Amberlite IRA-400 (SO₄ type). The resin layer was eluted with distilled water and the eluate was concentrated to dryness to obtain 15.5 mg of 3-N-succinylbleomycin Cu-containing sulfate (200 mcg potency/mg against *Mycobacterium smegmatis* 607). Yield: 77.5%.

What is claimed is:

1. A novel N-substituted bleomycin derivative having the following structure:

wherein

P = —NH—(CH$_2$)$_3$—NH—; —NH—(CH$_2$)$_3$—NH—(CH$_2$)$_3$—NH—, —NH—(CH$_2$)$_3$—NH—(CH$_2$)$_4$—NH—, —NH—(CH$_2$)$_3$—NH—(CH$_2$)$_6$—NH— or

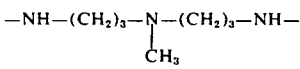

Q = —COR, where R is hydrogen, a C$_1$–C$_{11}$ alkyl group, a C$_1$–C$_2$ halogen-substituted alkyl group, a crotonoyl group, a phenyl group, a p-nitrophenyl group, a benzyl group, a p-nitrobenzyl group, a phenoxymethyl group, a cinnamyl group, a naphthyl group, a nicotinyl group, an isonicotinyl group, a furyl group or a thenyl group;

= —CO—(CH$_2$)$_n$—COOH, where $n_1$ is an integer of 2 to 7;

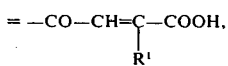

where R$^1$ is hydrogen or a methyl group;

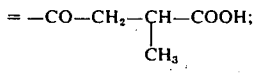

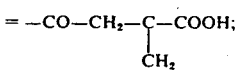

-R$^2$, where R$^2$ is an allyl group or a p-nitrobenzyl group;

—SO$_2$R$^3$, where R$^3$ is a C$_1$–C$_2$ alkyl group,

(wherein Z is hydrogen, a methyl group, a chlorine atom or a nitro group) or a naphthyl group;

—CONHR$^4$, where R$^4$ is C$_1$–C$_4$ alkyl group, a cyclohexyl group, a phenyl group, a p-tolyl group or a naphthyl group;

where R$^5$ is hydrogen, a C$_1$–C$_8$ alkyl group, —(CH$_2$)$_3$NZ$^1$Z$^2$ (wherein Z$^1$ and Z$^2$ are hydrogen or a methyl group, respectively),

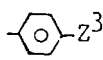

(wherein Z$^3$ is hydrogen, a methyl group, a nitro group or a methoxy group),

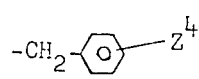

(wherein Z$^4$ is hydrogen, a chlorine atom or a nitro group), a styryl group or a naphthylmethyl group;

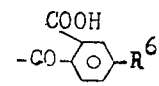

where R$^6$ is hydrogen or a nitro group; and
—(CH$_2$)$_2$C ≡ N; and its pharmaceutically effective inorganic acid addition salt and the metal chelates thereof.

2. The novel N-substituted derivative of claim 1 wherein said metal chelate is a copper chelate.

3. A novel N-substituted bleomycin derivative as claimed in claim 1, wherein P represents

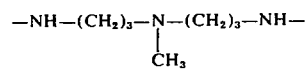

or —NH—(CH$_2$)$_3$—NH—(CH$_2$)$_3$—NH—; and Q represents —COR,

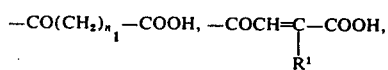

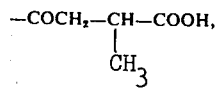

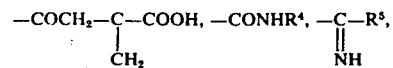

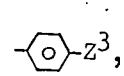

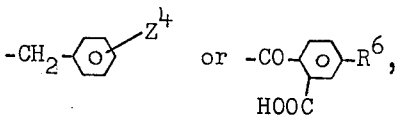

wherein R, R$^1$, R$^4$, R$^5$, R$^6$, Z$^3$, Z$^4$ and $n_1$ are as defined in claim 1.

4. A novel N-substituted bleomycin derivative as claimed in claim 1, wherein P represents —NH—(CH$_2$)$_3$—NH—(CH$_2$)$_4$—NH— and Q represents —COR (where R is a C$_1$–C$_{11}$ alkyl group, a nicotinyl group or an isonicotinyl group), —CO(CH$_2$)$_n$—COOH (where $n_1$ is an integer of 2 to 7) or

where R$^5$ is

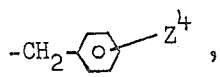

in which $Z^4$ is hydrogen, a chlorine atom or a nitro group).

5. A novel N-substituted bleomycin compound having the following structure:

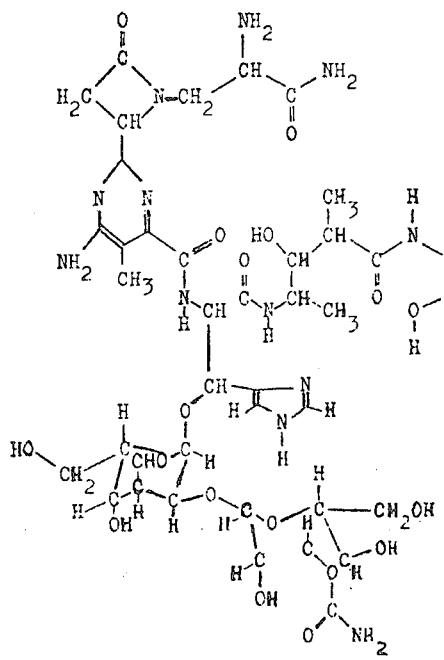

wherein
P = $-NH-(CH_2)_3-NH-$, $-NH-(CH_2)_3-NH-(CH_2)_3-NH-$, $-NH-(CH_2)_3-NH-(CH_2)_4-NH-$, $-NH-(CH_2)_3-NH-(CH_2)_6-NH-$ or $-NH-(CH_2)_3-N(CH_3)-(CH_2)_3-NH-$ Q = $-COR$, where R is hydrogen, a $C_1-C_{11}$ alkyl group, a $C_1-C_2$ halogen-substituted alkyl group, a crotonoyl group, a phenyl group, a p-nitrophenyl group, a benzyl group, a p-nitrobenzyl group, a phenoxymethyl group, a cinnamyl group, a naphthyl group, a nicotinyl group, an isonicotinyl group, a furyl group or a thenyl group;

= $-CO-(CH_2)_{n_1}-COOH$, where $n_1$ is an integer of 2 to 7;

= $-CO-CH=C(R^1)-COOH$, where $R^1$ is hydrogen or a methyl group;

= $-CO_0-CH_2-CH(CH_3)-COOH$;

= $-CO-CH_2-C(CH_3)-COOH$;

$-R^2$, where $R^2$ is an allyl group or a p-nitrobenzyl group;
$-SO_2R^3$, where $R^3$ is a $C_1-C_2$ alkyl group,

(wherein) Z is hydrogen, a methyl group, a chlorine atom or a nitro group) or a naphthyl group;

$-CONHR^4$, where $R^4$ is a $C_1-C_4$ alkyl group, a cyclohexyl group, a phenyl group, a p-tolyl group or a naphthyl group;

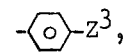

where $R^5$ is hydrogen, a $C_1-C_8$ alkyl group,
$-(CH_2)_3NZ^1Z^2$ (wherein $Z^1$ and $Z^2$ are hydrogen or a methyl group, respectively),

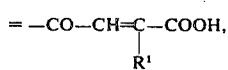

(wherein $Z^3$ is hydrogen, a methyl group, a nitro group or a methoxy group),

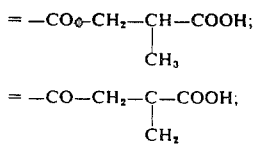

(wherein $Z^4$ is hydrogen, a chlorine atom or a nitro group), a styryl group or a naphthylmethyl group;

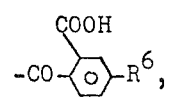

where $R^6$ is hydrogen or a nitro group; $-(CH_2)C \equiv N$;
$A$ = an inorganic anion and
$X$ = an integer of 1 to 3.

6. An N-substituted bleomycin as claimed in claim 5, wherein P represents $-NH-(CH_2)_3-NH-(CH_2)_4-NH-$, $-NH-(CH_2)_3-N-(CH_2)_3-NH-$ or $-NH-(CH_2)_3-NH-(CH_2)_3-NH-$;
$\quad\quad\quad\quad\quad\quad\; |$
$\quad\quad\quad\quad\quad\; CH_3$ and Q represents $-COR$, $-CO(CH_2)_n-COOH$,

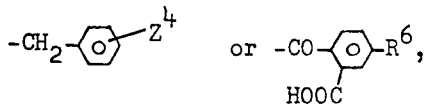

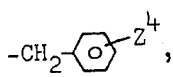

wherein R, $R^1$, $R^4$, $R^5$, $R^6$, $Z^3$, $Z^4$ and $n_1$ are as defined in claim 1.

7. An N-substituted bleomycin as claimed in claim 5, wherein P represents $-NH-(CH_2)_3-NH-(CH_2)_4-NH-$ and Q represents $-COR$ (where R is a $C_1-C_{11}$ alkyl group, a nicotinyl group or an iso-nicotinyl group), $-CO(CH_2)_{n1}-COOH$ (where $n_1$ is an integer of 2 to 7) or $\quad -C-R^5$
$\quad\;\; ||$
$\quad\;\; NH$ (where $R^5$ is $-CH_2-\langle O \rangle-Z^4$, in which $Z^4$ is hydrogen, a chlorine atom or a nitro group).

8. The N-substituted bleomycin compound of claim 5 wherein A is a chlorine atom or ½ sulphate radical.

9. The N-substituted bleomycin compound of claim 8 wherein A is a chlorine atom.

10. A copper chelate of the compound of claim 5.
11. A copper chelate of the compound of claim 8.
12. A copper chelate of the compound of cliam 9.

13. A novel N-substituted bleomycin derivative comprising an aminopropylaminobleomycin selected from the group consisting of
3-(N-4-Acetylaminobutyl)aminopropylaminobleomycin,
3-(N-4-Succinylaminobutyl)aminopropylaminobleomycin,
3-(N-4-Nicotinoylaminobutyl)aminopropylaminobleomycin,
3-(N-4-Isonicotinylaminobutyl)aminopropylaminobleomycin,
3-(N-4-Phthalylaminobutyl)aminopropylaminobleomycin,
3-(N-p-Chlorophenylacetimidoylaminobutyl)aminopropylaminobleomycin,
3-(N-Methyl-N-3-succinyl-aminopropyl)aminopropylaminobleomycin,
3-(N-Methyl-N-3-p-chlorophenylacetimidoylaminopropyl)aminopropylaminobleomycin,
3-(N-6-Succinylaminohexyl)aminopropylaminobleomycin, and
3-(N-6-p-Chlorophenylacetimidoylaminohexyl)aminopropylaminobleomycin.

14. The novel N-substituted bleomycin derivative of claim 13 wherein said aminopropylaminobleomycin is 3-(N-4-Acetylaminobutyl)aminopropylaminobleomycin.

15. The novel N-substituted bleomycin derivative of claim 13 wherein said aminopropylaminobleomycin is 3-(N-4-Succinylaminobutyl)aminopropylaminobleomycin.

16. The novel N-substituted bleomycin derivative of claim 13 wherein said aminopropylaminobleomycin is 3-(N-4-Nicotinoylaminobutyl)aminopropylaminobleomycin.

17. The novel N-substituted bleomycin derivative of claim 13 wherein said aminopropylaminobleomycin is 3-(N-4-Isonicotinoylaminobutyl)aminopropylaminobleomycin.

18. The novel N-substituted bleomycin derivative of claim 13 wherein said aminopropylaminobleomycin is 3-(N-4-Phthalylaminobutyl)aminopropylaminobleomycin.

19. The novel N-substituted bleomycin derivative of claim 13 wherein said aminopropylaminobleomycin is 3-(N-p-Chlorophenylacetiimidoylaminobutyl)aminopropylaminobleomycin.

20. The novel N-substituted bleomycin derivative of claim 13 wherein said aminopropylaminobleomycin is 3-(N-Methyl-N-3-succinylaminopropyl)aminopropylaminobleomycin.

21. The novel N-substituted bleomycin derivative of claim 13 wherein said aminopropylaminobleomycin is 3-(N-Methyl-N-3-p-chlorophenylacetiimidoylaminopropyl)-aminopropylaminobleomycin.

22. The novel N-substituted bleomycin derivative of claim 13 wherein said aminopropylaminobleomycin is 3-(N-6-Succinylaminohexyl)aminopropylaminobleomycin.

23. The novel N-substituted bleomycin derivative of claim 13 wherein said aminopropylaminobleomycin is 3-(N-6-p-Chlorophenylacetiimidoylaminohexyl)aminopropylaminobleomycin.

24. A process for producing N-substituted derivatives of bleomycins having the following structure in their copper-free form.

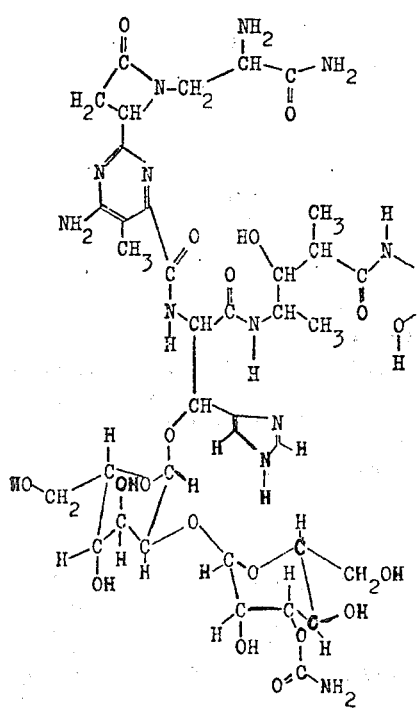
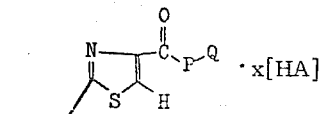

wherein

P = —NH—(CH$_2$)$_3$—NH—, —NH—(CH$_2$)$_3$—NH—(CH$_2$)$_3$—NH—, —NH—(CH$_2$)$_3$—NH—(CH$_2$)$_4$—NH—, —NH—(CH$_2$)$_3$—NH—(CH$_2$)$_6$—NH— or

—NH—(CH$_2$)$_3$—N—(CH$_2$)$_3$—NH—
              |
              CH$_3$

Q = —COR, where R is hydrogen, a C$_1$–C$_{11}$ alkyl group, a C$_1$–C$_2$ halogen-substituted alkyl group, a crotonoyl group, a phenyl group, a p-nitrophenyl group, a benzyl group, a p-nitrobenzyl group, a phenoxymethyl group, a cinnamyl group, a naphthyl group, a nicotinyl group, an isonicotinyl group, a furyl group or a thenyl group;

= —CO—(CH$_2$)$_{n_1}$—COOH, where $n_1$ is an integer of 2 to 7;

= —CO—CH=C—COOH,
         |
         R$^1$ where R$^1$ is hydrogen or a methyl group;

= —CO—CH$_2$—CH—COOH;
              |
              CH$_3$

= —CO—CH$_2$—C—COOH;
             ‖
             CH$_2$

—R$^2$, where R$^2$ is an allyl group or a p-nitrobenzyl group;

—SO$_2$R$^3$, where R$^3$ is a C$_1$–C$_2$ alkyl group,

(wherein Z is hydrogen, a methyl group, a chlorine atom or a nitro group) or a naphthyl group;

—CONHR$^4$, where R$^4$ is a C$_1$–C$_4$ alkyl group, a cyclohexyl group, a phenyl group, a p-tolyl group or a naphthyl group;

where R$^5$ is hydrogen, a C$_1$–C$_8$ alkyl group, —(CH$_2$)$_3$NZ$^1$Z$^2$ (wherein Z$^1$ and Z$^2$ are hydrogen or a methyl group, respectively),

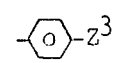

(wherein Z$^3$ is hydrogen, a methyl group, a nitro group or a methoxy group),

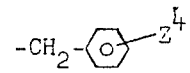

(wherein Z$^4$ is hydrogen, a chlorine atom or a nitro group), a styryl group or a naphthylmethyl group;

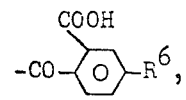

where $R^6$ is hydrogen or a nitro group,
—$(CH_2)_2C \equiv N$;
A = an inorganic anion and
X = an integer of 1 to 3,
which comprises reacting one member selected from the group consisting of 3-aminopropylaminobleomycin, 3-(N-4-aminobutyl)aminopropylaminobleomycin, 3-(N-Methyl-N-3-aminopropyl)aminopropylaminobleomycin, 3-(N-3-aminopropyl)aminopropylaminobleomycin, and 3-(N-6-aminohexyl)-aminopropylaminobleomycin in a solvent selected from the group consisting of water, methanol, ethanol and acetone and a mixture thereof in the presence of an additive selected from the group consisting of pyridine, sodium bicarbonate, and triethylamine, at pH of 8.5–9.5 at 10°–40°C. for 1–4 hours, with one member selected from the group consisting of compounds represented by the formula, R—Y,
wherein R is as defined above and Y is —COOH, an acid halide group, an acid ester group, —CO—O—COR, or —CON₃;
the formula,

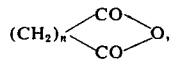

wherein n is an integer of 3 to 7;
the formula,

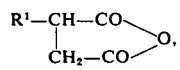

wherein $R^1$ is as defined above;
the formula,

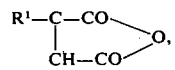

wherein $R^1$ is as defined above;
the formula

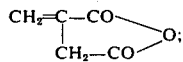

the formula,

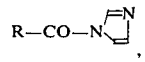

wherein R is as defined above;
the formula, $R^2$—X,
wherein $R^2$ is as defined above and X is halogen atom;
the formula, $R^3O_2S$—X,
wherein $R^3$ and X are as defined above;
the formula, $R^4$—NCO,
wherein $R^4$ is as defined above;
the formula,

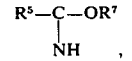

wherein $R^5$ is as defined above and $R^7$ is an $C_1$–$C_2$ alkyl group;
the formula,

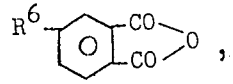

wherein $R^6$ is hydrogen or a nitro group; and the formula, $CH_2=CH$—$C \equiv N$.

* * * * *